US012103792B2

(12) United States Patent
Turpin et al.

(10) Patent No.: US 12,103,792 B2
(45) Date of Patent: Oct. 1, 2024

(54) APPARATUS AND METHOD FOR BUILDING A PALLET LOAD

(71) Applicant: Symbotic Canada, ULC, Lafontaine (CA)

(72) Inventors: Patrice Turpin, Mirabel (CA); William Légaré, Terrebonne (CA); Benoit Larouche, Montréal (CA); Christian Simon, Laval (CA); Régis Métivier, Terrebonne (CA); Sylvain-Paul Morency, Laval (CA); Robert Jodoin, Mont Tremblant (CA)

(73) Assignee: Symbotic Canada, ULC (CA)

( * ) Notice: Subject to any disclaimer, the term of this patent is extended or adjusted under 35 U.S.C. 154(b) by 0 days.

(21) Appl. No.: 18/346,357

(22) Filed: Jul. 3, 2023

(65) Prior Publication Data

US 2023/0365356 A1  Nov. 16, 2023

Related U.S. Application Data

(63) Continuation of application No. 17/151,761, filed on Jan. 19, 2021, now Pat. No. 11,691,830, which is a
(Continued)

(51) Int. Cl.
*G06F 7/00* (2006.01)
*B25J 9/00* (2006.01)
(Continued)

(52) U.S. Cl.
CPC ............ *B65G 57/03* (2013.01); *B25J 9/0093* (2013.01); *B25J 9/1661* (2013.01); *B25J 9/1687* (2013.01);
(Continued)

(58) Field of Classification Search
CPC ........ B65G 57/03; B65G 59/02; B65G 61/00; B65G 2201/025; B65G 2201/0267;
(Continued)

(56) References Cited

U.S. PATENT DOCUMENTS 7,171,041 B2   1/2007   Watanabe et al.
8,489,229 B2   7/2013   Keuhnemann et al.
(Continued)

FOREIGN PATENT DOCUMENTS

CA        2879277        7/2015

OTHER PUBLICATIONS

International Search Report, International Application No. PCT/CA2018/050865, dated Sep. 20, 2018.
(Continued)

*Primary Examiner* — Yolanda R Cumbess
(74) *Attorney, Agent, or Firm* — Perman & Green, LLP

(57) ABSTRACT

A pallet building apparatus for automatically building a pallet load of pallet load article units onto a pallet support including a frame defining a pallet building base, at least one articulated robot to transport and place the pallet load article units, a controller to control articulated robot motion and effect therewith a pallet load build, at least one three-dimensional, time of flight, camera to generate three-dimensional imaging of the pallet support and pallet load build, wherein the controller registers, from the three-dimensional camera, real time three-dimensional imaging data embodying different corresponding three-dimensional images of the pallet support and pallet load build, to determine, in real time, from the corresponding real time three-dimensional imaging data, a pallet support variance or article unit variance and generate in real time an articulated robot motion signal, the articulated robot motion signal being generated real time so as to be performed real time.

40 Claims, 48 Drawing Sheets

Related U.S. Application Data continuation of application No. 16/035,204, filed on Jul. 13, 2018, now Pat. No. 10,894,676.

(60) Provisional application No. 62/533,503, filed on Jul. 17, 2017.

(51) Int. Cl.

| | | |
|---|---|---|
| *B25J 9/16* | (2006.01) | |
| *B65G 57/03* | (2006.01) | |
| *B65G 59/02* | (2006.01) | |
| *B65G 61/00* | (2006.01) | |
| *G06Q 10/04* | (2023.01) | |
| *G06Q 10/087* | (2023.01) | |

(52) U.S. Cl.
CPC ............ *B25J 9/1697* (2013.01); *B65G 59/02* (2013.01); *B65G 61/00* (2013.01); *G06Q 10/043* (2013.01); *G06Q 10/087* (2013.01); *B65G 2201/025* (2013.01); *B65G 2201/0267* (2013.01); *B65G 2203/041* (2013.01); *G05B 2219/40006* (2013.01); *G05B 2219/40609* (2013.01); *G05B 2219/45083* (2013.01)

(58) Field of Classification Search
CPC . B65G 2203/041; B25J 9/0093; B25J 9/1661; B25J 9/1687; B25J 9/1697; B25J 19/023; G06Q 10/043; G06Q 10/087; G05B 2219/40006; G05B 2219/40609; G05B 2219/45083
USPC .......................................... 700/213–214, 217
See application file for complete search history.

(56) References Cited

U.S. PATENT DOCUMENTS

| | | |
|---|---|---|
| 9,333,649 B1 | 5/2016 | Bradski et al. |
| 9,715,232 B1 | 7/2017 | Fischer et al. |
| 9,870,002 B1 | 1/2018 | Holmberg et al. |
| 9,965,730 B2 | 5/2018 | Hance et al. |
| 2006/0174719 A1 | 8/2006 | Carter et al. |
| 2010/0222915 A1 | 9/2010 | Kuehnemann et al. |
| 2015/0203304 A1 | 7/2015 | Morency et al. |
| 2017/0251143 A1 | 8/2017 | Peruch et al. |
| 2019/0193629 A1* | 6/2019 | Zevenbergen ......... B60Q 1/543 |
| 2021/0178583 A1* | 6/2021 | Ye ............................ B25J 13/08 |

OTHER PUBLICATIONS

Bartels, Applications for Time-of-Flight Cameras in Robotics, Logistics and Medicine. Baslerweb.com, Aug. 2017 (Aug. 2017), pp. 5, [online] [retrieved on Aug. 10, 2018 (Aug. 10, 2018)]. Retrieved from the Internet: http://integrys.com/wp-content/uploads/2017/08/BAS1708_White_Paper_ToF-Applications.pdf.

Wilson, Dave. "Time of Flight Cameras Take On Industrial Applications-Novus Light Today", Jun. 15, 2015 (Jun. 15, 2015), XP055791414, Retrieved from the Internet: URL: https://www.novuslight.com/time-of-flight-cameras-take-on-industrial-applications_N4237.html [retrieved on Mar. 30, 2021] *p. 1- p. 3*.

Soldatov A I et al: "System for automatic sorting of pallets", 2016 International Siberian Conference on Control and Communications (SIBCON), IEEE, May 12, 2016 (May 12, 3016), pp. 1-4, XP032912333, D01: 10.1109/SIBCON.2016.7491870 [retrieved on Jun. 14, 2016] * abstract * * figures 5,6 * * section IV *.

Weichert F et al: "Automated detection of euro pallet loads by interpreting PMD camera depth images", Logistics Research, Springer Berlin Heidelberg, Berlin/Heidelberg, vol. 6, No. 2, Nov. 21, 2012 (Nov. 21, 20210), pp. 99-118, XP035717371, ISSN: 1865-035X, D01: 10.1007/S12159-012-0095-8 [retrieved on Nov. 21, 2012] * abstract * * figures 4,5 * * section 2.1 *.

* cited by examiner

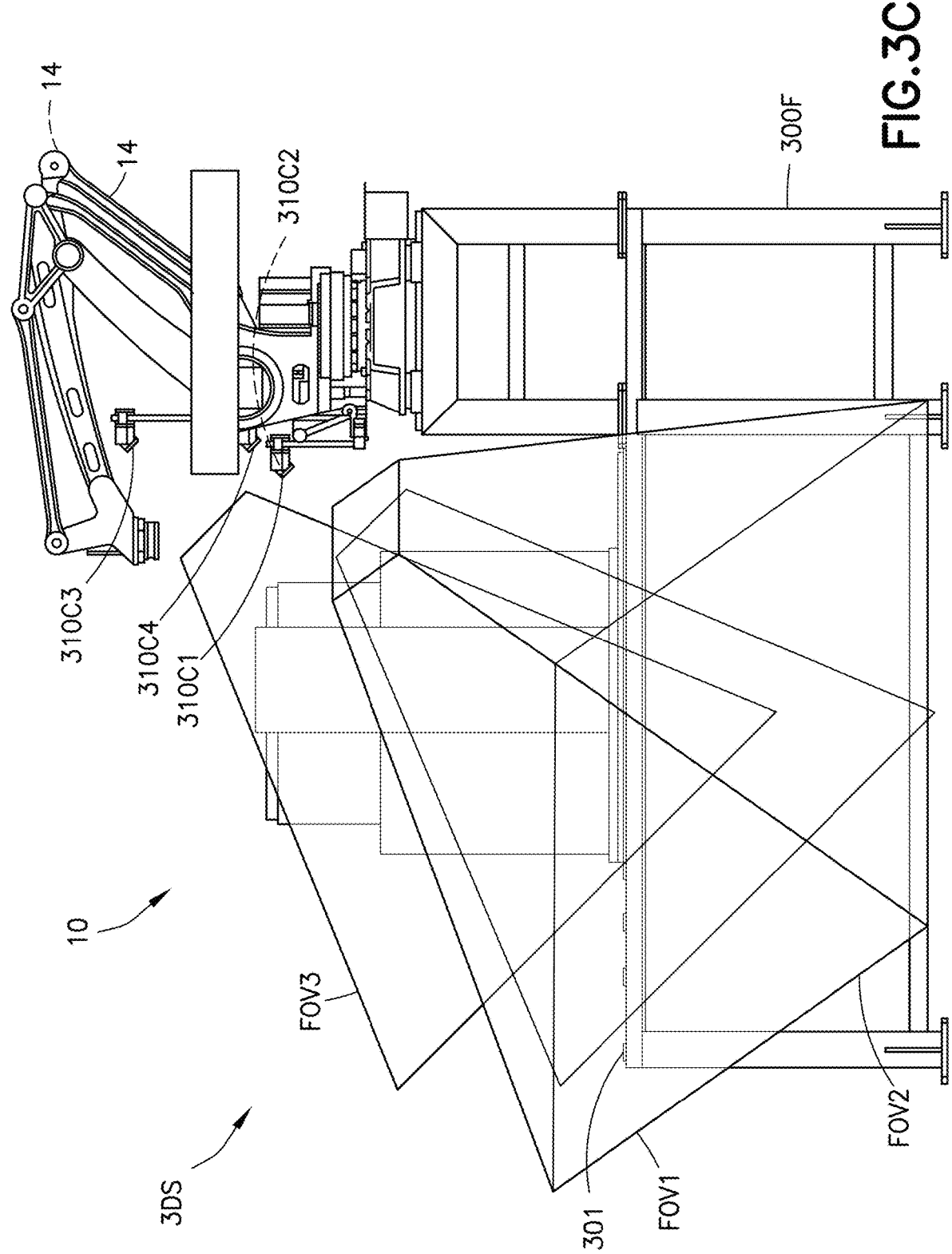

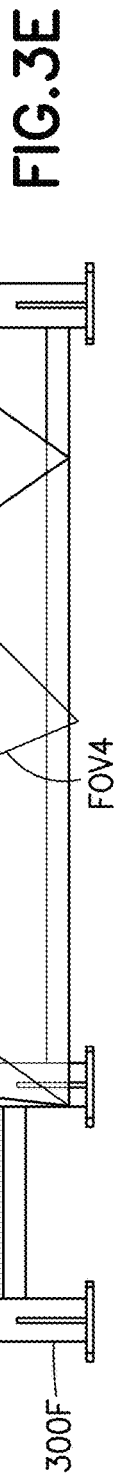

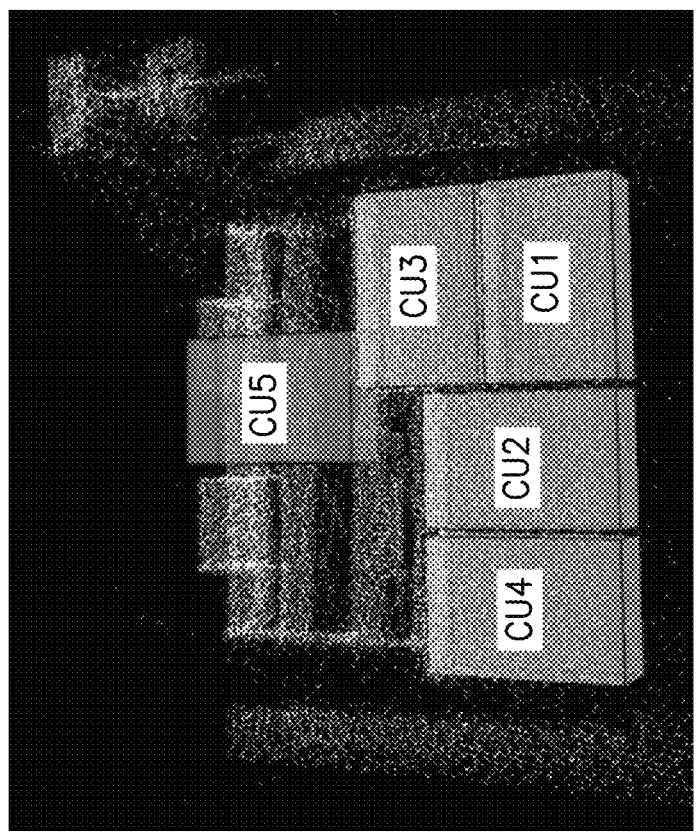

APPARATUS AND METHOD FOR BUILDING A PALLET LOAD

CROSS REFERENCE TO RELATED APPLICATIONS

This application is a continuation of U.S. patent application Ser. No. 17/151,761, filed Jan. 19, 2021, (now U.S. Pat. No. 11,691,830), which is a continuation of U.S. application Ser. No. 16/035,204, filed Jul. 13, 2018, (now U.S. Pat. No. 10,894,676), which is a non-provisional of and claims the benefit of U.S. Provisional Patent Application No. 62/533,503, filed on Jul. 17, 2017, the disclosures of which are incorporated herein by reference in their entireties.

BACKGROUND

1. Field

The exemplary embodiments generally relate to storage and retrieval systems and, more particularly, to palletizing/depalletizing cells of the storage and retrieval systems.

2. Brief Description of Related Developments

The retail distribution of products (whether for conventional "brick and mortar" stores, online stores, or mixed retail channels) demands improvements in storage, sortation, and transport efficiencies, particularly for distribution of what is known as mixed cases or heterogeneous cases (within a given transport) whether for store replenishment or individual orders. The application of intelligent/adaptive automation thereto has increasingly facilitated improvement in efficiency at many levels of distribution including storage, sortation and transport. Still, persistently difficult problems remain producing bottlenecks that disrupt, or adversely impact general system efficiency, such as the mixed case pallet load (or truck load) efficiency problem. As may be readily realized, the difficulty of the pallet load (or truck load) efficiency problem is not die singularly from the desire for high packing density, but rather pallet load efficiency is dependent on both packing density and building the pallet load in a time optimal manner (i.e. the build puzzle of packing the pallet load to densities over 90% may be solved readily given whatever time necessary and the necessary selection of mixed cases, but such pallet load would not be efficient if the pallet load build time is not time optimal).

Conventional pallet loaders (e.g., palletizers) and pallet unloaders (e.g., depalletizers) having electromagnetic radiation and optical mapping sensors (e.g. laser scanners, 3-D cameras, etc.) so as to map the 3-D pallet load for improved automation positioning relative to the pallet lad are known. For example, one conventional method and system for detecting and reconstructing environments to facilitate robotic interaction with such environments includes determining a three-dimensional (3-D) virtual environment where the 3-D virtual environment represents a physical environment of a robotic manipulator including a plurality of 3-D virtual objects corresponding to respective physical objects in the physical environment. The method then involves determining two dimensional (2-D) images of the virtual environment including 2-D depth maps. The method may then involve determining portions of the 2-D images that correspond to a given one or more physical objects. The method may then involve determining, based on the portion and the 2-D depth maps, 3-D models corresponding to the portions. The method may then involve, based on the 3-D models, selecting a physical object from the given one or more physical objects. The method may then involve providing an instruction to the robotic manipulator to move that object.

As another example, of a conventional method and system for detecting and reconstructing environments to facilitate robotic interaction with such environments includes the automatic determination of a model of a package stack on a loading carrier (i.e., in particular pallets). An initial desired position for a package in the model is determined. The package stack is detected on the loading carrier and a deviation between the detected package stack and the model is determined. The package is placed by an automated manipulator, and the above steps are repeated until a termination criterion is reached.

As may be realized from the representative examples, conventional palletizer(s) with 3-D mapping systems fail to provide truly adaptive, to near real time build variation, pallet load building automation so as to effect time optimal building of pallet loads.

BRIEF DESCRIPTION OF THE DRAWINGS

The foregoing aspects and other features of the disclosed embodiment are explained in the following description, taken in connection with the accompanying drawings, wherein:

FIG. 3C is a schematic right side view of the palletizer cell of FIG. 3 in accordance with aspects of the disclosed embodiment;

FIG. 3E is a schematic left side view of the palletizer cell of FIG. 3 in accordance with aspects of the disclosed embodiment;

FIG. 3I is a schematic front view of the palletizer cell of FIG. 3 in accordance with aspects of the disclosed embodiment;

FIGS. 5 and 5A-5G illustrate a sequence of real time three-dimensional imaging data (e.g., point cloud data) from a vision system of a palletizer cell corresponding to a pallet build where a tilted case unit is detected by the vision system upon placement of the case unit(s) in accordance with aspects of the present disclosure;

DETAILED DESCRIPTION

Figure 1:
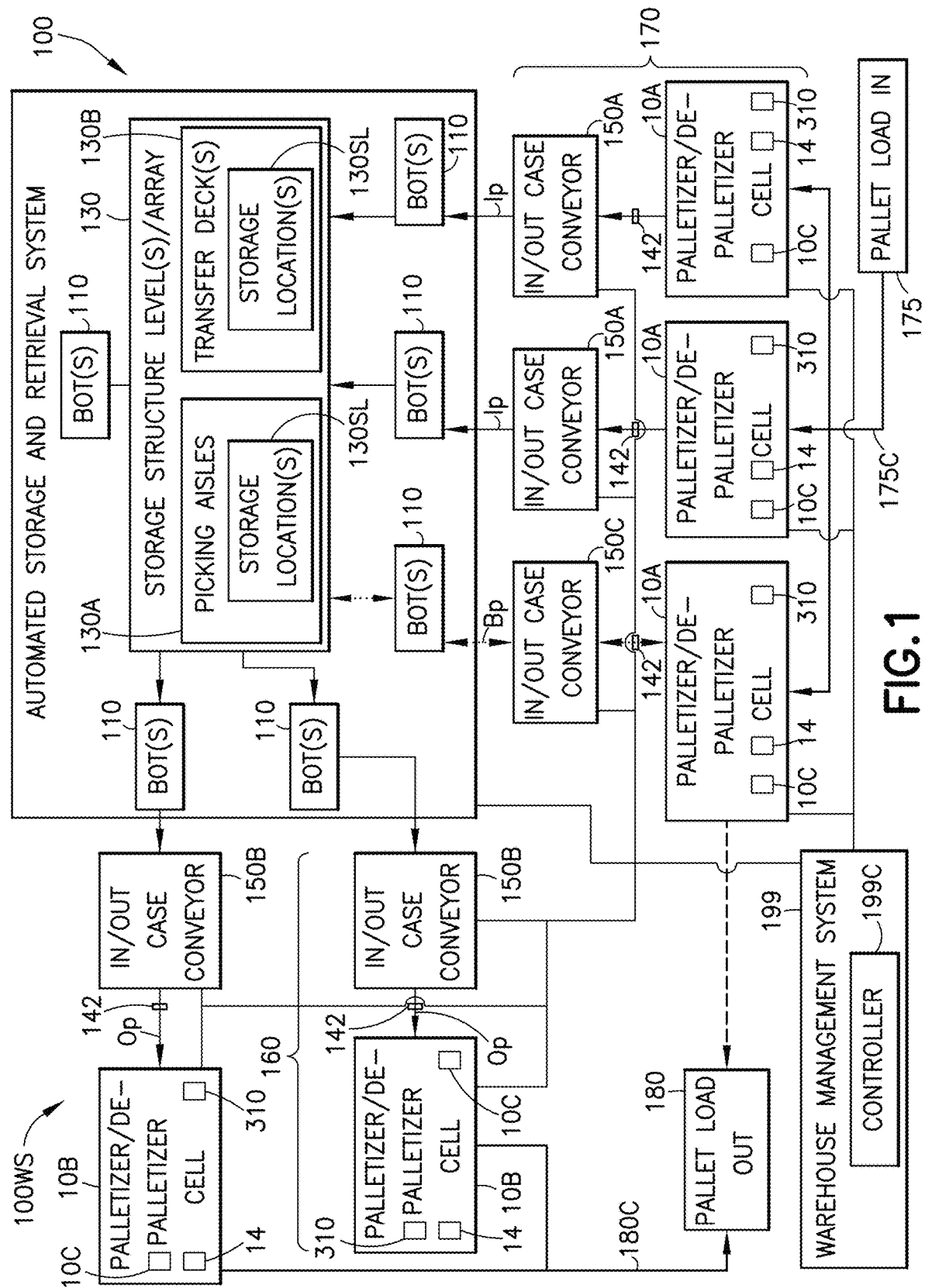
FIG. 1 is a schematic illustration of a distribution facility in accordance with aspects of the disclosed embodiment.

FIG. 1 is a schematic illustration of a warehouse system or distribution facility 100WS (referred to herein as warehouse system 100WS) in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used. It should be understood that while the distribution facility 100WS is described herein as an automated distribution facility the aspects of the disclosed embodiment are also applicable to distribution facilities having any suitable transport systems, such as both automated and manual transport systems or to wholly manual transport systems.

Figure 2:
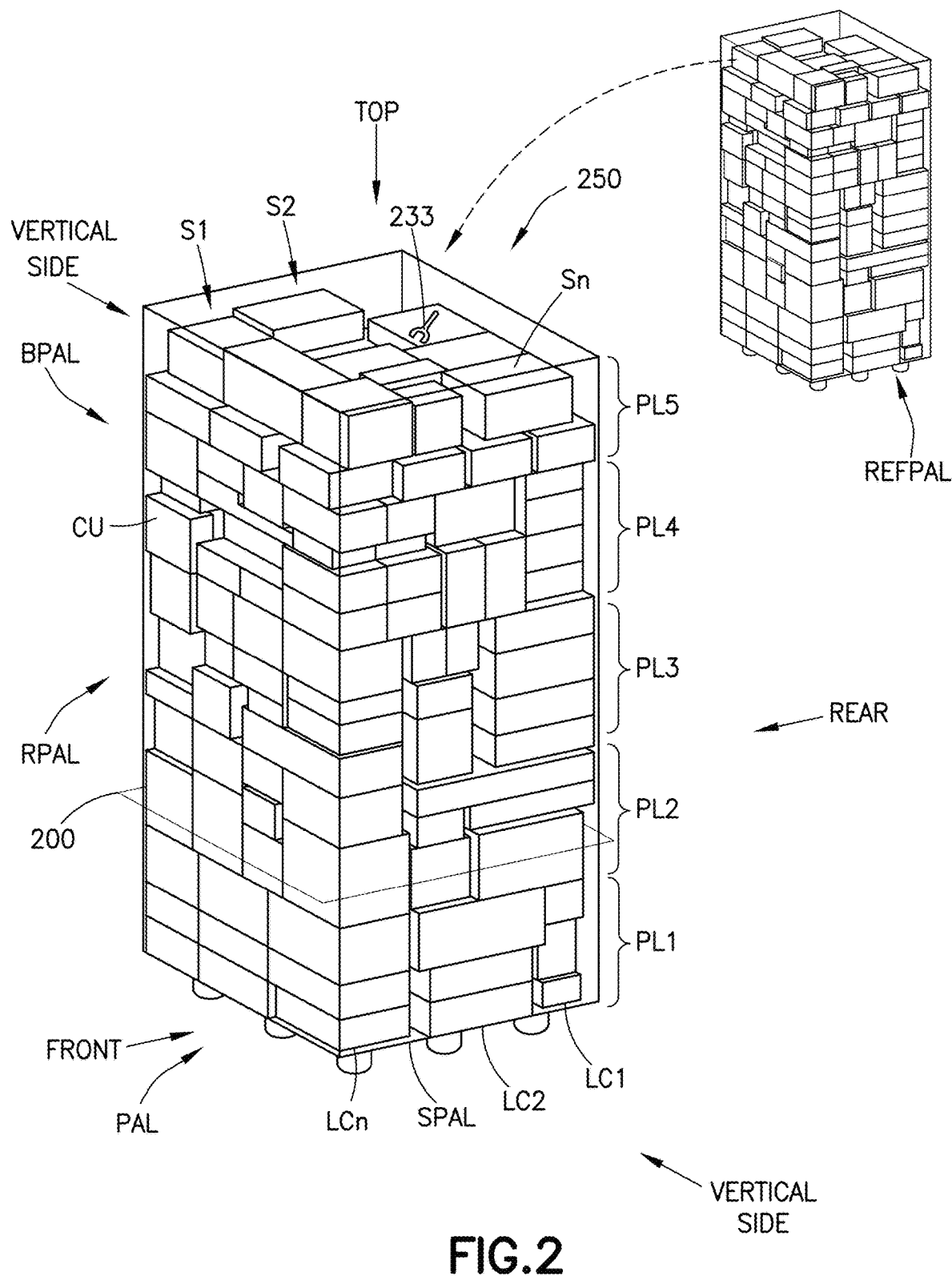
FIG. 2 is a schematic illustration of a pallet load in accordance with aspects of the disclosed embodiment.

Referring to FIGS. 1 and 2, in accordance with the aspects of the disclosed embodiment, the warehouse system 100WS includes at least one real time adaptive palletizer/depalletizer cell 10A, 10B (generally referred to herein as palletizer cell 10). The palletizer cell 10 has one or more robotic case manipulator(s) 14 (also referred to herein as articulated robots or robots) that place (individually or manufactured pickfaces) mixed pallet load article units CU (also referred to herein as case units or cases) in stacks SL1-Sn and/or layers PL1-PL4 building a mixed case pallet load PAL with vision system assistance.

The palletizer cell 10 is provided with a three-dimensional (3D) time of flight (TOF) camera(s) vision system 310 (referred to herein as the vision system 310), that generates 3D imaging of each case unit CU placement, by the robot 14, the pallet load build (on the pallet support) BPAL, and of the pallet support SPAL. The three-dimensional image information is generated and provided by the vision system 310, in real time coincident with robot 14 cyclic motion placing case units CU building the pallet load PAL and informs in real time (within the robot 14 place motion cycle frame), place pose of each placed case unit CU and robot placement pose of each following case unit CU in the pallet build from first case layer PL1 seated on the pallet support SPAL to the last case layer PL5.

The place pose three-dimensional image information of each case unit CU, and of the whole/part pallet load build BPAL, and of the pallet support SPAL, identifies variances from plan, that inform compensation for the variances to, for example, the robot 14 so that the robot 14 compensates with subsequent robot 14 case unit CU placement pose or other pallet build response in real time, so as to facilitate substantially continuous, with adaptive real time case placement, and adaptive pallet build (in full automation or in collaboration/cooperation with user assist) and coincidently resolve pallet quality/controls and build with the robot 14.

The vision system 310, incorporated into the automated palletizer cell 10, informs and enables a cell controller 10C so as to provide, real time command inputs (to the automation such as the robot(s) 14) that are responsive, in real time to pallet load building variances so that the robot(s) 14 is adaptive in real time resolving pallet load build variances, affecting pallet build, (automatically and/or in cooperation/collaboration with user assistance) in time optimal manner so as to effect the pallet load build in time optimal manner. The adaptive pallet cell automation, facilitated by the real time vision system assistance, is also responsive to identify and correct deviant pallet build conditions (automatically and/or in cooperation/collaboration with user assist) obstructing or impeding time optimal pallet load build.

Referring again to FIG. 1, in accordance with aspects of the disclosed embodiment the distribution facility 100WS includes a storage and retrieval system 100 that may operate in a retail distribution center or warehouse to, for example, fulfill orders received from retail stores for case units. In one example, the case units may be cases or units of goods not stored in trays, on totes or on pallets (e.g. uncontained). In other examples, the case units may be cases of units of goods that are contained in any suitable manner such as in trays, on totes or on pallets. It is noted that the case units may include cased units of goods (e.g. case of soup cans, boxes of cereal, etc.) or individual goods that are adapted to be taken off of or placed on a pallet. In accordance with the embodiments, shipping cases for case units (e.g. cartons, barrels, boxes, crates, jugs, or any other suitable device for holding case units) may have variable sizes and may be used to hold case units in shipping and may be configured so they are capable of being palletized for shipping. It is noted that when, for example, bundles or pallets of case units arrive at the storage and retrieval system the content of each pallet may be uniform (e.g. each pallet holds a predetermined number of the same item—one pallet holds soup and another pallet holds cereal) and as pallets leave the storage and retrieval system the pallets may contain any suitable number and combination of different case units (e.g. each pallet may hold different types of case units—a pallet holds a combination of soup and cereal). In the embodiments the storage and retrieval system described herein may be applied to any environment in which case units are stored and retrieved.

The storage and retrieval system 100 may be configured for installation in, for example, existing warehouse structures or adapted to new warehouse structures. In the aspects of the disclosed embodiment, the storage and retrieval system may include one or more in-feed transfer station 170 and one or more out-feed transfer station 160, in/out case conveyors 150A, 150B, 150C (generally referred to as in/out case conveyors 150), a storage structure array 130, and a number of autonomous vehicular transport robots 110 (referred to herein as "bots"). In the aspects of the disclosed embodiment the storage and retrieval system may also include robot or bot transfer stations, as described in U.S. Pat. No. 9,096,375 issued on Aug. 4, 2015 the disclosure of which is incorporated by reference herein in its entirety. In the embodiments the bot transfer stations may provide an interface between the bots 110 and the in/out case conveyors 150 such that case units can be indirectly transferred between the bots 110 and the in/out case conveyors 150 through the bot transfer stations. In the embodiments case units may be transferred directly between the bots 110 and the in/out case conveyors 150.

The storage structure array 130 may include multiple levels of storage rack modules that form a storage array of storage locations 130SL for case units, each storage location 130SL of which is arranged for storage of at least one case unit at each storage location 130SL. In one aspect, each level of the storage structure 130 array includes respective storage/picking aisles 130A, and transfer decks 130B for transferring case units between any of the storage areas of the storage structure array 130 and any shelf of any in/out case conveyors 150. The storage aisles 130A, and transfer decks 130B are also configured to allow the bots 110 to traverse the storage aisles 130A and transfer decks 130B for placing case units into picking stock and to retrieve ordered case units, where the case units are stored or otherwise held in the storage aisles 130A and/or on the transfer deck 130B in storage locations 130SL. The bots 110 may be any suitable bots capable of carrying and transferring case units throughout the storage and retrieval system 100. Suitable examples of bots can be found in, for exemplary purposes only, U.S. Pat. No. 8,425,173 issued on Apr. 23, 2013, U.S. Pat. No. 9,561,905 issued on Feb. 7, 2017, U.S. Pat. No. 8,965,619 issued on Feb. 24, 2015, U.S. Pat. No. 8,696,010 issued on Apr. 15, 2014, U.S. Pat. No. 9,187,244 issued on November 113/326,952 (which is non-provisional of U.S. Ser. No. 61/423,365 filed on Dec. 15, 2010) entitled "Automated Bot with Transfer Arm" filed on Dec. 15, 2011, and U.S. Pat. No. 9,499,338 issued on Nov. 22, 2016, the disclosures of which are incorporated by reference herein in their entireties. The bots 110 may be configured to place case units, such as the above described retail merchandise, into picking stock in the one or more levels of the storage structure array 130 and then selectively retrieve ordered case units for shipping the ordered case units to, for example, a store or other suitable location.

The in-feed transfer stations 170 and out-feed transfer stations 160 may operate together with their respective in/out case conveyors 150A, 150B for bi-directionally transferring case units to and from one or more levels of the storage structure array 130 effecting infeed of the case units into the storage structure array 130 and output of the case units from the storage structure array 130. It is noted that while the in-feed transfer stations 170 and the outfeed transfer stations 160 (and their respective in/out case conveyors 150A, 150B and palletizer/depalletizer cells 10A, 10B) are described as being dedicated inbound (e.g. in-feed) transfer stations 170 and dedicated outbound (e.g. out-feed) transfer stations 160, in the aspects of the disclosed embodiment each of the transfer stations 170, 160 may be used for both inbound and outbound transfer of case units from the storage and retrieval system. It is noted that while in/out case conveyors are described herein, the conveyors may be any suitable conveyors (including any suitable transport path orientation, such as vertical and/or horizontal conveyor paths) or transfer/picking devices having any suitable transport path orientation.

Figure 3:
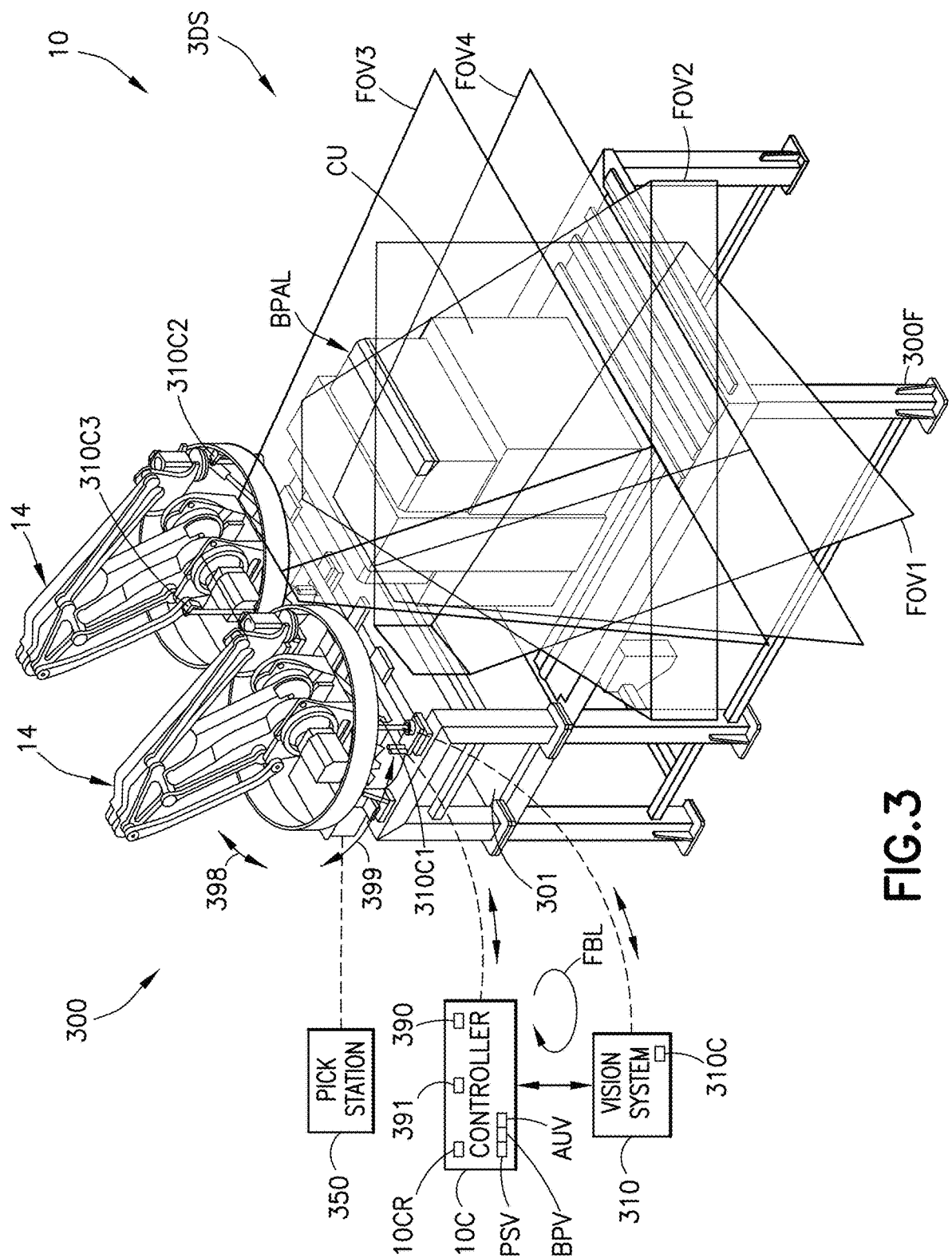
FIG. 3 is a schematic isometric view of a palletizer cell in accordance with aspects of the disclosed embodiment.
Figure 3A:
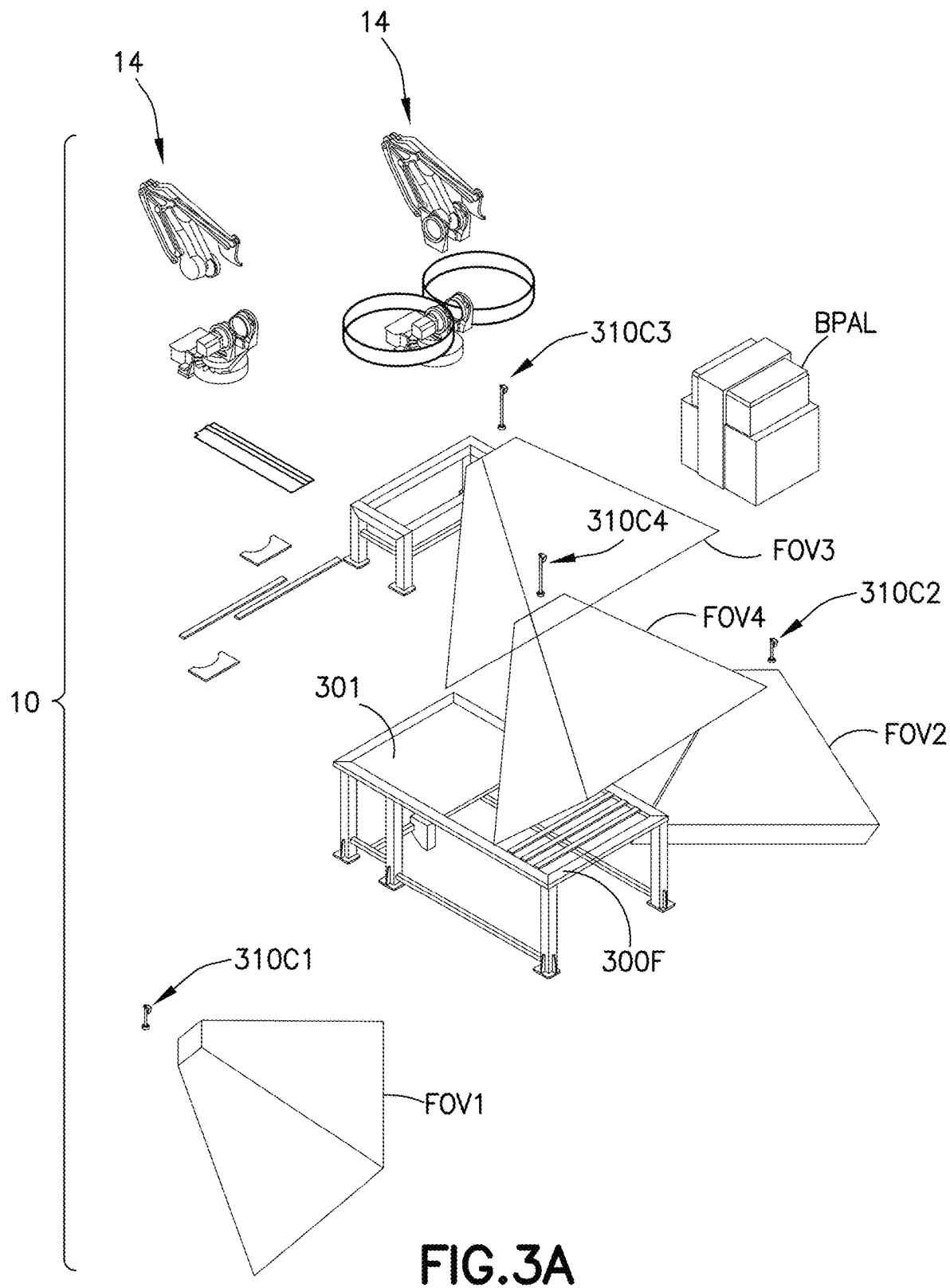
FIG. 3A is a schematic exploded isometric view of the palletizer cell of FIG. 3 in accordance with aspects of the disclosed embodiment.

In one aspect, as described above, each of the in-feed transfer stations 170 and the out-feed transfer stations 160 include a respective in/out case conveyor 150A, 150B and a respective palletizer/depalletizer cell 10A, 10B (referred to generally herein as palletizer cell 10). In one aspect, the palletizer/depalletizer cells 10 are automated cells each being configured to receive loaded pallets (such as with uniform or mixed case units or products) from, for example, a pallet load in 175 area which may include an in-out loaded pallet conveyor 175C (illustrated in FIG. 1 as an input conveyor) and/or build a loaded pallet (such as with uniform or mixed case units or products) for transport to, for example, a pallet load out 180 area which may include an in-out loaded pallet conveyor 180C (illustrated in FIG. 1 as an output conveyor). In one aspect, the conveyors 175C, 180C are each connected to the storage structure array 130 and are configured so as to bi-directionally transport loaded pallets in an input direction towards the storage structure array 130, and in a different output direction away from the storage structure array 130. In one aspect, the conveyors 175C, 180C may each include a conveyor arrangement with a distributed conveyor bed arranged to form a conveying path or in other aspects, the conveyors 175C, 180C may be discrete transport units such as, for example, a fork lift/pallet truck. Suitable examples of automated palletizer/depalletizer cells 10A, 10B may be found in U.S. patent application Ser. No. 15/235,254 filed on Aug. 12, 2016, and U.S. Pat. No. 8,965,559 issued on Feb. 24, 2015, the disclosures of which are incorporated herein by reference in their entireties. Each palletizer cell includes one or more robotic case manipulators 14, which may also be referred to articulated robots or robots. The one or more robotic case manipulators 14 are configured, as described herein, so as to transport and place the pallet load article units CU (also referred to herein as cases or case units) serially onto a pallet support so as to build the pallet load 250 on a pallet building base 301 (see FIG. 3).

Where the palletizer cell 10 functions in an output role as a palletizer, pallet load article units CU, that can be of various sizes, arrive at the palletizer cell 10 via the in/out case conveyors 150B, are picked by one of the robotic case manipulators 14 and placed on the pallet PAL as will be described herein. Where the palletizer cell 10 functions in an output role as a palletizer, a full pallet PAL (see FIG. 2) made from a variety of case units is ready to be picked up by a forklift from the palletizer cell 10 for conveyance to a pallet load out 180 area. Where the palletizer/depalletizer cell 10 functions in an input role as a depalletizer, a full pallet (which may be similar to pallet PAL and formed of homogenous or mixed cases) made from a variety of pallet load article units CU is transferred to the palletizer cell 10 in any suitable manner, such as a fork lift, from a pallet load in 175 area. The one or more robotic case manipulators 14 pick the pallet load article units CY from the pallet PAL for transfer into the storage structure array 130.

In one aspect, each in-feed transfer station 170 forms, a case input path Ip where the palletizer/depalletizer cell 10A depalletizes case units, layer by layer, or otherwise depalletizes the case units into single case units from standard pallets (e.g. homogenous pallets having a stability suitable for automatic engagement of a pallet layer by an automatic layer interface unit, such as the product picking apparatus 14). The palletizer/depalletizer cell 10A is in communication with a transport system of the automated storage and retrieval system 100, such as an in/out case conveyor 150A so as to form an integral input system (e.g. the in-feed transfer station 170) that feeds case units to the automated storage and retrieval system 100. Each in-feed transfer station 170 defines the case input path Ip that is integrated with the automated storage and retrieval system 100 and warehouse management system 199, where the warehouse management system 199 includes any suitable controller 199C configured with any suitable non-transitory program code and memory to manage, at least, case unit input to the storage structure array 130B, case unit storage distribution within the storage structure array 130B and case unit retrieval from the storage array structure 130B, case unit inventory/replenishment and case unit output.

In one aspect, each case unit input path Ip includes at least one corresponding case unit inspection cell 142 in communication with the warehouse management system 199. In one aspect, the at least one corresponding case unit inspection cell 142 may be any suitable inspection cell including any suitable volumetric inspection, such as with a multi-dimensional light curtain, imaging systems and/or any other suitable sensing/sensor arrangement configured to detect case unit defects and identify the case units for, e.g., inventory, transport sequencing, storage distribution and sequencing the case unit for output from the storage structure array 130B.

In one aspect, as noted above, the palletizer/depalletizer cell 10A may be fully automatic so as to break down or decommission layer(s) from a pallet unloading at the palletizer/depalletizer cell 10A. It is noted that, referring to FIG. 2, the term decommission refers to the removal of a pallet layer PL1, PL2, PL3, PL4 (in whole or in part) from a pallet PAL so that each pallet load article unit CU is removed from the layer PL1, PL2, PL3, PL4 at a predetermined level 200 (which may correspond to a decommissioning/commissioning level or transfer plane) of the pallet PAL so that the pallet PAL is indexed to a next level of the pallet PAL for removal of the next layer PL2, PL3 (in whole or in part) corresponding to the next level of the pallet PAL.

In one aspect, the palletizer/depalletizer cell 10A is configured to decommission the layers PL1, PL2, PL3, PL4 so that the decommissioning is synchronous or otherwise harmonized (e.g. matched with) by the warehouse management system 199 with a predetermined rate of case unit flow or feed rate, established by the warehouse management system 199, in the automated storage and retrieval system 100. For example, in one aspect, the warehouse management system 199 is configured to set and/or monitor a predetermined rate of case unit flow within the automated storage and retrieval system 100. For example, the warehouse management system 199 monitors and manages the automated systems of the automated storage and retrieval system 100 (such as, e.g., the in/out case conveyors 150A, 150B, bots 110 and palletizer/depalletizer cells 10A, 10B), where each of the automated systems, or one or more of automated systems have a given transaction time (such as a time/period to effect a basic unit of transport or transfer of cases, e.g. to transfer a case unit on/off the in/out case conveyor to a pick/place station, or lift a case unit a predetermined distance, or bot transfer pick/place on a storage location, a time to transfer a pallet layer to or from a pallet, etc.) that in effect, singularly or in combination define, under of the warehouse management system 199 or any other suitable controller of the automated storage and retrieval system 100 (e.g. bot controllers, conveyor controllers, palletizer/depalletizer controllers, etc.), the predetermined rate of case unit flow in the automated storage and retrieval system 100 established by the warehouse management system 199. For example, the controller 199C of the warehouse management system 199 is communicably connected to the in-out case conveyor(s) 150A, 150B so that the in-out case conveyor(s) 150A, 150B bi-directionally transport the case units to and from the storage structure array 130 at a predetermined case feed rate. The controller 199C may also be communicably connected to a palletizer-depalletizer cell 10A, 10B corresponding to the in-out case conveyor(s) 150A, 150B so that the layer commissioning and decommissioning of the palletizer/depalletizer cell 10A, 10B, which are respectively substantially continuous, matches the predetermined case feed rate. While the aspects of the disclosed embodiment are described herein with respect to a distribution facility 100WS having automated storage and retrieval system 100 with automated transport systems, the aspects of the disclosed embodiment are also applicable to distribution facilities having any suitable transport systems such as both automated and manual transport systems or to wholly manual transport systems, where both the automated transport transactions and the manual transport transactions each have respective transaction times where the commissioning and decommissioning of case units to and from pallets may be matched to the transaction times in a manner substantially similar to that described herein.

In one aspect, each out-feed transfer station 160 forms, a case output path Op where the palletizer/depalletizer cell 10B palletizes case units, layer by layer onto pallets PAL such as with an automatic layer interface unit, such as the one or more robotic case manipulators 14. In one aspect, the pallets PAL may be formed as standard pallets (e.g. homogeneous case units) or as mixed pallets, such as described in U.S. patent application Ser. No. 14/997,920 filed on Jan. 18, 2016 the disclosure of which is incorporated herein by reference in its entirety. In one aspect, the warehouse management system 199 is configured to establish a pallet solution, with mixed case units, that provides a stable pallet load stack suitable for an end effector of the one or more robotic case manipulators 14 to transfer as a layer. As described above, a suitable example, of the palletizer/depalletizer cell 10B may be found in U.S. patent application Ser. No. 15/235,254 filed on Aug. 12, 2016, the disclosure or which was previously incorporated herein by reference in its entirety.

In one aspect, the palletizer/depalletizer cell 10B is in communication with a transport system of the automated storage and retrieval system 100, such as an in/out case conveyor 150B so as to form an integral output system (e.g. the out-feed transfer station 160) that receives case units from the automated storage and retrieval system 100 for placement on pallets according to any suitable case out order sequence. For example, as described above, pallet load article units CU routed to the one or more robotic case manipulators 14 are transferred to the pallet PAL by the end effector of the one or more robotic case manipulators 14, with the pallet load article units CU (output case units) being arranged in a predetermined sequence established by the warehouse management system 199, layer by layer (noting that the layer may cover the pallet in whole or in part) to form a standard output pallet load.

Each out-feed transfer station 160 defines the case output path Op that is integrated with the automated storage and retrieval system 100 and warehouse management system 199, where the warehouse management system 199 includes any suitable controller 199C configured with any suitable non-transitory program code and memory to manage the operation of the distribution facility 100WS, including case unit output from the storage structure array 130B, as described herein. In one aspect, each case unit output path Op includes at least one corresponding case unit inspection cell 142 (as described above) in communication with the warehouse management system 199. In one aspect, as noted above, the palletizer/depalletizer cell 10B may be fully automatic so as to build or commission layer(s) to a pallet loading at the palletizer/depalletizer cell 10B. It is noted that, referring to FIG. 2, the term commission refers to the construction of a pallet layer PL1, PL2, PL3, PL4 (in whole or in part) to a pallet PAL so that each pallet load article unit CU is inserted to the layer PL1, PL2, PL3, PL4 at a predetermined level 200a (which may correspond to decommissioning/commissioning level or transfer plane) of the pallet PAL until the pallet layer PL1, PL2, PL3, PL4 is formed so that the pallet PAL is indexed to a next level of the pallet PAL for building of the next layer PL1, PL2 (in whole or in part) corresponding to the next level of the pallet PAL. In one aspect, the palletizer/depalletizer cell 10B is configured to commission the layers PL2, PL1, PL3, PL4 so that the commissioning is synchronous or otherwise harmonized (e.g. matched with) by the warehouse management system 199 with a predetermined rate of case unit flow or feed rate, established by the warehouse management system 199, in the automated storage and retrieval system 100 in a manner substantially similar to that described above with respect to the decommissioning of the layers PL1, PL2, PL3, PL4 where the warehouse management system 199 manages case unit retrieval order and the sequence of mixed case unit output to loadout sequence of the mixed case unit pallet load, and other associated aspects of output such as inventory reconciliation.

Referring now to FIGS. 1, 3 and 3A-3F, the palletizer cell(s) 10 (it is noted that the term "palletizer" is used for its convenience, and as noted above, the features of the palletizer may also be effected in a depalletizer as otherwise applicable) is coupled to the storage and retrieval system 100 so as to communicate case unit CU (see FIG. 2) flow (see the case output path(s) Op and the case input paths(s) Ip) with the storage retrieval system 100. The palletizer 10 is, in accordance with aspects of the disclosed embodiment, an adaptive palletizer system 300 that effects time optimal pallet load build and thus may compliment and leverage the storage and retrieval system 100 case order flow throughput (though in other aspects the adaptive palletizer 300 may be coupled to any suitable storage and retrieval system including conventional, manual, or semi-automated retrieval system with manually loaded feed station for the palletizer 10).

Referring also to FIG. 2, the palletizer cell(s) 10 are configured to build pallet loads PAL where the pallets load PAL have a pallet load build structure RPAL (system features may also be similarly applied to truck load) that is a three-dimensional array, structured in stacks S1-Sn and layers PL1-PL5, of mixed case(s) or pallet load article units CU including manufactured/constructed article units (pickfaces) each of multiple cases/articles placed onto the pallet/pallet support SPAL (case units/pallet load article units means case, tote, pack, shrink wrap, etc). The pallet load build structure RPAL is determined by control from ordered case unit(s) CU (e.g. case units CU output from the storage and retrieval system 100). For example, in one aspect, a palletizer controller 10C may be coupled to the controller 199C of the warehouse management system 199; while in other aspects, the palletizer controller 10C may form a module of an integrated warehouse management controller managing conveyance of the storage and retrieval system 100 components including palletizer/depalletizer cell(s) 10, so as to receive the information defining the pallet load build structure RPAL including corresponding datum reference bounds, case pose and variance threshold from references for the pallet load build effected by the palletizer 10. The case pose sequence, in which the robot(s) 14 of the palletizer 10 build the pallet load PAL may be effected by the storage and retrieval system 100 so cases output by the storage and retrieval system 10 feeding the bot pick station 350 of the palletizer 10 arrive (just in time or suitably buffered) in the predetermined pick sequence for building the pallet load PAL, enabling a higher pick/place rate of the robot(s) 14 (e.g., the output case flow from the storage and retrieval system 100 substantially eliminates or reduces case unit CU sortation with the robot(s) 14). Suitable examples of output case flow sortation from the storage and retrieval system 100 can be found in, for example, United States publication numbers US2016/0214808 published on Jul. 28, 2016; US2016/0207709 published on Jul. 21, 2016; US2016/0207711 published on Jul. 21, 2016; US2016/0214797 published on Jul. 28, 2016; US2016/0167880 published on Jun. 16, 2016; and US2016/0207710 published on Jul. 21, 2016, the disclosures of which incorporated herein by reference in their entireties. Robot 14 pick/place rate for example has a pick/place cycle, from pick at the input station (e.g. the bot pick station 350) to place on pallet load build BPAL and return, of about 5 sec. (with 2 robots the pick/place cycle is about 2.5 secs), and an adaptive feedback loop FBL (see FIG. 3) of the vision system 310 is effected within the pick/place cycle of the robot(s) 14, in real time, so as to effect substantially continuous build of the pallet load build structure RPAL.

Referring now to FIGS. 3 and 3A-3F, each palletizer cell 10 generally includes a frame 300F, at least one robot 14, a controller 10C, and a vision system 310 including at least one three-dimensional, time of flight, camera 310C. The frame 300F defines a pallet building base 301 for the pallet support SPAL (FIG. 2). The at least one robot 14 is connected to the frame 300F and is configured so as to transport and place the pallet load article units CU (see also FIG. 2) serially onto the pallet support SPAL (see FIG. 2) so as to build the pallet load PAL (see FIG. 2) on the pallet building base 301. The controller 10C is operably connected to the at least one robot 14 and is configured (with any suitable hardware and non-transient computer program code) to control articulated robot motion, relative to the pallet building base 301, and effect therewith a pallet load build BPAL of the pallet load PAL.

The at least one three-dimensional, time of flight, camera 310C of the vision system 310 is disposed on one or more of the frame 300F and the robot(s) 14 so as to generate three-dimensional imaging (e.g., 3D images 500-507, 600-608, 700-706, 800-807, 900-905, 1000-1004—see FIGS. 5-10D, where each image in the respective series of images may be sequentially generated upon placement of each case unit CU in the pallet load build BPAL to identify variances in the pallet load build BPAL as described herein) of the pallet support SPAL on the pallet building base 301 and of the pallet load build BPAL on the pallet support SPAL. While the at least one three-dimensional camera 310C is descried herein as a time of flight camera, any suitable three-dimensional sensor/imager may be used including laser scanners, sonar or other suitable machine vision systems. As described herein, the at least one three-dimensional camera 310C is communicably coupled to the controller 10C so the controller 10C registers, from the at least one three-dimensional camera 310C, real time three-dimensional imaging data (such as the point clouds illustrated in FIGS. 5-10D and/or any suitable data obtained from the point clouds) embodying different corresponding three-dimensional images of the pallet support SPAL and of each different one of the pallet load article units CU, and of the pallet load build BPAL being built on the pallet support SPAL.

In one aspect, the at least one three-dimensional camera 310C is configured so as to effect three-dimensional imaging of the pallet support SPAL on the pallet building base 301 and of the pallet load build BPAL on the pallet support SPAL with the at least one articulated robot 14 effecting substantially continuous pick/place cycles from the input station (such as pick station 350) and placing each of the pallet load article units CU building the pallet load PAL on the pallet building base 301. In one aspect, the at least one three-dimensional camera 310C is configured so as to effect three-dimensional imaging of each respective pallet load article unit substantially coincident with placement of the respective pallet load article unit CU by the at least one articulated robot 14 effecting substantially continuous pick/place cycles from the input station (such as pick station 350) and placing the pallet load article unit CU building the pallet load build BPAL substantially continuously.

In one aspect, the at least one three-dimensional camera 310C includes four (4) cameras 310C1, 310C2, 310C3, 310C4 (FIG. 3A) coupled to the frame 300F in any suitable locations so that the cameras 310C1, 310C2, 310C3, 310C4 each have a respective field of view FOV1-FOV4 (FIG. 3A) for imaging at least two sides, e.g., a top (see FIG. 2) and one of a front side surface, a rear side surface and a vertical side surface (extending between the front and rear) (see FIG. 2) of the pallet support SPAL and pallet load build BPAL/pallet load build structure RPAL. The at least one camera 310C may be oriented so that the top and at least one side surface (e.g. front, rear or a vertical side) of the pallet support SPAL and of each case unit CU placed on the pallet support SPAL is visible within the field of view FOV1-FOV4 covering a corresponding portion of the pallet support SPAL/pallet load build structure RPAL. Referring also to FIGS. 3G-3J, in one aspect the cameras 310C1, 310C2, 310C3, 310C4 may have any suitable focal length for a predetermined image intensity and be placed at, for example, a 45° angle (see FIG. 3H) relative to the frame 300F (e.g. such as a horizontal plane of the frame 300F as defined by, for example, the pallet building base 301) and/or each other so that the at least two sides are imaged by the at least one camera; while in other aspects, the angle between the cameras 310C1, 310C2, 310C3, 310C4 and/or the frame 300F may be more or less than 45°. In one aspect, each field of view FOV1-FOV4 (generally referred to as field of view FOV (see FIG. 3H and FIGS. 3K-3N which illustrate each of the fields of view with emphasis relative to the other fields of view) of the cameras 310C1, 310C2, 310C3, 310C4 may be a 45° field of view; while in other aspects the field of view FOV may be more or less than 45° so long as at least two sides of the pallet support SPAL and of the pallet support SPAL and pallet load build BPAL/pallet load build structure RPAL are imaged.

In one aspect, the at least one camera 310C resolves three-dimensional definition of case unit features (e.g., edges of the case units) from two or more orthogonal planes so that a maximum certainty of feature pose (e.g., the X, Y, Z, θ, α, μ positions of the feature—see FIG. 3G) is obtained from a single image of items in the respective field(s) of view FOV1-FOV4 of the at least one camera 310C. Here the resolution of the three-dimensional definition of case unit features independent of camera 310C placement (so long as the top and one side are imaged) and is performed in real time (e.g. within the pick/place cycle of the at least one robot 14).

While four (4) cameras 310C1-310C4 are described, it should be understood that more or less than four (4) cameras 310C may be used and placed so that the field of view of the camera(s) 310C of the vision system 310 cover(s) the pallet building base 301 of the frame 300F, a pallet support SPAL seated on the pallet building base 301 and a whole (or at least a predetermined part) of the expected pallet load build structure RPAL, so as to capture, with any suitable desired resolution, three-dimensional time of flight images of object (s) desirably everywhere on the pallet support SPAL, and everywhere on the pallet load build structure RPAL. The combined field(s) of view FOV1-FOV4 result in substantially complete 360° coverage of the pallet load build structure RPAL with overlap of the field(s) of view FOV1-FOV4. For example, the combined field(s) of view FOV1-FOV4 may cover standard pallet supports SPAL (having dimensions of, e.g., 48 inches by 48 inches, 48 inches by 40 inches, and/or 36 inches by 36 inches), it should be understood that the camera(s) 30Ca-300C4 and associated field(s) of view FOV1-FOV4 may cover (e.g. image) larger fields (including, for example, truck beds or any desired field size) as appropriate. Further, the field(s) of view FOV1-FOV4 may cover any suitable pallet load build structure RPAL height PH (see FIG. 3H) such as, for example, heights of 60 inches, 70 inches and 80 inches; while in other aspects the field(s) of view FOV1-FOV4 may cover heights less than 60 inches or more than 80 inches.

In one aspect, each of the camera(s) 310C1-310C4 may have a 176 pixel×132 pixel resolution; while in other aspects each, or one or more, of the camera(s) 310C1-310C4 may have a higher resolution (e.g. a 320 pixel×240 pixel resolution or higher), as desired to provide a desired minimum depth map defining about 0.5 inches at the outermost bounds of the pallet build three-dimensional space 3DS (so that the depth map definition throughout the captured image of the whole, or predetermined part, of the pallet support/pallet build is not less than about 0.5 inches). As such, a sufficient resolution is provided by the vision system 300 to resolve lattice features of the pallet support SPAL to definition so that planarity across the pallet is determined and fully established for placing a stable first layer PL1 of case units CU on the pallet support SPAL as will be described herein. Sufficient resolution may also be provided to resolve case unit features (e.g., such as case edges) so that planarity across a top of each layer PL1-PL4 (see FIG. 3H) is determined and fully established for placing a stable layer PL2-PL5 on top of a previously placed layer PL1-PL4. The resolution of the camera(s) 310C1-310C4 may be such that minimal processing is required to resolve the case unit features (e.g. case unit edges) such that the case unit features are resolved in real time substantially from the images as received by the controller 10C.

Referring now to FIGS. 3G, 4, 4A and 4B, in one aspect, the controller 10C is configured so as to determine, in real time, from the corresponding real time three-dimensional imaging data, a pallet support variance PSV (e.g. a quality of the pallet support SPAL) and/or an article unit variance AUV (e.g. a variance in placement of the case unit CU from a planned placement of the pallet load article unit CU as will be described herein) of at least one of the pallet load article units CU in the pallet load build BPAL with respect to a predetermined reference. The controller 10C is also configured to generate, in real time, an articulated robot motion signal 390 dependent on at least one of the real time determined pallet support variance PSV or article unit variance AUV, where the articulated robot motion signal 390 is generated in real time so as to be performed real time by the at least one articulated robot 14 between placement, by the at least one articulated robot 14, of at least one pallet load article unit CU and a serially consecutive pallet load article unit CU enabling substantially continuous building of the pallet load build BPAL. In one aspect, the at least one articulated robot motion signal 390 generated by the controller 10C is a stop motion signal along a pick/place path 399 of the at least one articulated robot 14, a slow motion signal along the pick/place path 399 of the at least one articulated robot 14, or a move to a safe position along safe stop path 398 of the at least one articulated robot 14, where the safe stop path 398 is different from the pick/place path 399. In one aspect, the articulated robot motion signal 390 generated by the controller 10C is a place position signal setting a place position of at least another pallet load article unit CU based on the pallet support variance or the article unit variance AUV.

The controller 10C is configured so as to determine, in real time, from the corresponding real time three-dimensional imaging data, the pallet support variance PSV, where for example, the vision system 300 images the pallet support SPAL disposed on the pallet building base 301 to obtain a three-dimensional image of the pallet support SPAL with sufficient definition to discern the lattice features 410 of the pallet support SPAL as described above. Here the pallet support variance PSV may be one or more of unevenly spaced lattice features 410 (e.g., spaces between lattice features forming peak/valleys in a case unit seat surface—FIG. 4), missing portions 400 of lattice features 410 (e.g., missing board surface(s)—FIGS. 4A and 4B), height differences (e.g. protrusions and/or depressions) or any other defect in the pallet support SPAL that may affect the stability of the case units CU placed upon the pallet support SPAL (e.g. pallet planarity). In one aspect, the controller 10C is configured to reject the pallet support SPAL if the pallet support variance PSV exceeds thresholds from a predetermined reference (and send stop bot signal until replaced). For example, if the missing portion 400 of the lattice features 410 are greater than a predetermined area or if the spacing between lattice features 410 is greater than a predetermined distance, the pallet support SPAL is rejected and case units will not be placed until the defective pallet support SPAL is replaced. If the pallet support SPAL is within the predetermined thresholds, the controller 10C is configured to resolve a case unit seating surface planar variance (e.g., as noted above, missing board surface, protrusions, depressions, lattice spacing forming peak/valleys in the case unit seat surface) relative to a pose of the base layer PL1 of case units CU (e.g., the positions of each case unit in the three-dimensional space X, Y, Z, $\theta$, $\alpha$, $\mu$) and confirm or modify (compensates) planned case pose based on the article unit variance AUV (e.g., determine $\Delta X$, $\Delta Y$, $\Delta Z$, $\Delta\theta$, $\Delta\alpha$, $\Delta\mu$) to case plan (X, Y, Z) and/or based on the pallet support variance PSV (i.e., seat pitch, board edge, etc.) for adaptive pose with higher resultant case stability. The controller may also identify a reduced robot 14 movement speed or modify a robot 14 place trajectory 399 (FIG. 3) to generate a desired case unit CU place pose (e.g., position in the three-dimensional space X, Y, Z, $\theta$, $\alpha$, $\mu$).

In one aspect, the controller 10C is configured to set a pallet support base datum DTM (FIG. 3H) of the pallet support SPAL, imaged by the at least one three-dimensional camera 310C, from the pallet support variance PSV, which pallet support base datum DTM resolves local base surface variance at each different article unit place location LC1-LCn (see FIG. 2) on the pallet support SPAL and defines a real time local article unit position base reference for articulated robot 14 placement of the at least one article unit CU of a base article unit layer PL1 of the pallet load build BPAL. In one aspect, the pallet support base datum DTM defines base planarity of the pallet support SPAL, and the controller 10C is configured to send a signal (such as the user cooperation signal 391—FIG. 3) to a user of the palletizer cell 10 or other operator of the warehouse system 100WS, with information describing a base planarity (FIG. 3H) characteristic (e.g. missing board surfaces, protrusions, depressions, lattice spacing forming peak/valleys in the case unit seat surface), to enable selection of the at least one pallet load article unit CU of the base layer PL1, from a number of different size pallet load article units CU of the pallet load PAL, and of a corresponding placement location LC1-LCn on the pallet support SPAL so as to form the base layer PL1 based on the base planarity (FIG. 3H).

In one aspect, the base planarity characteristic information describes planarity variance for a corresponding area (such as one of placement locations LC1-LCn) of the base datum DTM in real time, and the controller 10C is configured to identify, from the different size pallet load article units CU of the pallet load PAL, one or more pallet load article units CU sized so as to seat stably on the corresponding area so as to form the base layer PL1. In one aspect, the pallet support base datum DTM defines a base planarity of the pallet support, and the controller 10C is configured to select the at least one pallet load article unit CU of the base layer PL1, from a number of different size pallet load article units CU of the pallet load PAL, and a corresponding placement location LC1-LCn on the pallet support SPAL so as to form the base layer PL1 based on the base planarity. In one aspect, the controller 10C is configured so as to determine in real time, from the real time three-dimensional imaging data (such as the images shown in FIGS. 4-4B of the pallet support SPAL and any variances on the pallet support SPAL captured by the vision system 310) and substantially coincident with setting of the pallet support base datum DTM, lateral bounds ER (see FIGS. 3H-3J) of the pallet support base datum DTM, wherein at least one of the lateral bounds ER forms lateral reference datum LTDM (FIG. 3J) defining lateral position and orientation of the pallet load build BPAL on the pallet load base datum DTM, and forming a reference frame FER (FIG. 3J) for placement position of the at least one pallet load article unit CU with the at least one articulated robot 14 building the pallet load build BPAL.

Figure 4A:
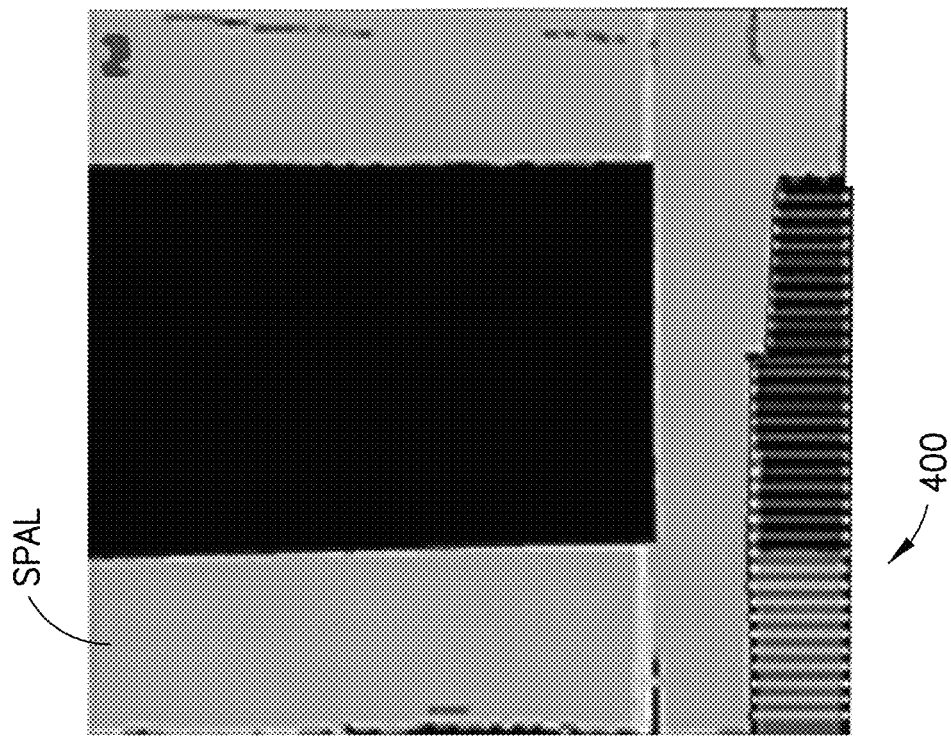
FIGS. 4, 4A and 4B are illustrations of pallet supports, disposed on a pallet building base of the palletizer cell of FIG. 3, generated from real time three dimensional imaging data (e.g. point cloud data) from a vision system of the palletizer cell where defects or variances in the pallet support are detected in accordance with aspects of the present disclosure.
Figure 4:
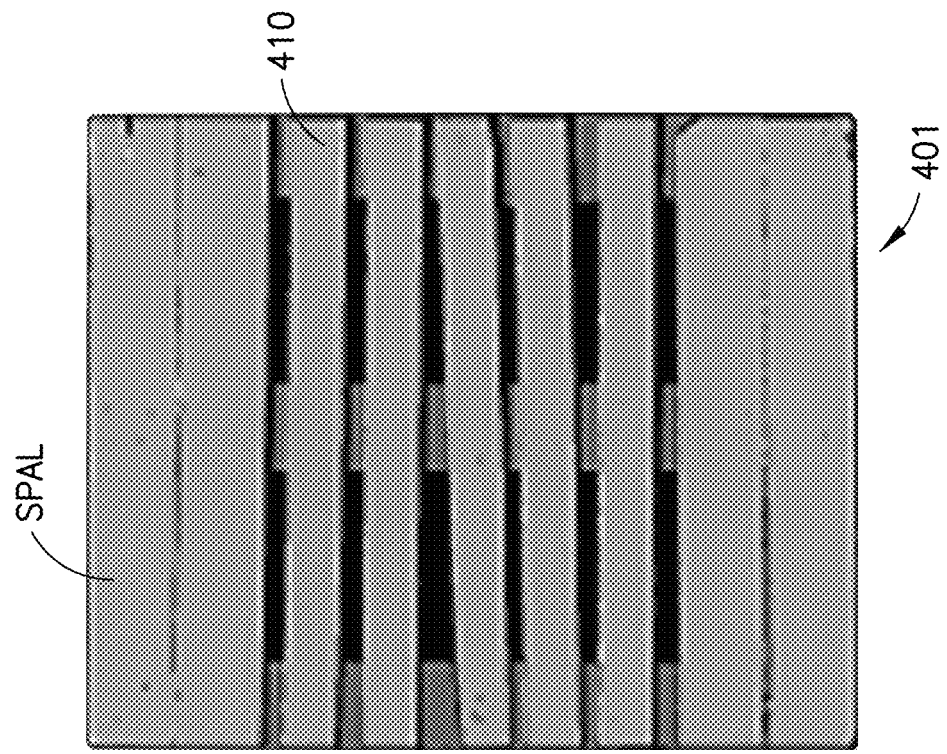
Figure 4C:
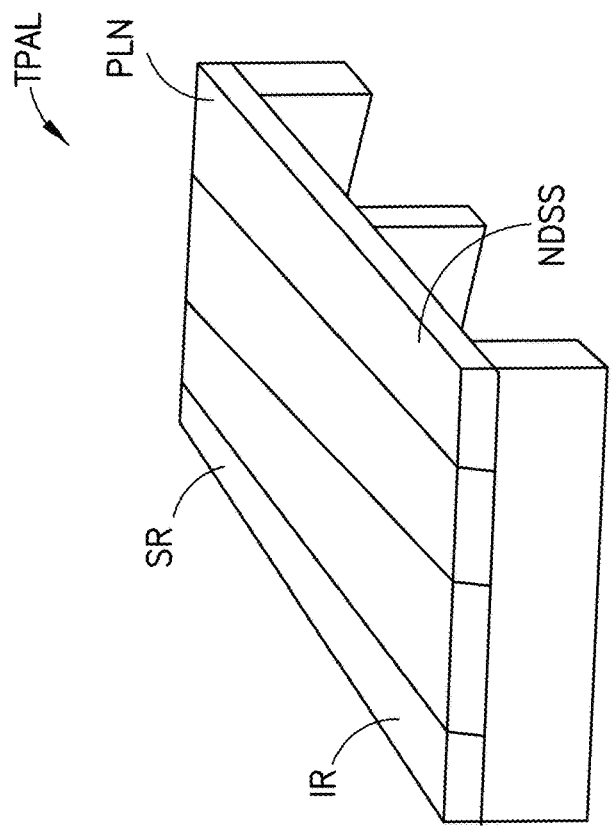
FIG. 4C is a schematic illustration of a pallet support in accordance with aspects of the present disclosure.
Figure 4B:
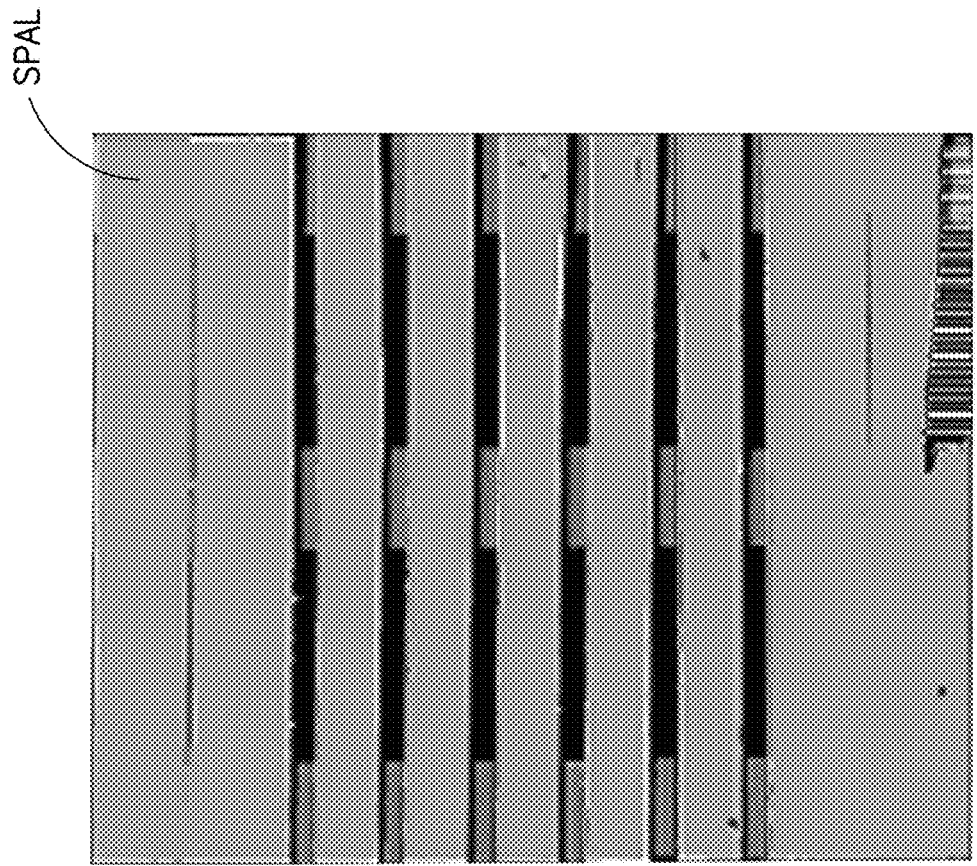

In one aspect, referring also to FIG. 4C, the predetermined reference includes a predetermined pallet support inspection reference IR defining a predetermined pallet support structure reference characteristic SR (e.g. such as a planarity PLN or non-defective support surface NDSS of a pallet TPAL—FIG. 4C). In one aspect, the pallet support variance PSV is a difference determined by the controller 10C between the predetermined pallet support structure reference characteristic SR and a characteristic of the pallet support SPAL (e.g., such as the missing board surfaces, protrusions, depressions, lattice spacing forming peak/valleys in the case unit seat surface described above), disposed on the building base 301 and imaged by the at least one three-dimensional camera 310C, corresponding thereto and resolved in real time by the controller 10C from the three-dimensional imaging data (such as the images illustrated in FIGS. 4-4B). In one aspect, the controller 10C is configured to compare the determined pallet support variance PSV with the predetermined threshold (as described above) for at least one predetermined pallet support structure reference characteristic SR, and generate an articulated robot motion signal 390 (commanding articulated robot stop and/or changing a articulated robot motion path and/or trajectory) if the determined pallet support variance PSV is greater than the predetermined threshold, and if the determined pallet support variance PSV is less than the predetermined threshold, generate an articulated motion signal 390 that embodies an article unit CU place position signal identifying placement of at least another pallet load article unit CU building the pallet load build BPAL to the at least one articulated robot 14. In one aspect, the predetermined reference includes a predetermined reference position of the at least one pallet load article unit CU in a predetermined reference pallet load build BPAL corresponding to the building pallet load build on the pallet support SPAL.

As also noted above, and still referring to FIGS. 3G, 4, 4A and 4B, the controller 10C is configured to identify (e.g., case unit position is validated to a pallet build plan) an article unit variance AUV (e.g. a variance in placement of the case unit CU from a planned placement of the pallet load article unit CU as described herein) of at least one of the pallet load article units CU in the pallet load build BPAL with respect to a predetermined reference (where the reference may be a predetermined place case pose specified by the pallet build plan). In one aspect, the article unit variance AUV is a difference determined by the controller 10C between a position, resolved in real time by the controller 10C from the three-dimensional imaging data, of the at least one pallet load article unit CU in the pallet load build BPAL and the predetermined reference position (as determined by the planned placement of the pallet load article unit CU) of the at least one pallet load article unit CU. For example, the controller 10C is configured to determine if case unit placement is within a predetermined threshold for overhang $e_{oi}$ (e.g. relative to supporting edges—see FIG. 3H for a negative overhang where the superior case unit is inward of the edge ED and see FIG. 3K for a positive overhang where the superior case unit extends outward of the edge ED); is within a predetermined eccentricity $e_{CLi}$ (see FIG. 3H) with respect to stack centerline CL (e.g., such as a centerline CL of stack S1 in FIG. 2H) to determine a stability of stack; and is within a seat flatness and height for superior structures cases/layers (such as case units within the superior layer PL2-PL5. The controller 10C is configured to resolve such article unit variances AUV relative to pose of superior seated and/or adjacent case place poses and modify case unit CU placement to compensate for superior or adjacent place poses and/or compensate the robot motion in a manner similar to that described above so that the stacks S1-Sn of case units CU (see FIG. 2) are stable. The controller is configured to stop robot motion if a pose of a case unit placed on or being placed on the pallet load build BPAL exceeds the thresholds and generates a deviant condition. In one aspect, any suitable user cooperation signal 391 of such deviant condition may be sent (e.g., aurally and/or visually) to a user operator identifying the deviant condition and location of the deviant case unit CU. The user cooperation signal 391 may include a collaborating action (e.g., such as repositioning the deviant case unit CU by hand) within the robot cycle time from case placement and a next sequential case placement, where for example, the controller 10C stops movement of the robot 14, slows movement of the robot 14, and/or moves the robot 14 to a safe area along safe stop path 398.

In one aspect, the controller 10C is configured so as to determine, in real time, from the corresponding real time three-dimensional imaging data, a build pallet load variance BPV (FIG. 3) with respect to a predetermined reference. The build pallet load variance BPV includes identification of at least one of a presence of an extraneous object 233 (see FIG. 2 where the extraneous object is illustrated as a tool but in other aspects the extraneous object may be a fallen or misplaced case unit, part of the robot 14 or any other object that does not belong in the detected position) in the pallet load build BPAL and of a mispresence (i.e., a mispresence is an erroneous position, orientation or missing presence of the article unit CU as illustrated in FIGS. 5-10D) of at least one pallet load article unit CU from the pallet load build BPAL. The controller 10C is also configured so as to generate in real time an articulated robot motion signal 390 dependent on the real time determined build pallet load variance BPV, and the articulated robot motion signal 390 being generated real time so as to be performed real time by the articulated robot 14 substantially continuously building the pallet load build BPAL substantially coincident with imaging of the pallet load build BPAL, between placement, by the articulated robot 14, of serially consecutive pallet load article units CU, placed immediately prior and immediately after imaging of the pallet load build BPAL showing the determined build pallet load variance BPV. In still another aspect, the controller 10C is configured so as to generate in real time a robot motion signal 390 and a user (e.g. an operator of the palletizer cell 10 or other personnel of the warehouse 100WS) cooperation signal 391, both dependent on at least one of the real time determined build pallet load variance BPV, wherein the user cooperation signal 391 defines to the user a deviant condition of the pallet load build BPAL and a cooperative action of the user so as to resolve the deviant condition depending on the determined at least one extraneous presence and mispresence. It should be understood that the controller 10C may be configured to determine one or more of the pallet support variance PSV, the article unit variance AUV and the build pallet load variance BPV.

In accordance with the aspects of the disclosed embodiment, the vision system 310 imaging and responsive (feedback) input (e.g. feedback loop BFL), to the robot(s) 14 is decoupled/independent from robot motion, hence enabling a substantially continuous and adaptive pallet load build as described herein. The vision system 310 is capable of detecting and resolving (alone or in combination with controller 10C) within the pallet load build BPAL one or more of a quality of the pallet support SPAL and an identification (validated to plan) of placed case pose variances from reference (where the reference may be a predetermined place case pose specified by a pallet build plan).

In one aspect, referring again to FIGS. 3 and 3A-3N, the vision system 300 is fixed in position relative to the frame 300F, and as such is independent of robot 14 movement/position. For example, each camera 310C1-310C4 of the at least one camera 310C is positioned on the frame so that a respective field of view FOV1-FOV4 images at least a predetermined part of the pallet load build BPAL (e.g. pallet support SPAL, at least part of the pallet load build structure RPAL, etc.) in a three-dimensional space 3DS, as described herein. As can be seen in the figures, in one aspect, the fields of view FOV1-FOV4 may overlap; while in other aspects the fields of view FOV1-FOV4 may not overlap. Where the fields of view FOV1-FOV4 overlap, the images from each camera may be combined to form an uninterrupted substantially continuous image of the whole, or at least a predetermined part, of the pallet load build structure RPAL within the three-dimensional space 3DS (e.g., where the combined image has a resolution as described herein). Each of the cameras 310C1-310C4 of the at least one camera 310C is calibrated to register each three-dimensional image (e.g. a two-dimensional image and a depth map point cloud (see FIGS. 5-10D for exemplary images including the depth map point cloud), where the image and depth map point cloud are created with respect to a global reference frame (see FIG. 3G and reference frame X, Y, Z, θ, α, μ) of the three dimensional space 3DS) to a common reference point, so as to synchronize each camera 310C1-310C4 with respect to the other cameras 310C1, 310C4 and identify overlapped areas of the three-dimensional image.

Each of the cameras 310C1-310C4 are also configured to register the three-dimensional point clouds corresponding to each robot 14 to identify pallet load build structure RPAL occlusion zones OZ (Se FIG. 5A) formed by the robots 14 extending into the three-dimensional space 3DS. For example, each robot 14 is dynamic (e.g. has an extend motion, a retract motion and a static place/pick motion) within the three-dimensional space 3DS. The vision system 310 alone, or in combination with the controller 10C is configured, with any suitable algorithms, to remove the occlusion zones OZ formed by the robot 14 so that the vision system provides a substantially unobstructed view of the pallet load build structure RPAL/pallet load build BPAL. For example, the occlusion zones OZ are registered by the respective cameras 310C1, 310C4 with the controller 10C. The controller 10C is configured to compare the three-dimensional image data (e.g. current image data and/or past image data of the pallet load build BPAL/pallet load build structure RPAL) with the occlusion zones OZ and subtract the occlusion zones OZ from (or otherwise ignores the occlusion zone OZ in) the three-dimensional image so that images of the case units CU (see case units 1-5 in FIG. 5A) are substantially unobstructed. In one aspect, the at least one camera 310C is communicably coupled to the controller 10C so the controller 10C registers (in any suitable register such as register 10CR—FIG. 3), from the at least one camera 310C, real time three-dimensional imaging data embodying different corresponding three-dimensional images of each different one of the pallet load article units, of the pallet load build BPAL.

Figure 3B:
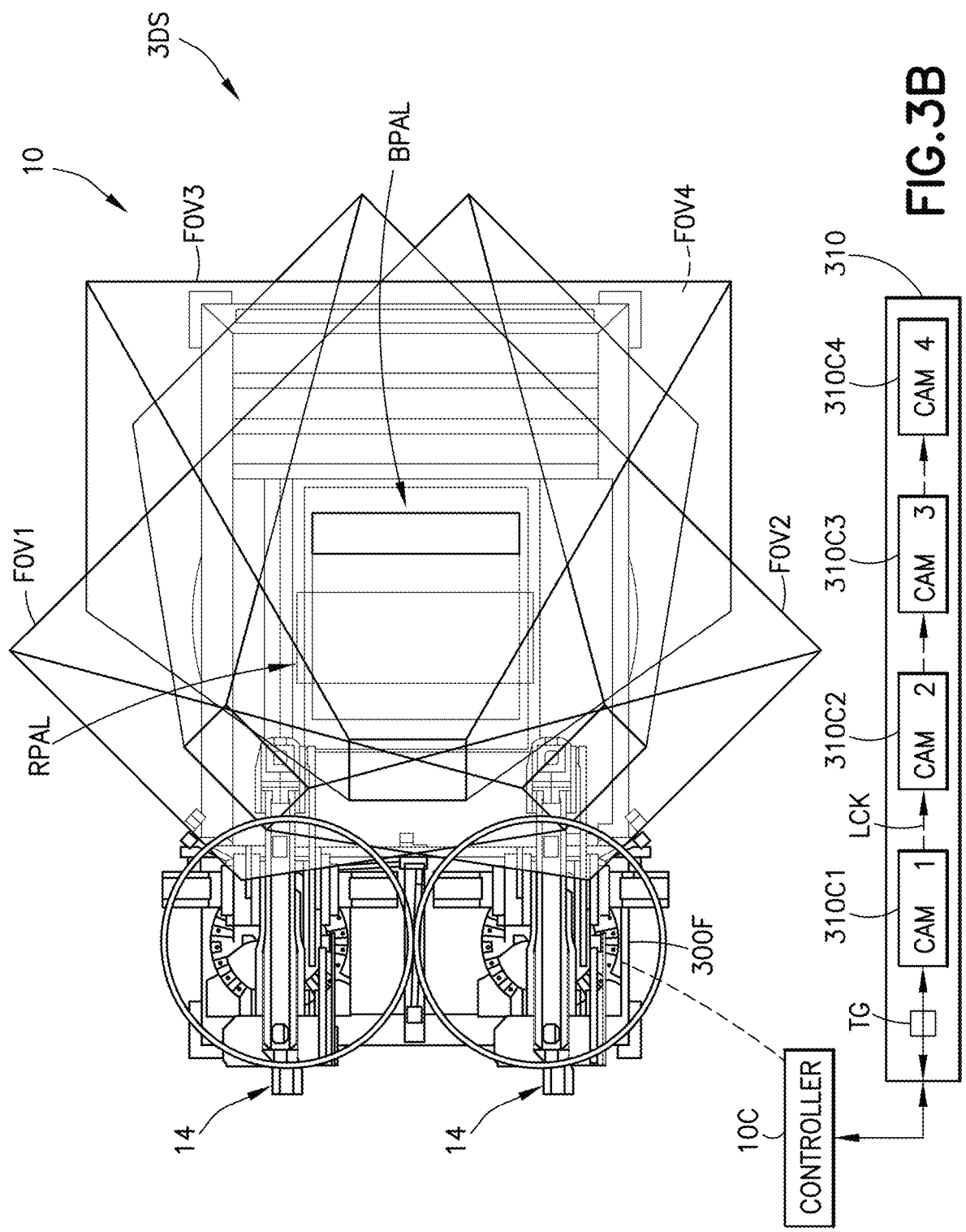
FIG. 3B is a schematic plan or top view of the palletizer cell of FIG. 3 in accordance with aspects of the disclosed embodiment.
Figure 3D:
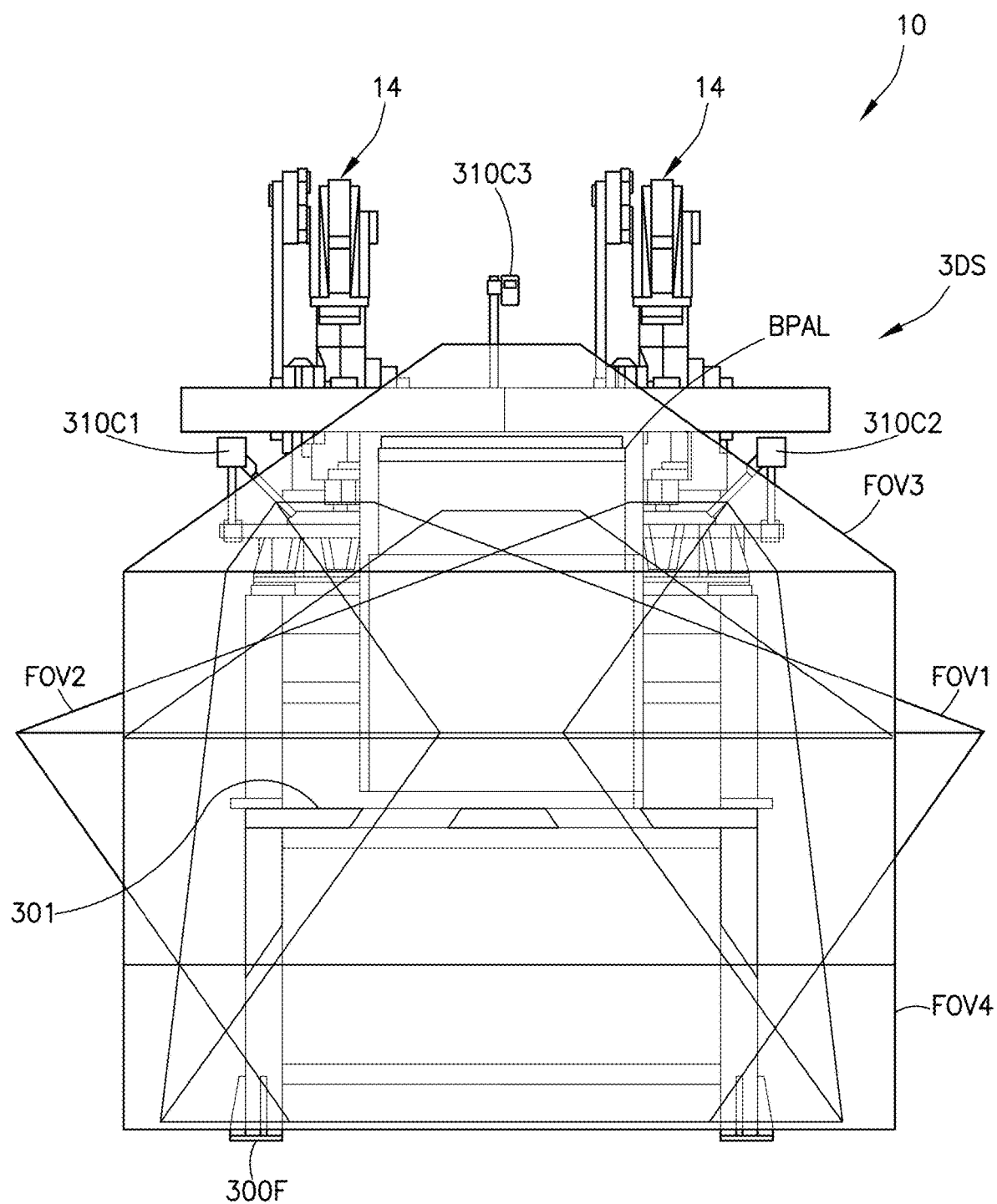
FIG. 3D is a schematic front view of the palletizer cell of FIG. 3 in accordance with aspects of the disclosed embodiment.
Figure 3F:
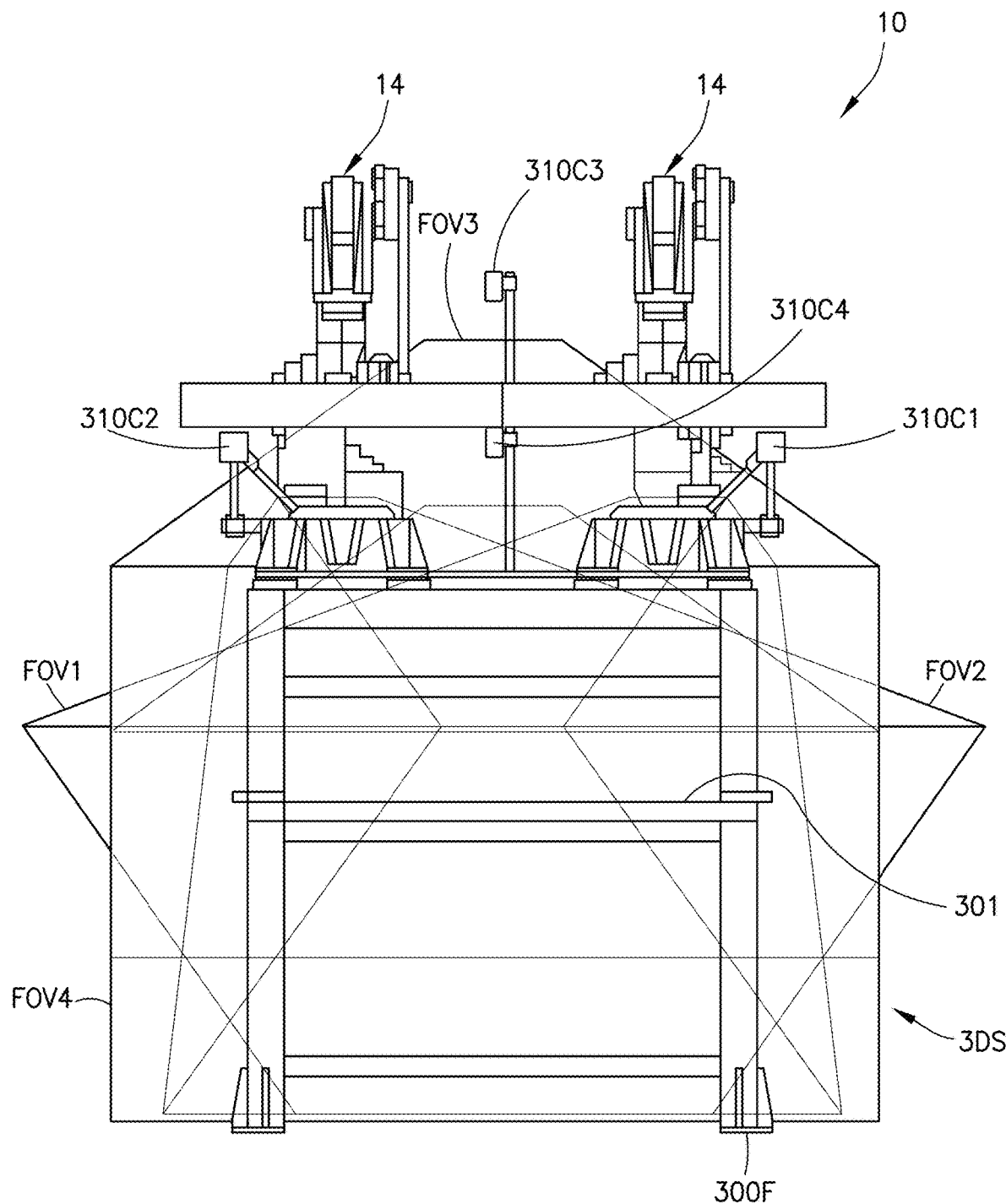
FIG. 3F is a schematic rear or back view of the palletizer cell of FIG. 3 in accordance with aspects of the disclosed embodiment.
Figure 3G:
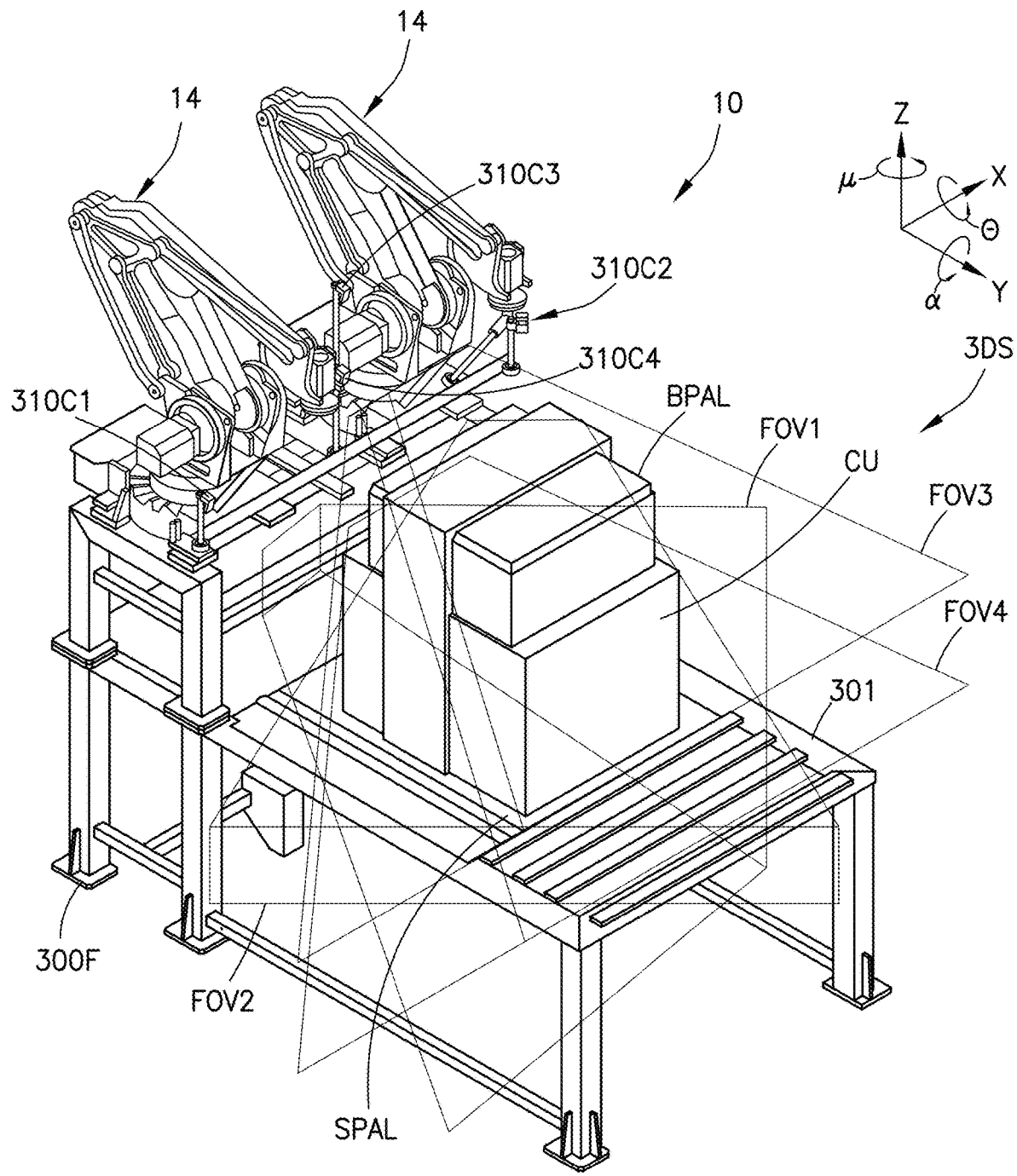
FIG. 3G is a schematic isometric view of the palletizer cell of FIG. 3 in accordance with aspects of the disclosed embodiment.
Figure 3H:
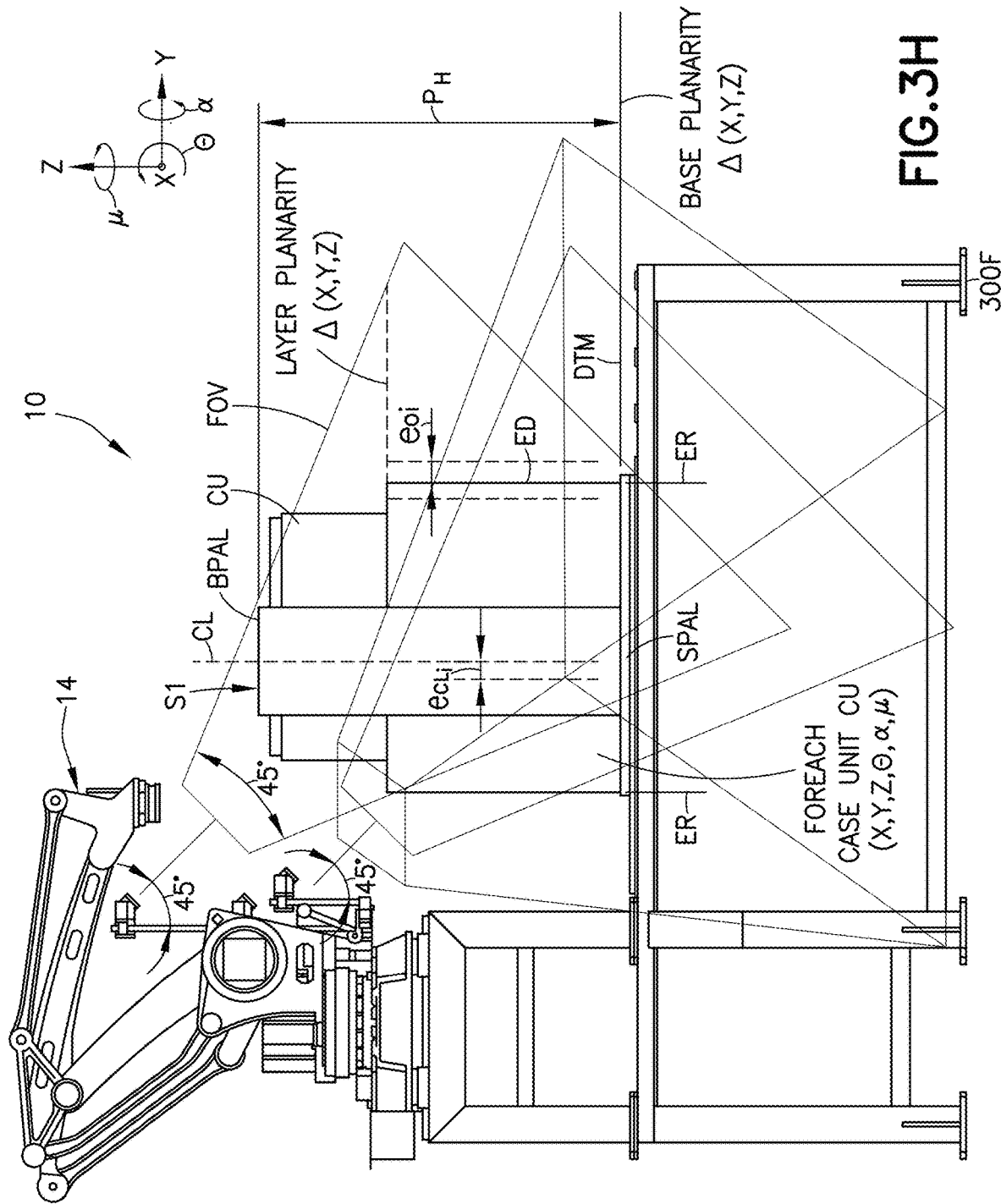
FIG. 3H is a schematic left side view of the palletizer cell of FIG. 3 in accordance with aspects of the disclosed embodiment.
Figure 31:
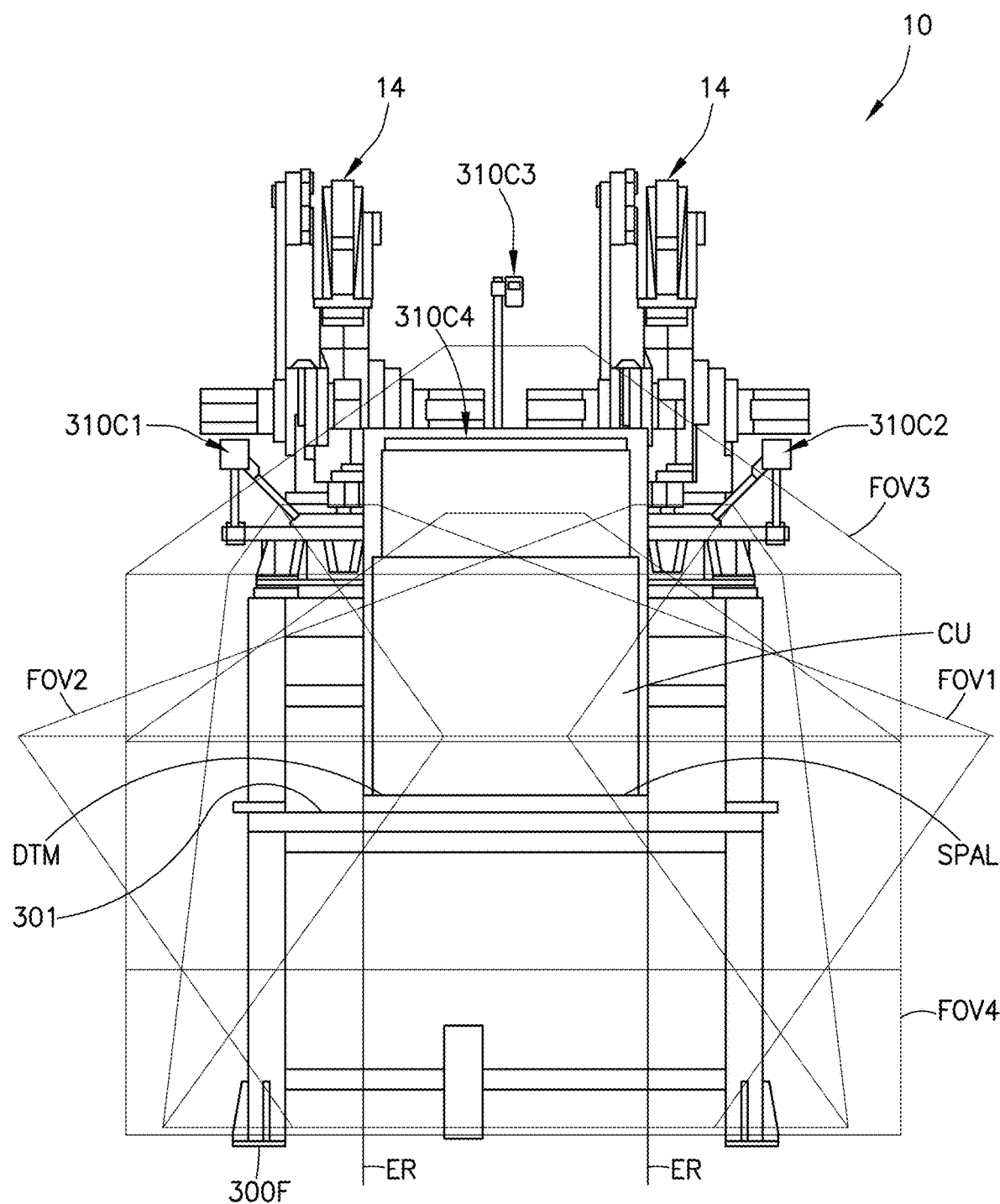
Figure 3J:
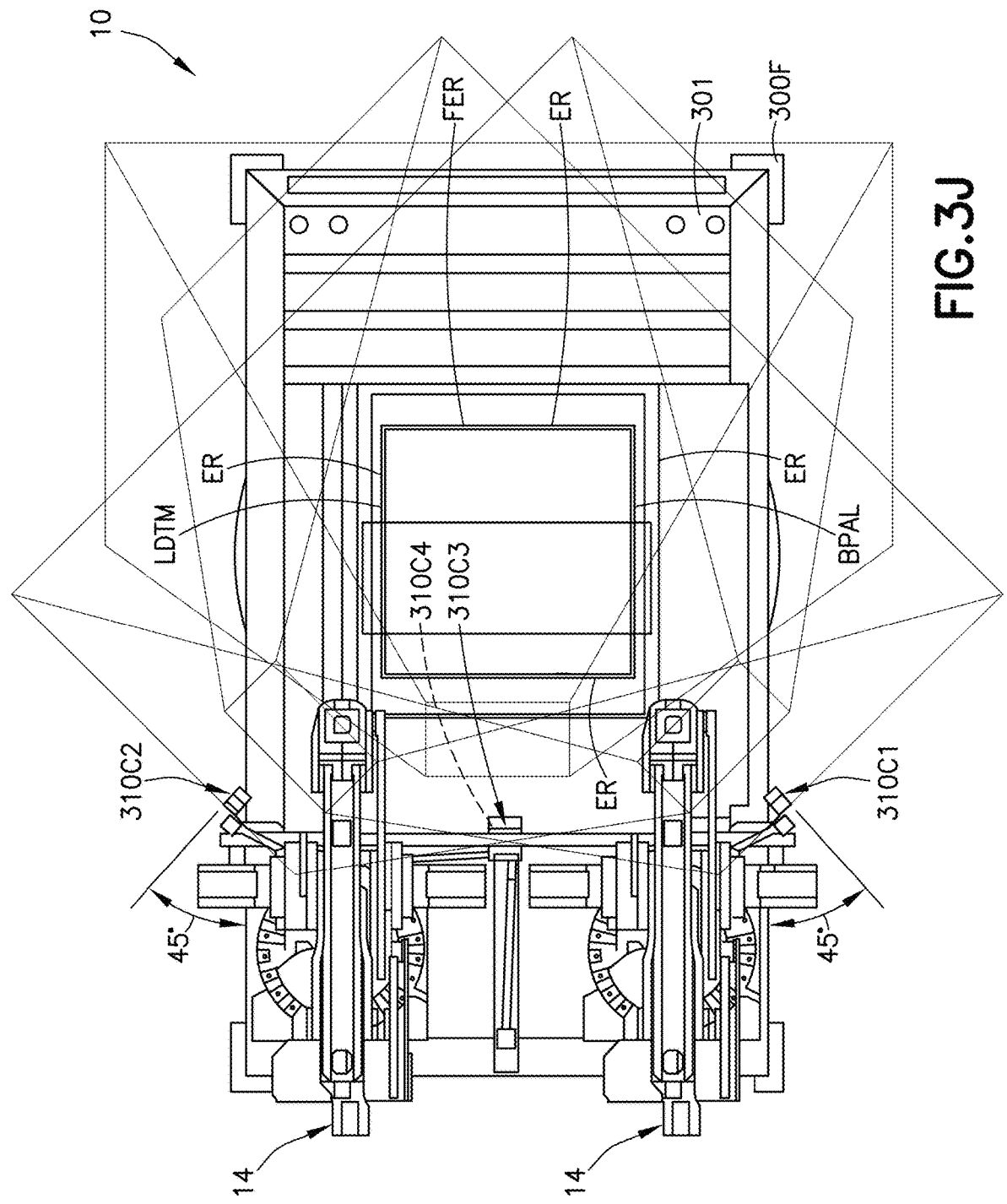
FIG. 3J is a schematic plan or top view of the palletizer cell of FIG. 3 in accordance with aspects of the disclosed embodiment.
Figure 3K:
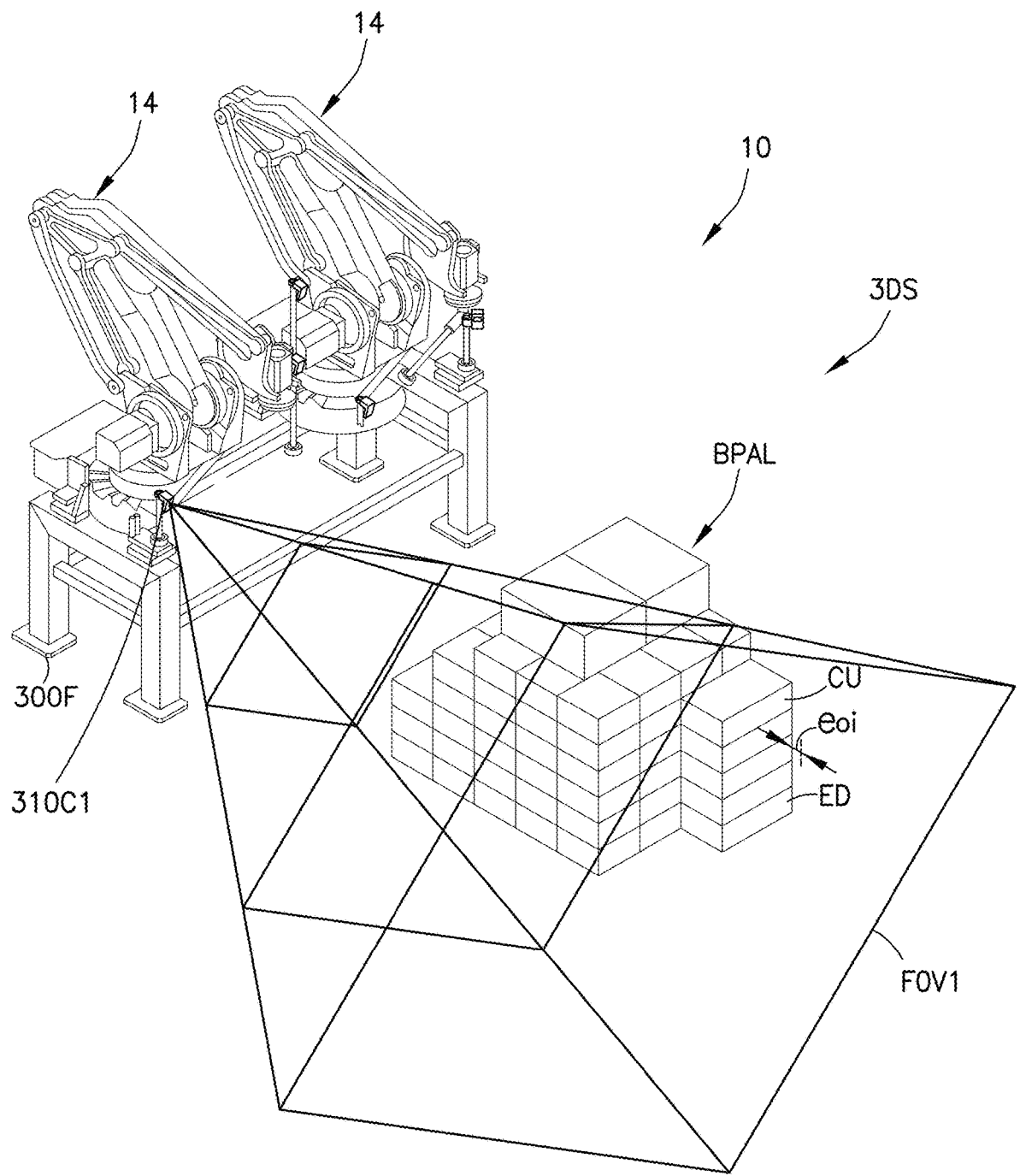
FIG. 3K is a schematic isometric view of the palletizer cell of FIG. 3 showing, with emphasis, the field of view of a camera of a vision system of the palletizer cell in accordance with aspects of the disclosed embodiment.
Figure 3L:
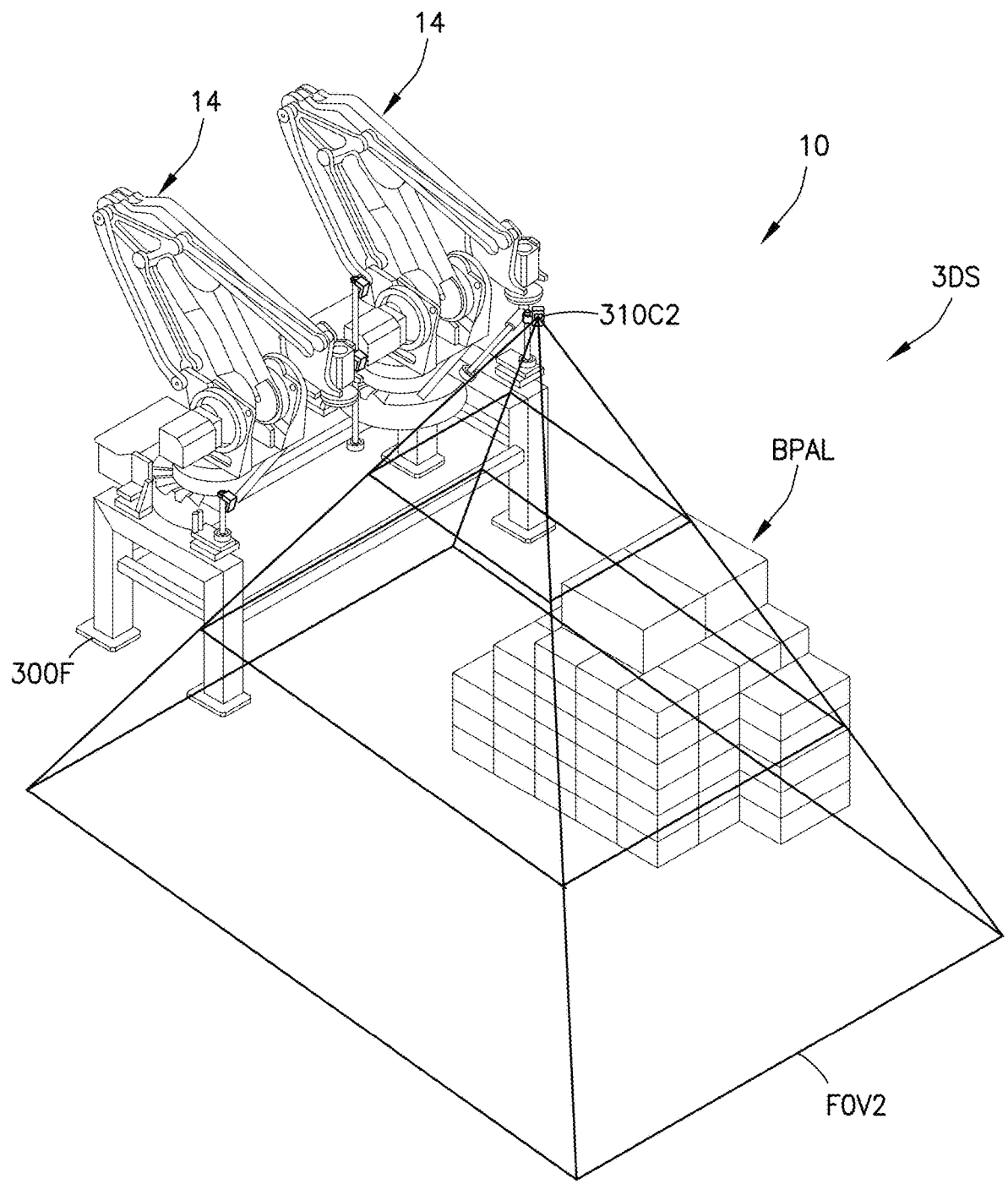
FIG. 3L is a schematic isometric view of the palletizer cell of FIG. 3 showing, with emphasis, the field of view of a camera of a vision system of the palletizer cell in accordance with aspects of the disclosed embodiment.
Figure 3M:
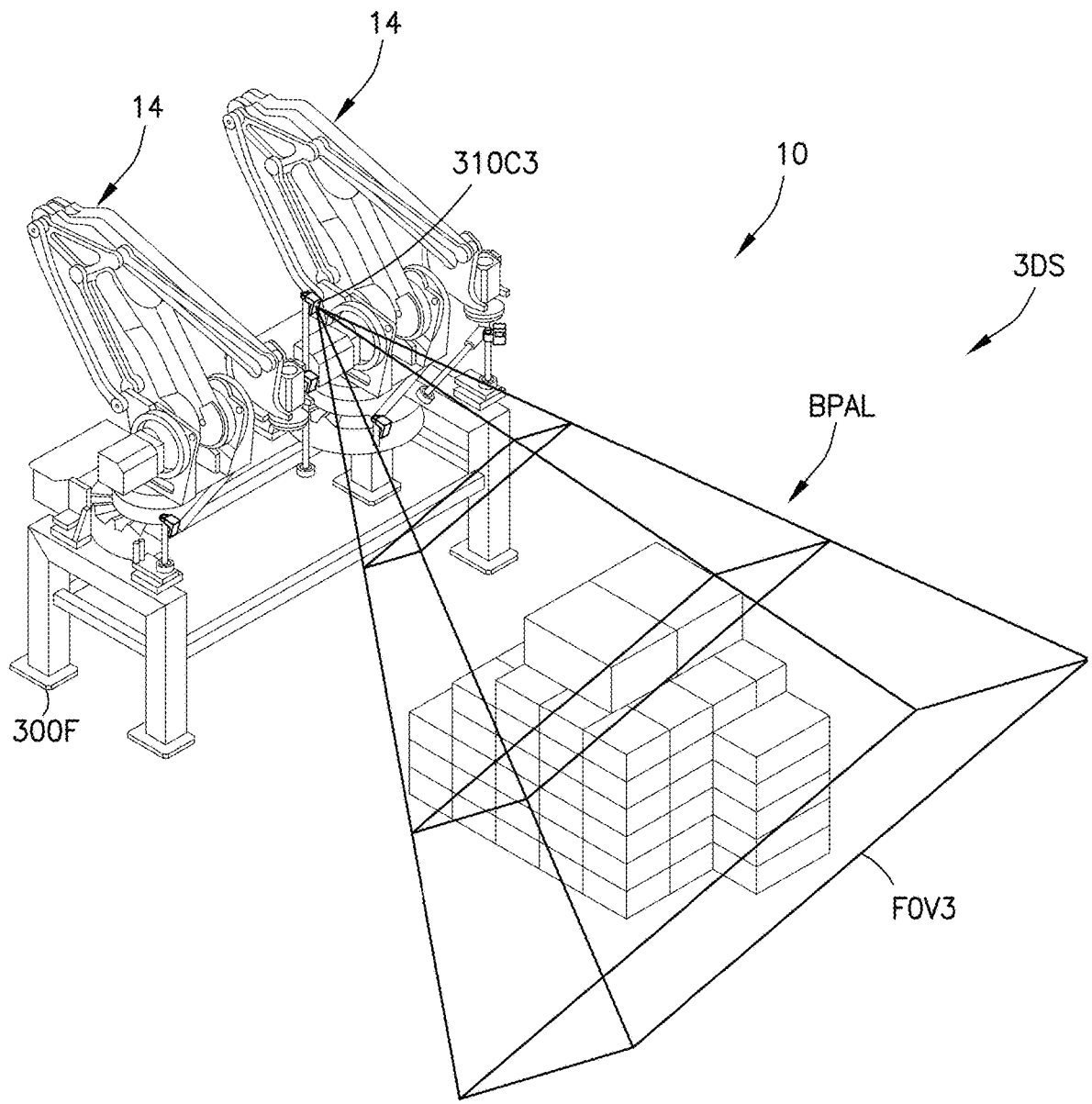
FIG. 3M is a schematic isometric view of the palletizer cell of FIG. 3 showing, with emphasis, the field of view of a camera of a vision system of the palletizer cell in accordance with aspects of the disclosed embodiment.
Figure 3N:
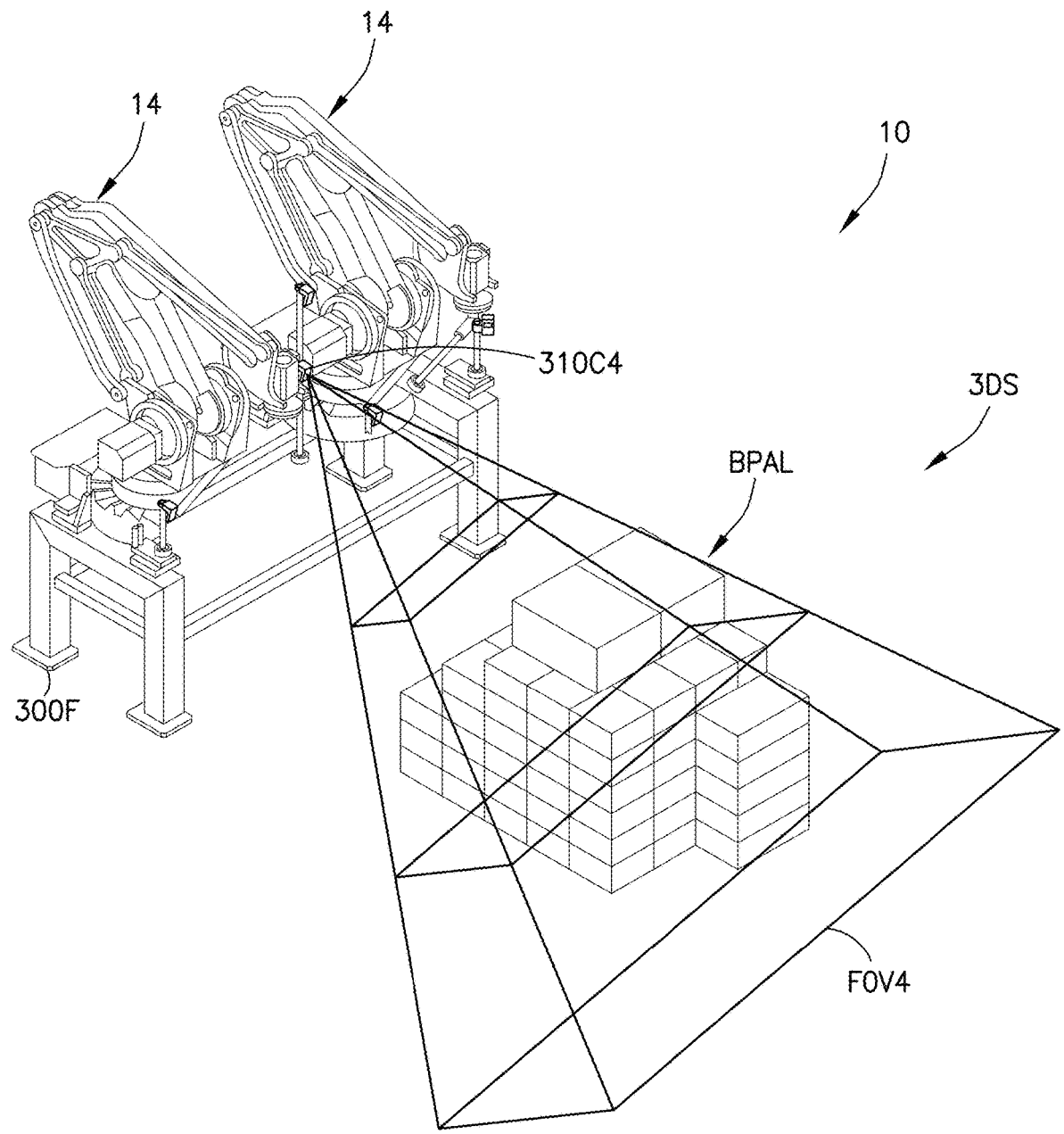
FIG. 3N is a schematic isometric view of the palletizer cell of FIG. 3 showing, with emphasis, the field of view of a camera of a vision system of the palletizer cell in accordance with aspects of the disclosed embodiment.

In one aspect, referring to FIG. 3B, the cameras 310C1-310C4 of the vision system 310 are configured so that the cameras 310C1-310C4 are operated and images are obtained/captured by the cameras 310C1-310C4 in a cascading (or sequential) manner. For example, a trigger TG (such as feedback from the robot 14 to the controller 10C that a case unit CU was picked for placement by or placed by the robot 14—e.g., the trigger may be based on robot position or any other suitable criteria) may be received by the controller 10C, which trigger TG causes the controller 10C to send an imaging command to the vision system 310. The cameras 310C1-310C4 may be coupled to each other with any suitable input/output interlock LCK so that the cameras 310C1-310C4 sequentially capture respective images of the pallet load build BPAL/pallet build structure RPAL (e.g. camera 310C1 captures a respective image, then camera 310C2 captures a respective image, then camera 310C3 captures a respective image and so on, until all cameras in the vision system 300 capture their respective images). It should be understood that while the sequential imaging is described as being captured in the order of camera 310C1, camera 310C2, camera 310C3, camera 310C4, in other aspects the cameras 310C1-310C4 may capture their respective images in any suitable order. Here, each camera 310C1-310C4 of the vision system 310 acquires a respective image and depth map independent of the other cameras 310C1-310C4 (e.g. to avoid interference between cameras). In one aspect, the cameras 310C1-310C4 may be hardwired serially to each other so that each camera input/output interlock LCK triggers imaging by a subsequent cameral in the sequence of cameras. For example, the camera 310C1 may receive the imaging signal from the controller 10C, the camera 310C2 may receive the imaging signal from camera 310C1, the camera 3103 may receive the imaging signal from camera 310C2 and so on. As may be realized, the imaging sequence of the cameras 310C1-310C4 may occur within a predetermined time period so that sufficient time is provided to the controller 10C, upon receipt of the image and depth map, for processing the image and depth map and providing an adaptive response to the robot (s) 14 (e.g. imaging is completed in about 0.4 seconds).

In one aspect, the controller 10C determines the features of the pallet build structure RPAL (e.g. edges of the case units CU, features of the pallet support, etc.) directly from the point cloud (defining the imaged depth map) for each camera 310C1-310C4 independently and substantially coincidentally. Determination of the features of the pallet build structure RPAL directly from the point cloud is effected by simplifying the point cloud by resolving robot occlusions OZ (see FIG. 5A), as described above, and other point cloud simplification to remove areas/spaces of no interest (e.g. by subtracting these areas/spaces from the image in a manner substantially similar to that described above). It is noted that the areas/spaces of no interest may include areas outside the case unit placement area of the pallet load build structure RPAL. The controller 10C is configured with any suitable algorithms to resolve, from the point cloud, the case unit edges to determine case unit size and location. The controller 10C is also configured to determine, from the point cloud, variances for each camera point cloud independently and substantially coincidentally with respect to the reference feature (as noted herein). The controller 10C is also configured to resolve any overlapped portions of the images from the cameras 310C1-310C4 to eliminate duplication. The controller 10C is further configured to determine the appropriate adaptive response for the robot(s) as described herein.

Referring to FIGS. 2, 3, 5 and 5A-5G, placed case variance detection/determination by the controller 10C includes detection of case mispresence/mispose such as detection of missing case and/or detection of an incorrectly placed case. FIGS. 5, 5A-5G illustrate a sequence three dimensional point cloud images, obtained from the vision system 310, of case unit CU placement on a pallet support SPAL where the case unit CU8 is placed so as to overlap case unit CU6 (i.e. case unit is misposed and a signal 390, 391 are generated as described herein to effect repositioning the misposed case unit CU6). It is noted that upon robot 14 case placement of each case unit CU building the pallet load build structure RPAL/pallet load build BPAL, the vision system 310 three-dimensionally images the pallet load build BPAL, wholly or a predetermined portion thereof, for each robot 14 motion indicated as a case place building the pallet load build BPAL, so that the vision system 310 serially images the whole (or predetermined portion of) build, to show incremental differences from each case placement to another subsequent case placement, in effect imaging each case unit CU placed building the pallet load PAL, facilitating validation (in real time) of pose and adaptive response as described above.

Figure 5A:
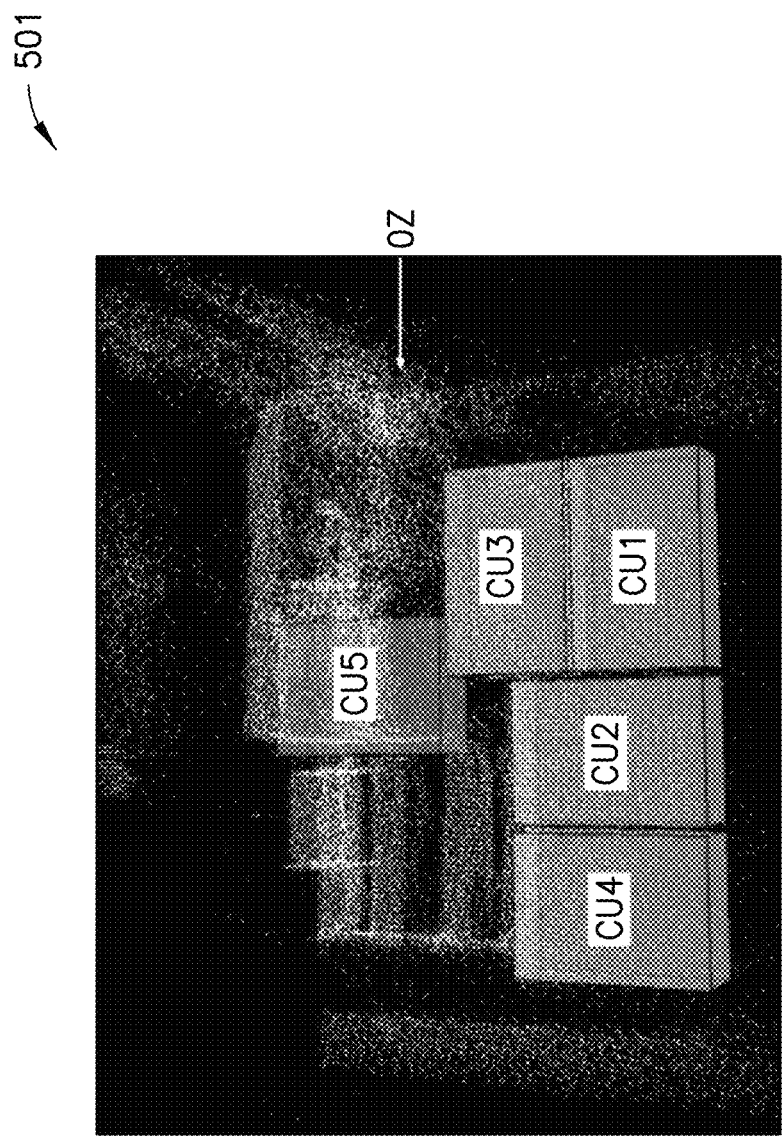
Figure 5B:
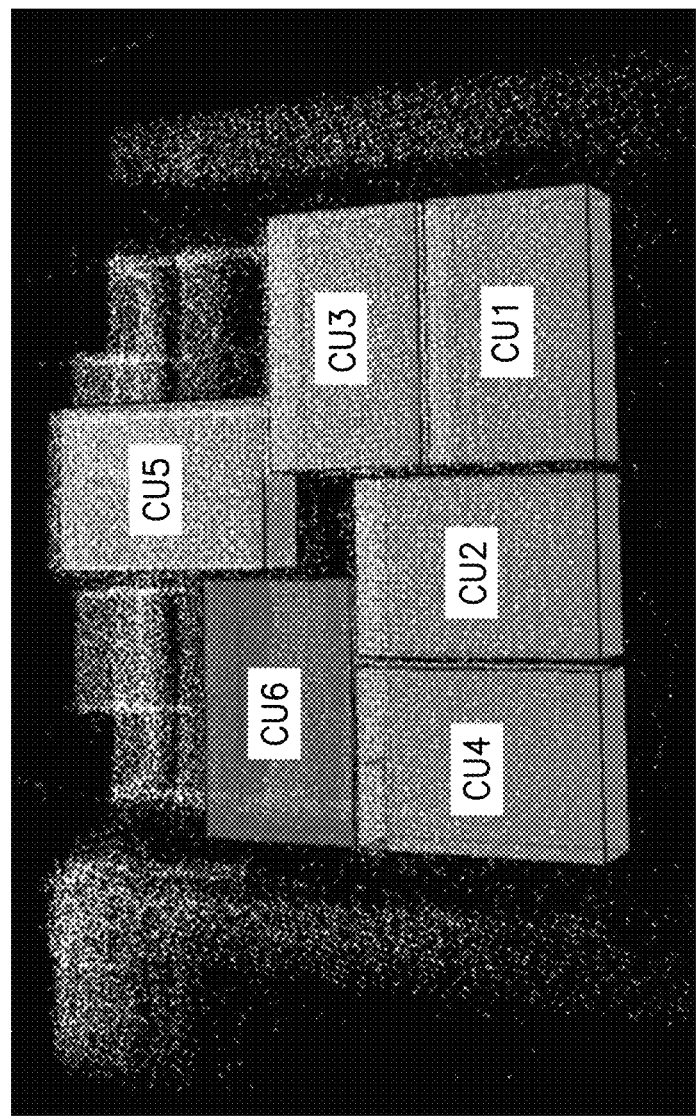
Figure 5C:
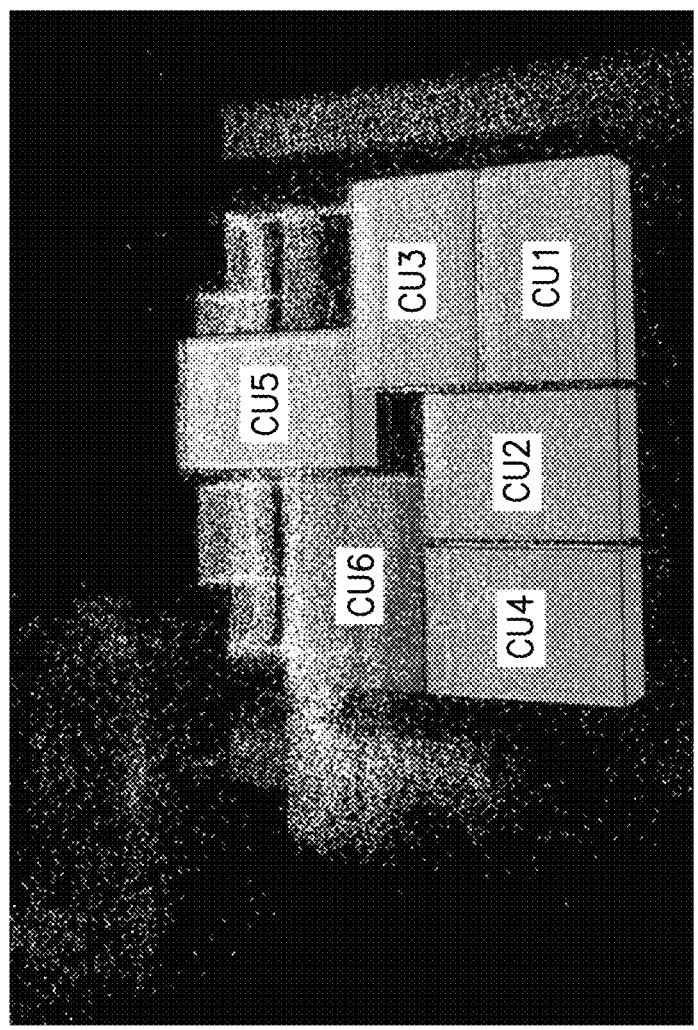
Figure 5D:
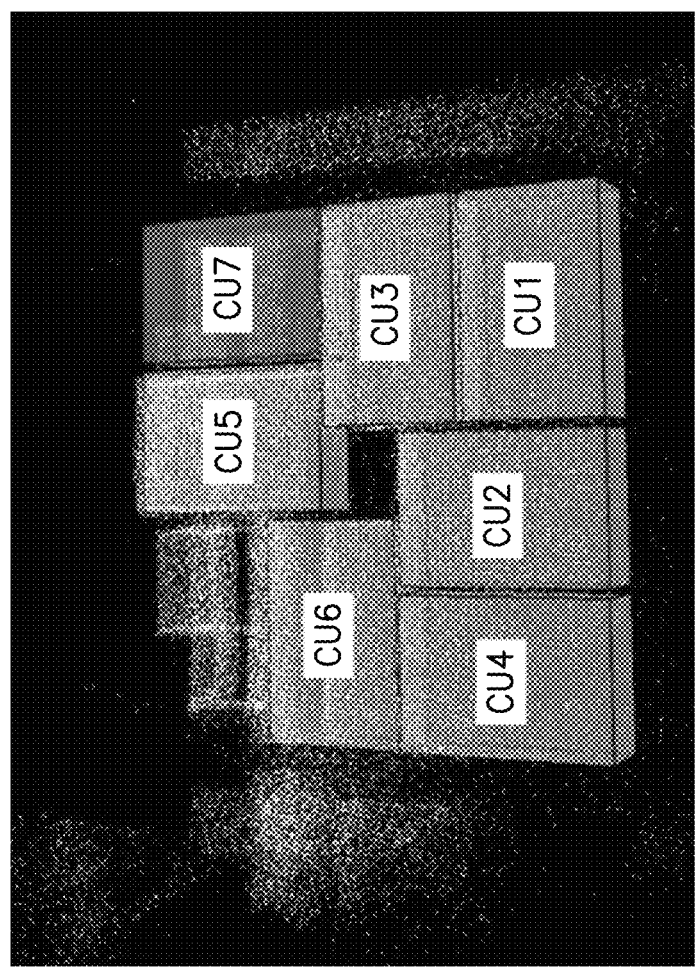
Figure 5E:
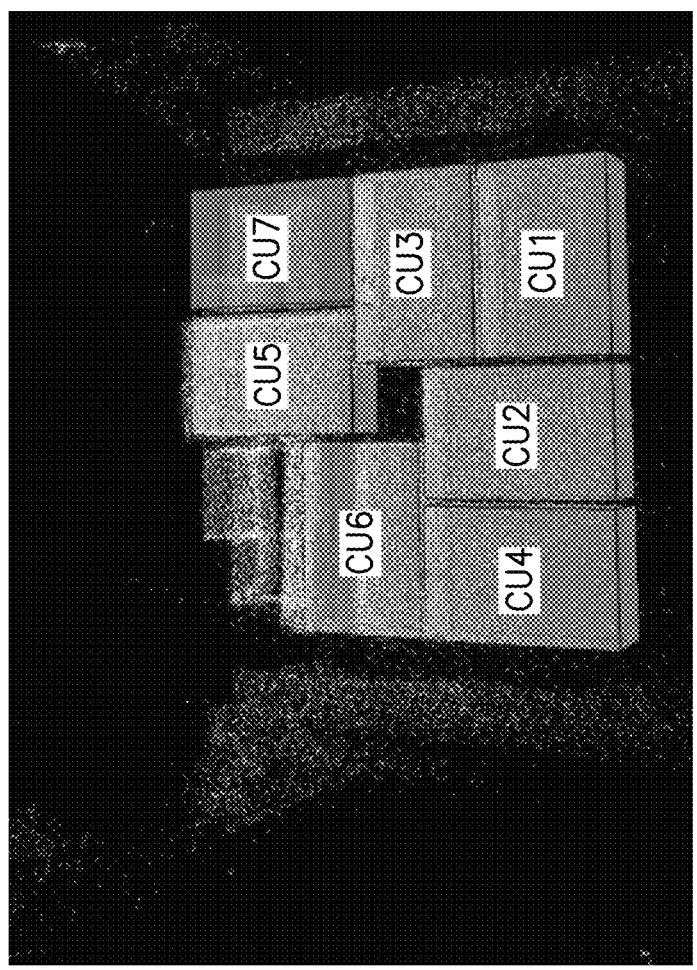
Figure 5F:
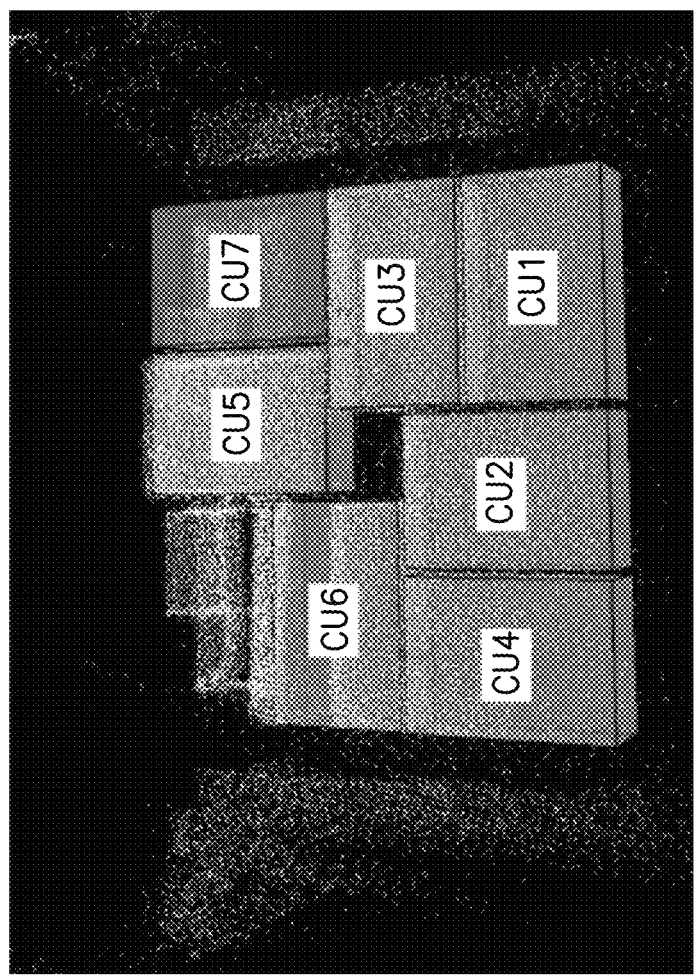
Figure 5G:
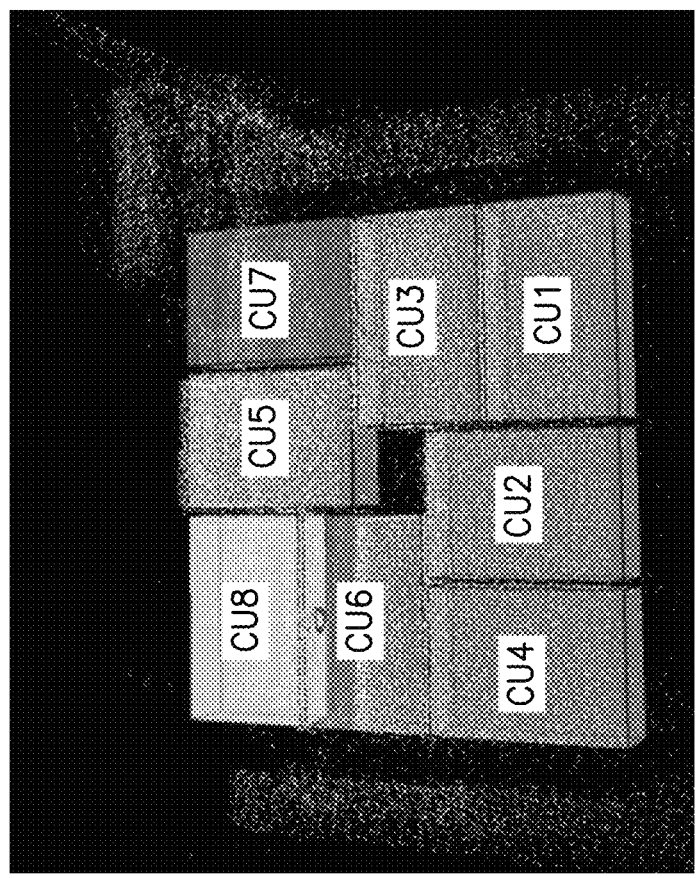

With respect to the "missing" case detection, imaging the whole (or predetermined portion of) build in the serial images (see FIGS. 6, 6A-6H where case unit 9 falls from the pallet build and is missing; see also FIGS. 7, 7A-7F where case unit 63 falls from the pallet build and is missing) of the pallet load build BPAL, enables detection of the "missing" case anywhere, at any time (from any occurrence) such as immediately upon robot place motion from misplacement/non-placement of the "missing" case by the robot 14 or from delayed case fall (see FIGS. 6-6H which show a sequence of images illustrating case unit 9 going missing and falling to the floor; and FIGS. 7-7F which show a sequence of images illustrating case unit 63 going missing and falling to the floor) caused by, e.g., environmental history changes over time in the pallet load build PBAL (due to, e.g., deformations from surface loads on cases in the build structure and/or shifting of cases from instability or dynamic impulse, contact to the pallet load build structure RPAL). Real time detection of the missing case deviant condition (e.g. missing case) causes the controller 10C to send a robot motion signal 390 (similar to the stop, slow, safe motions described herein) and generate a user cooperation signal 391 with information identifying condition types (e.g., missing, misposed), location, and collaboration action (e.g., replace/reposition the missing case). Similar corrective action may be taken by the controller 10C for the overlapped/misposed case unit CU6 of FIGS. 5-5G as noted above.

The controller 10C is programmed with the place sequence and case unit locations (according to the reference plan of the pallet load build BPAL) for each case CU, and registers the identification of each case being placed by the robot 14 (in each given robot pick/place cycle) to the corresponding place cycle and the corresponding place pose imaged upon placement by the corresponding place cycle. Accordingly the controller 10C, from the real time missing case determinations, discriminates the missing case (e.g. in the example shown in FIGS. 6-6H the missing case is case 6) as being effected by robot 14 misplacement (e.g., the identified missing case is the same case as placed by bot in last preceding place cycle) or is a missing case due to environmental history effects. As described above, the controller 10C is programmed to generate different robot 14 and user signals for missing case units CU based on the discriminated missing case type. For example, if the missing case is due to, for example, bot placement, the controller 10C may modify the robot 14 speed or trajectory to place other cases with similar proportions and similar poses, and provide a preemptive user cooperation signal 391 in advance of the robot 14 place cycles with similar cases/totes.

Figure 6:
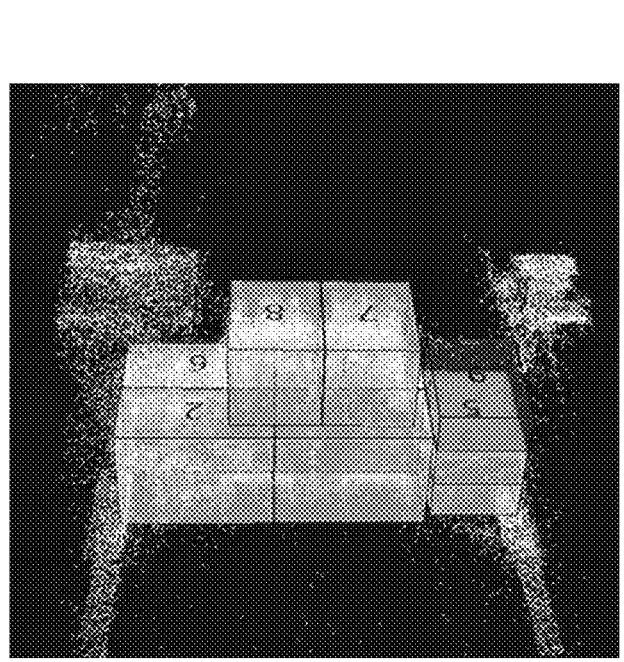
FIGS. 6 and 6A-6H illustrate a sequence of real time three-dimensional imaging data (e.g., point cloud data) from a vision system of a palletizer cell corresponding to a pallet build where a fallen case unit (e.g. the case unit has fallen on the floor) is detected by the vision system upon placement of the case unit(s) in accordance with aspects of the present disclosure.
Figure 6A:
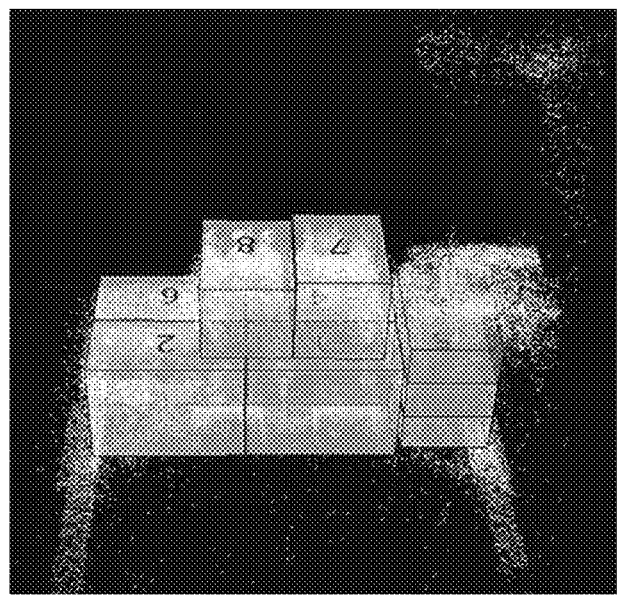
Figure 6B:
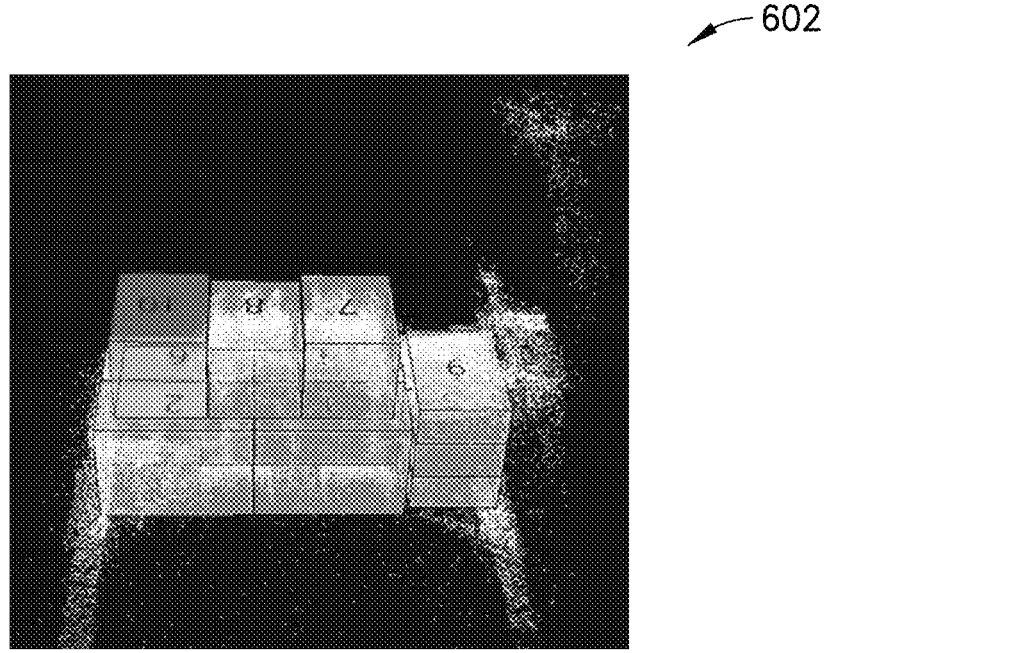
Figure 6C:
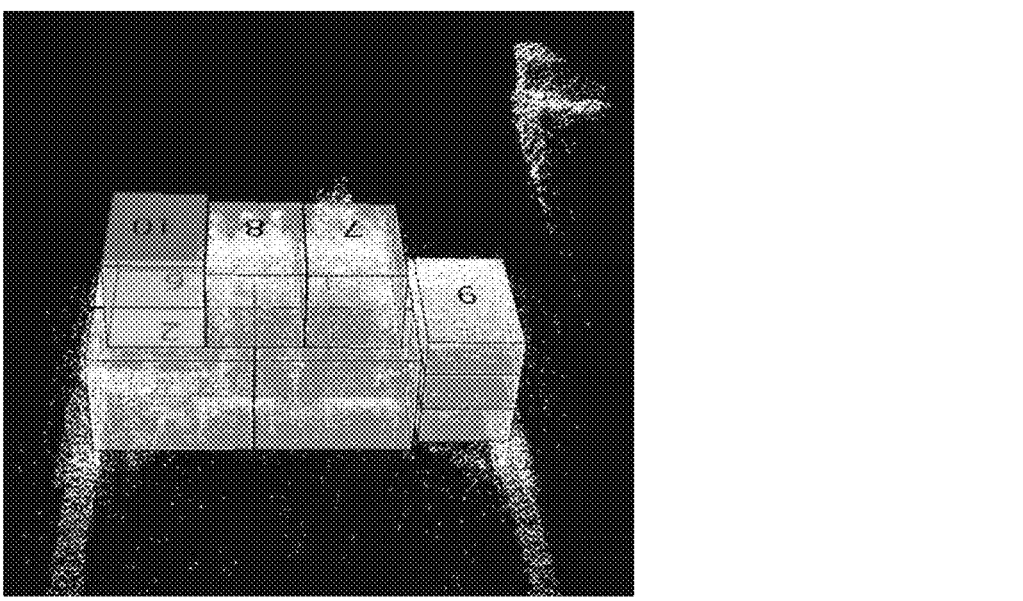
Figure 6D:
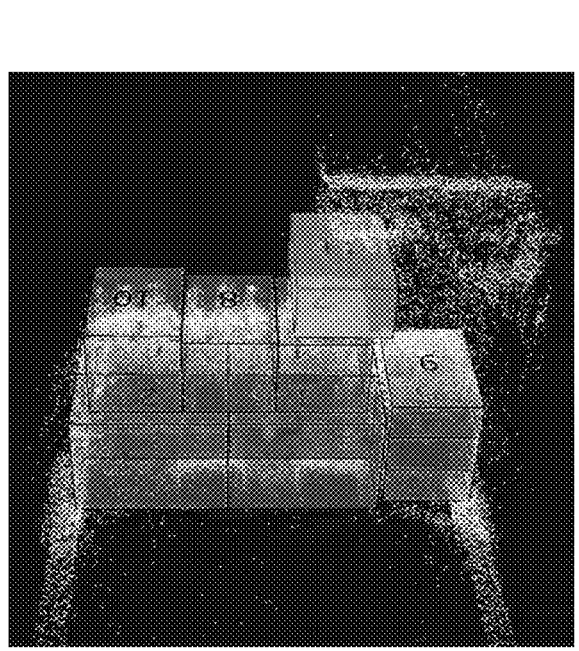
Figure 6E:
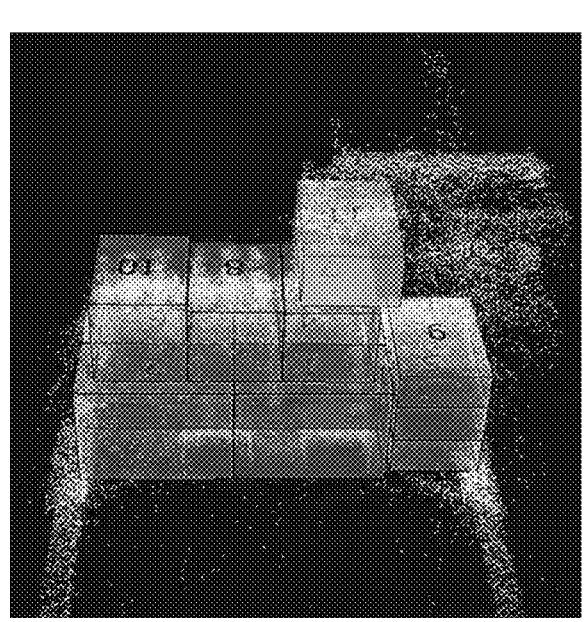
Figure 6F:
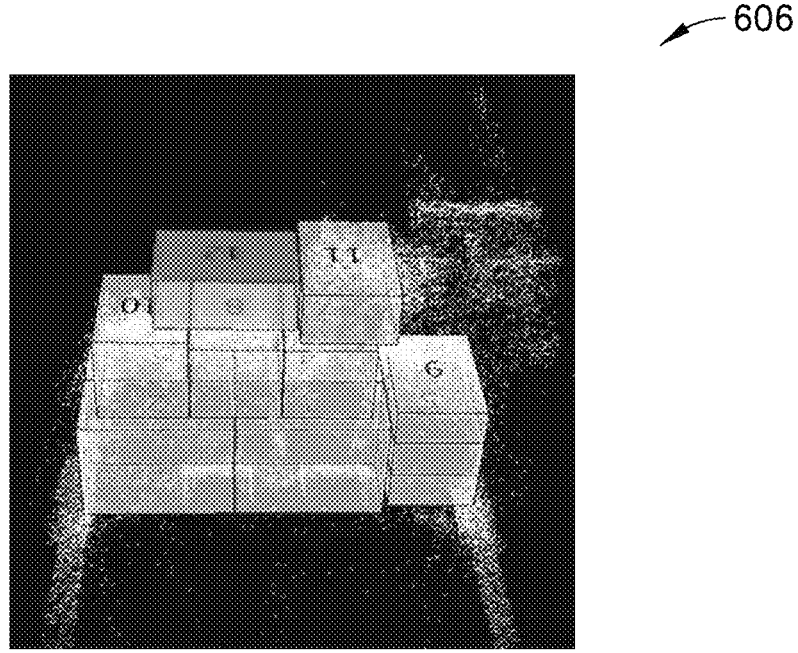
Figure 6G:
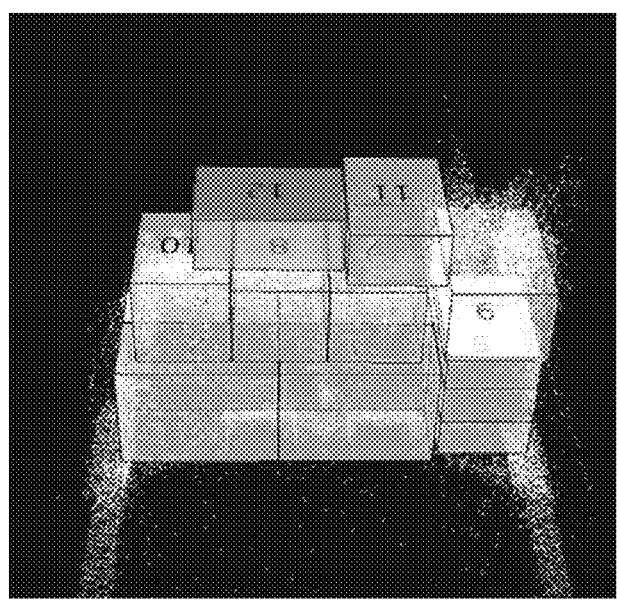
Figure 6H:
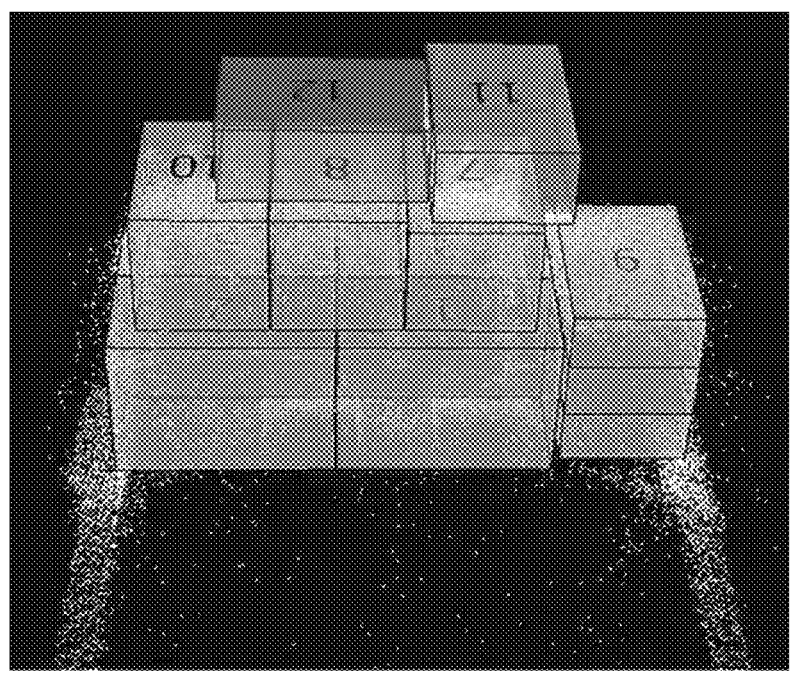
Figure 7:
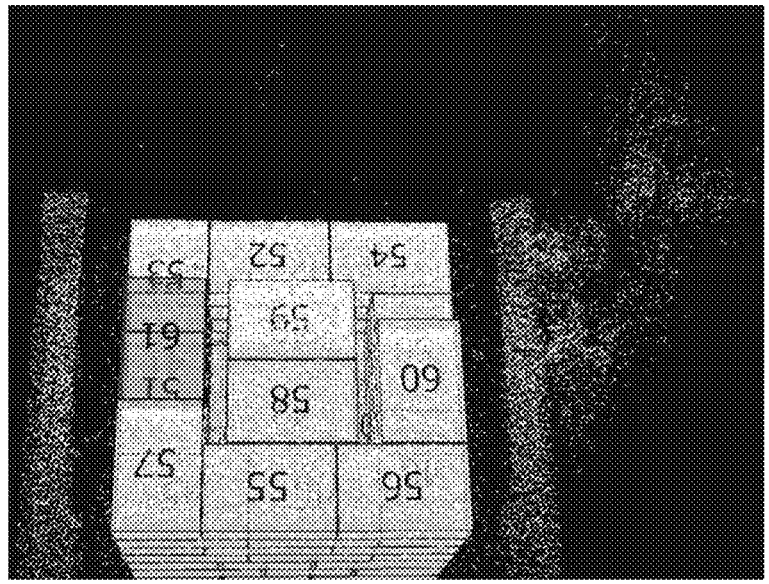
FIGS. 7 and 7A-7F illustrate a sequence of real time three-dimensional imaging data (e.g., point cloud data) from a vision system of a palletizer cell corresponding to a pallet build where a fallen case unit (e.g. the case unit has fallen on the floor) is detected by the vision system upon placement of the case unit(s) in accordance with aspects of the present disclosure.
Figure 7A:
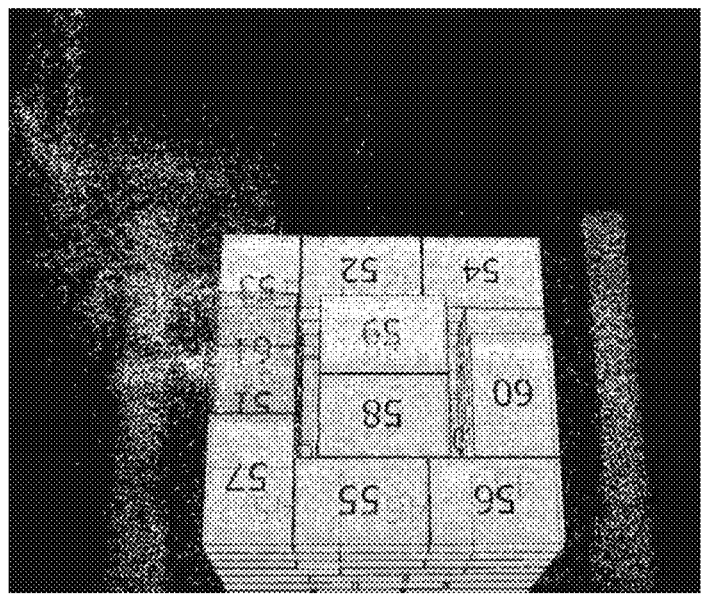
Figure 7B:
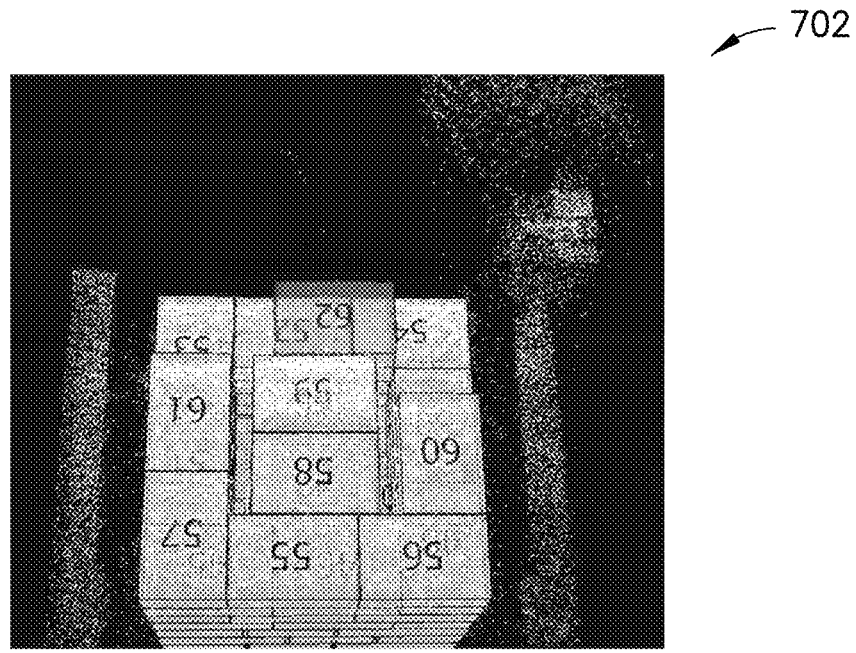
Figure 7C:
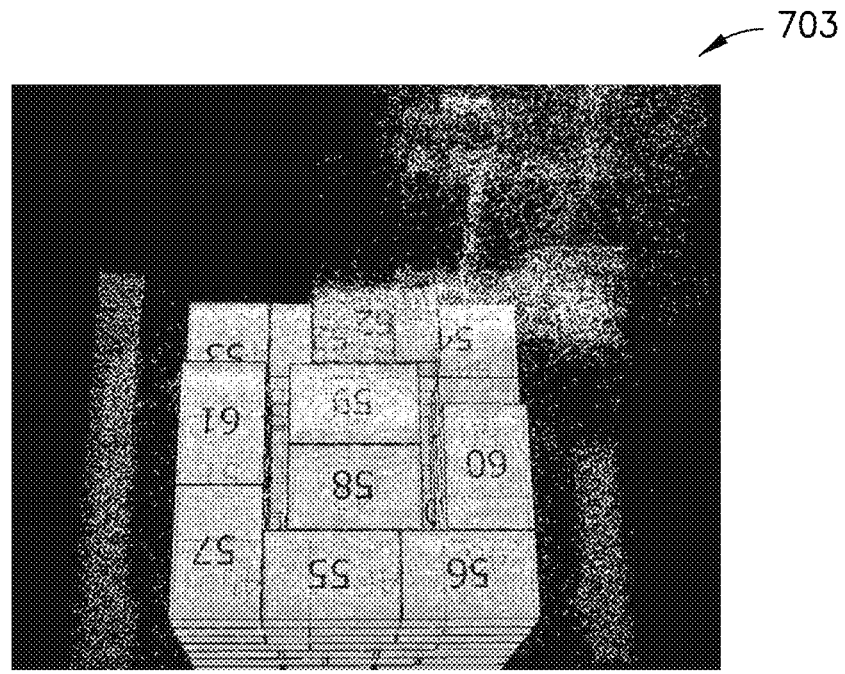
Figure 7D:
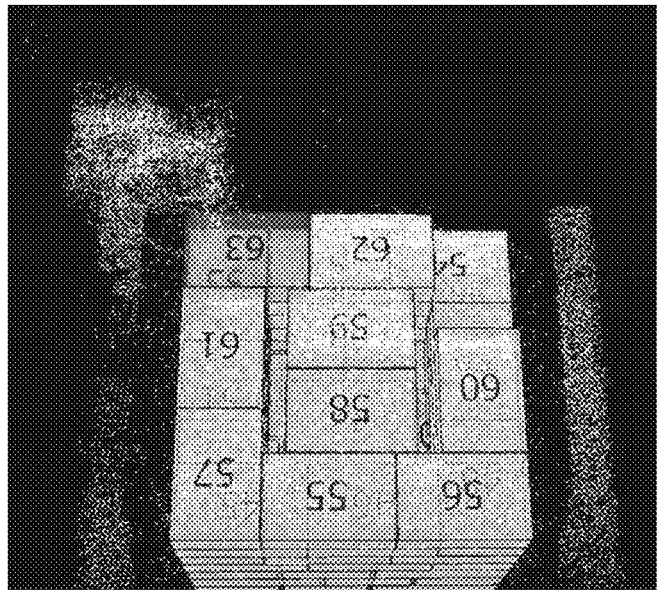
Figure 7E:
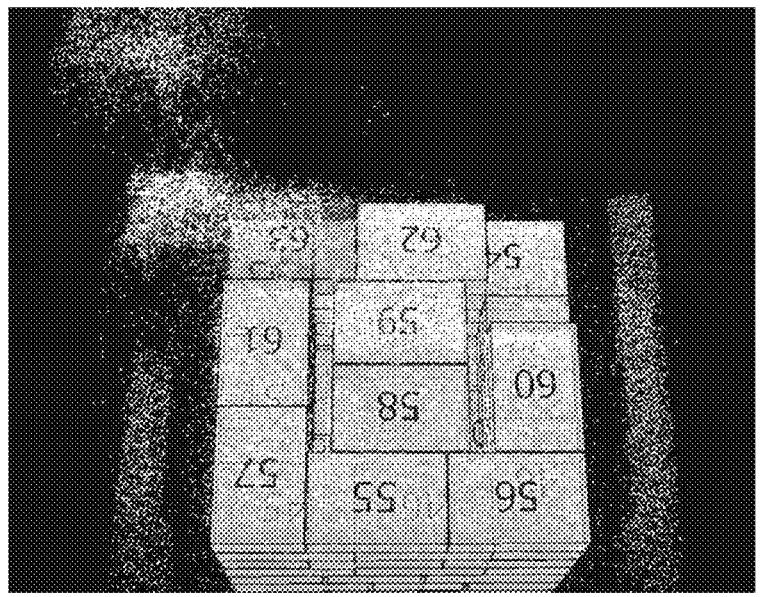
Figure 7F:
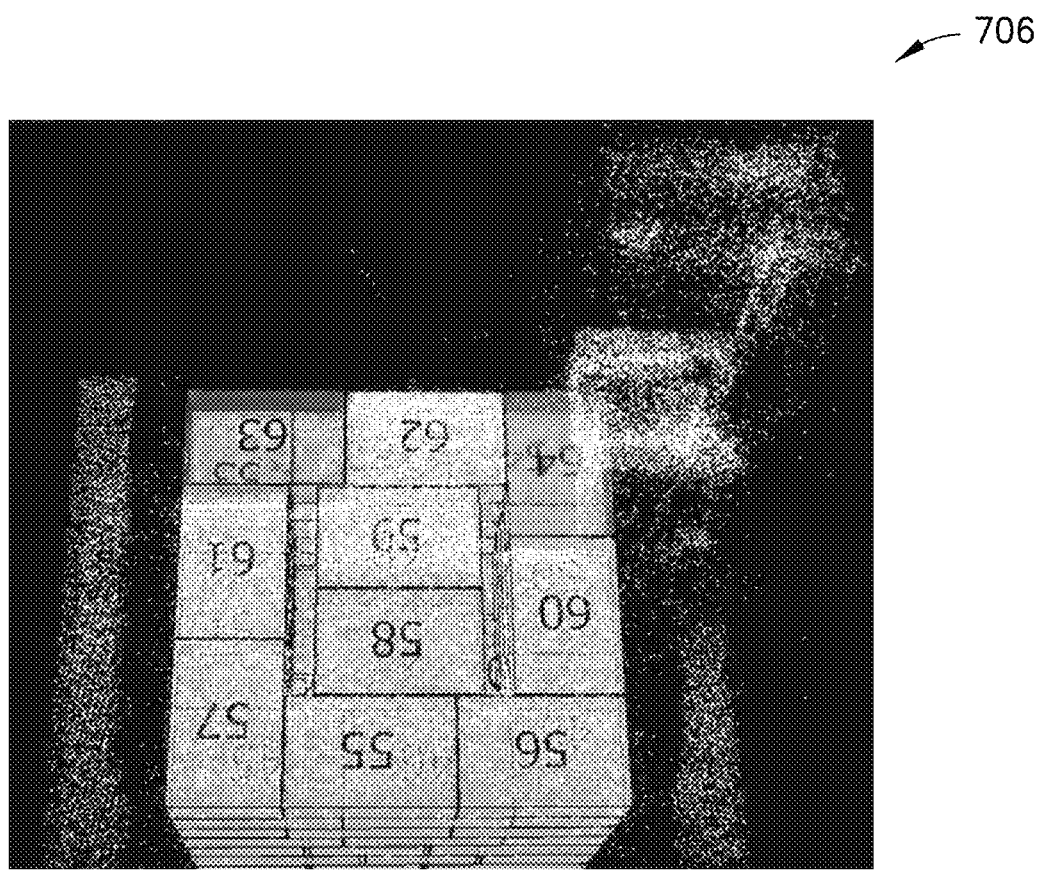
Figure 8:
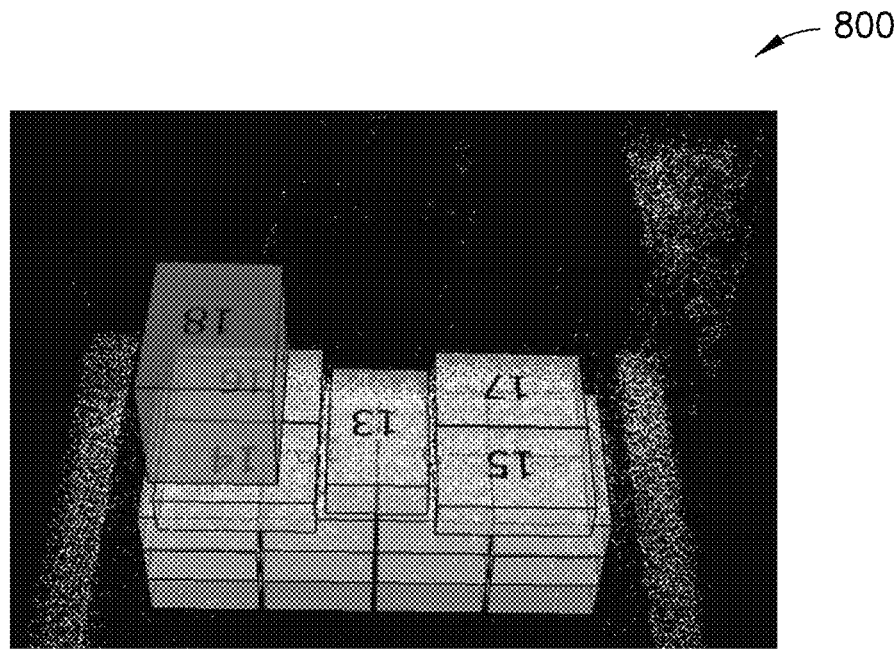
FIGS. 8 and 8A-8G illustrate a sequence of real time three-dimensional imaging data (e.g., point cloud data) from a vision system of a palletizer cell corresponding to a pallet build where a fallen case unit (e.g. the case unit has fallen on the pallet) is detected by the vision system upon placement of the case unit(s) in accordance with aspects of the present disclosure.
Figure 8A:
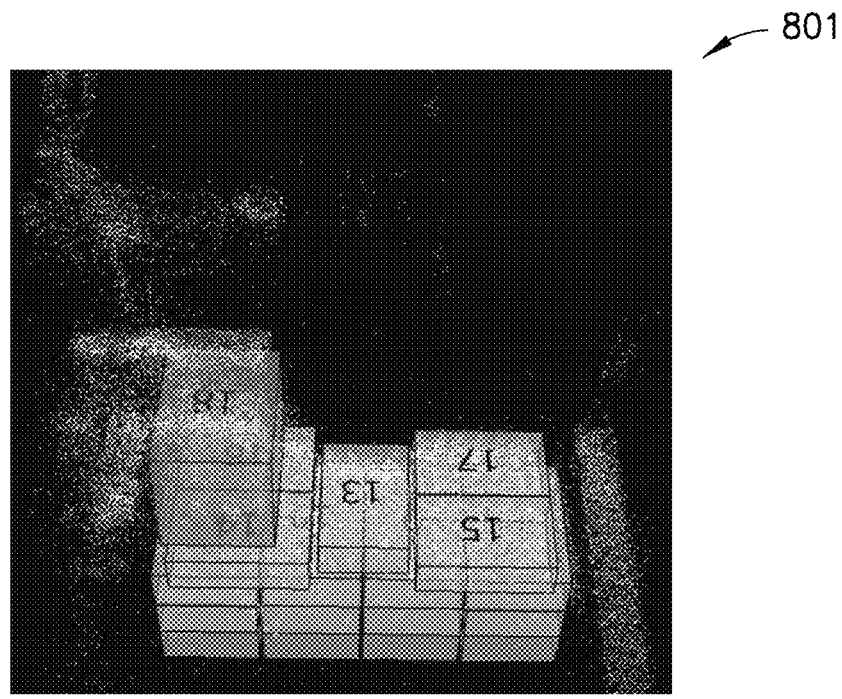
Figure 8B:
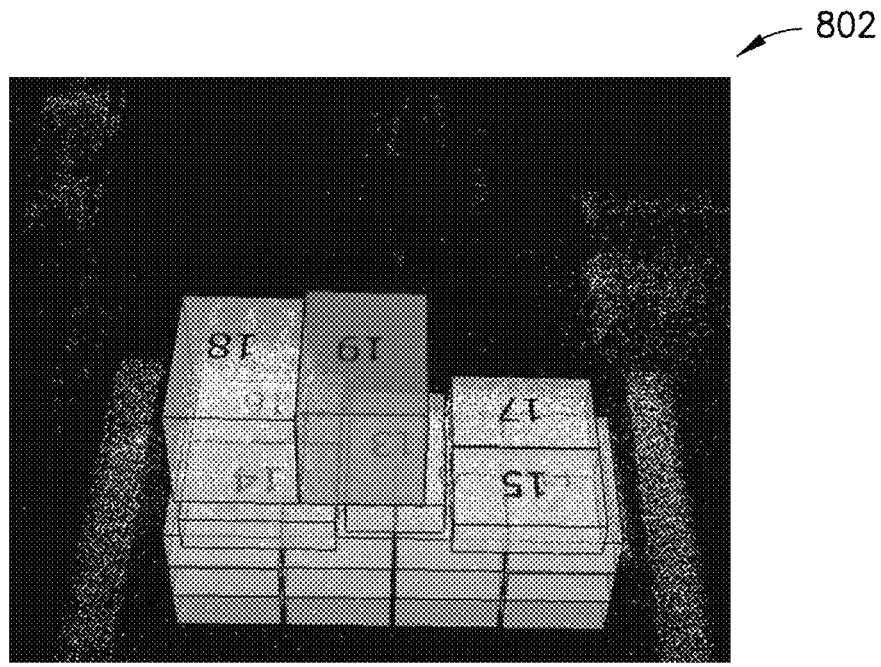
Figure 8C:
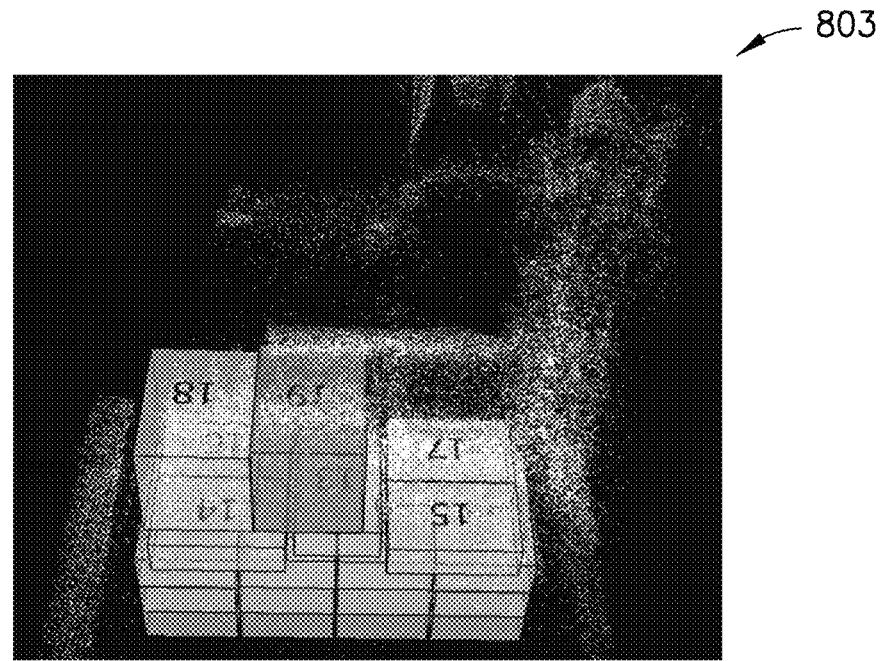
Figure 8D:
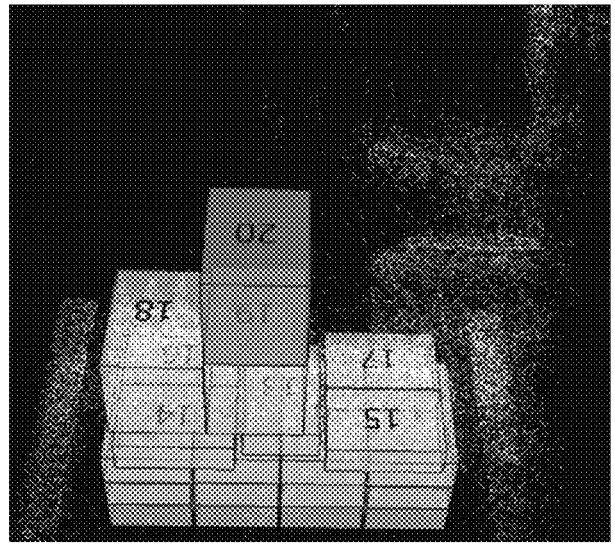
Figure 8E:
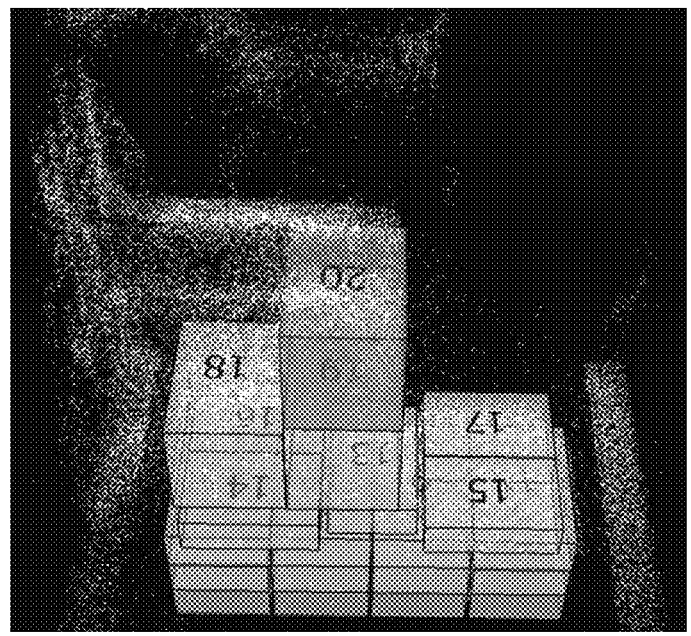
Figure 8F:
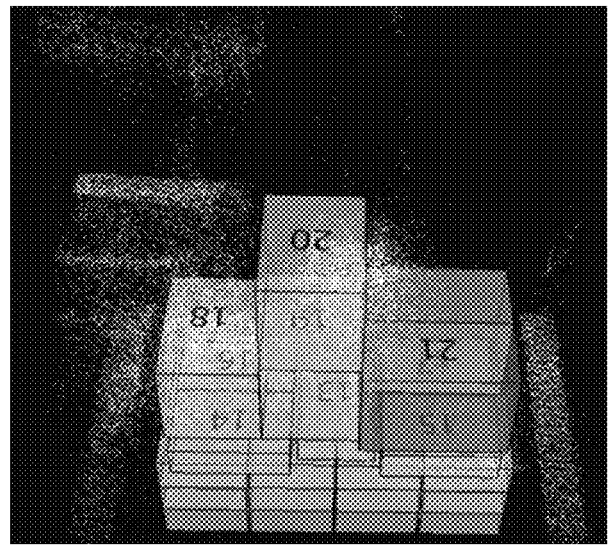
Figure 8G:
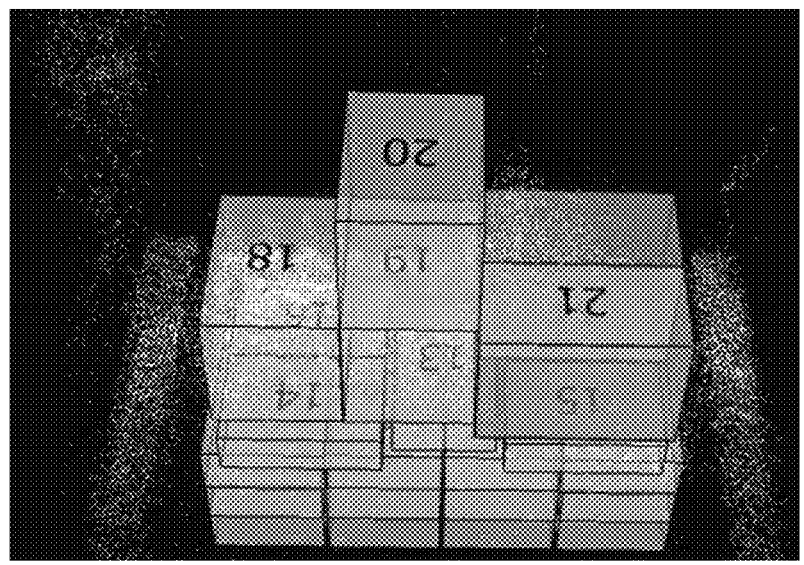

Similarly the controller 10C is configured to determine and discriminate case pose variances due to robot 14 place effects (as shown in, e.g., FIGS. 5-5G) and those due to environmental history changes (as shown in, e.g., FIGS. 6-7F). Here the controller 10C determines corresponding case unit CU position compensation based on and as appropriate for each case type and generates robot motion signals 390 and user cooperation signals 391 corresponding to compensation and user response as described herein. As noted herein, each three-dimensional imaging, upon placement of each given case unit CU, images the given placed case unit CU (with registered identification, corresponding robot place motion and pose/reference place pose) and the whole (or predetermined part) of the pallet load build (from initial case placement to the given placed case associated with imaging) as affected by environmental history changes. Accordingly, pose validation/variance amount (as described above) is determined real time upon placement of the given case unit CU, for the given case unit CU, and for each other case unit CU visible with in the imaging system field of view (e.g., the combined field of view of the at least one camera 310C). Variances in the pose of the given case unit CU determined in real time, based on the imaging upon placement of the case unit CU, are substantially representative of place effects from robot 14 motion.

Variances for each of the other case units CU in the whole (or predetermined part of) pallet load build BPAL imaged upon placement of the given case unit CU, determined in real time, are effected by environmental history changes. Thus, the controller 10C may discriminate (from the real time determination of variance and the correlation of cases and robot 14 place cycles) such variances due to robot 14 place effects from such variance due to environmental history changes (e.g., discrimination of variances by variance cause type). Variance compensation may be different due to the cause type. As may be realized, variance compensation includes static compensation (also referred to herein as pose compensations) and dynamic compensations (e.g., that aim to compensate for robot 14 dynamics in placing cases). Pose compensation (e.g., determination of $\Delta x$, $\Delta y$, $\Delta z$ relative to planned placement) for placement of subsequent or superposed case unit(s) CU based on (and accounting for) the determined pose variance of the three-dimensional imaged case unit CU is substantially homologous for variances effected by robot 14 placement of the given case CU and for variances effected by environmental historic changes in pallet build structure RPAL.

The controller 10C, thus determines the pose variance $V_{(\Delta x, \Delta y, \Delta z)i}$ of a three-dimensionally imaged given case CU, (on placement) and of each other case unit CU in the three-dimensionally imaged whole (or predetermined part) of the pallet load build BPAL and with a suitable algorithm determines the pose compensation $C_{(\Delta x, \Delta y, \Delta z)i}$ for the subsequent, superior, or superposed case unit(s) CU to be placed freely according to the place sequence anywhere in the pallet load build structure RPAL/pallet load build BPAL, and the pose compensation's determination is effected as described herein in real time within the robot(s) 14 place cycle motion, and signaled to the robot(s) 14 to be performed in the next place cycle motion if appropriate. With each imaging, the controller 10C may further update the pose validity/determined variance for each of the other case units CU in the three-dimensionally imaged whole (or predetermined part) of the pallet load PAL from the preceding determination, and may further correlate the location or proximity of each case unit CU and the placed given case location. The variance updates, or changes in pose variance as identified from the updates may be further analyzed, by the controller 10C for identification of possible trends in variances, and pallet load build BPAL stability that may undermine load build stability (the trends may be resolved automatically by the controller 10C or with user assistance).

Similar to the missing case determination, discrimination (e.g., by the controller 10C) as to cause of the pose variance type, enables determination by the controller 10C of dynamic compensation (e.g., robot 14 speed, trajectory, etc.) desired to place subsequent superior and/or superposed case units CU, freely anywhere in the pallet load PAL according to the place sequence and independent of prior case CU placement. In effect, the controller 10C correlates the pose variance $V_{(\Delta x, \Delta y, \Delta z)i}$ of the imaged given placed case unit CU (i.e., the variance substantially due to robot place motion) to bot case end effector kinematics just prior to and at the case place position and determines appropriate changes in bot kinematics for subsequent superior and/or superposed case units CU placed (e.g., based on the correlation and a suitable algorithm/empiric relationship predicting resultant changes in case place pose from changes in robot place motion kinematics). The dynamic compensation desired is signaled to the robot 14 and user as appropriate and the robot 14 kinematic contribution to pose variance, may thus be discriminated and via compensation over a number of rate cycle, be tuned out, resulting in more repeatable case placement pose (e.g., minimizing variances from robot 14 kinematics).

As may be realized, determination of and application of robot 14 dynamic compensation is not limited to occasions of variances substantially due to robot 14 place motion, and may also be determined from the pose variance proximity to thresholds (e.g., stack/pallet overhangs, case unit stack eccentricity, etc., arising from either bot placement of the given place case, and/or environmental historic changes) and likely based on predetermined criteria, to be adversely affected resulting in unacceptable pose from subsequent superior or superposed case unit CU placement. Case units CU with such pose variance may be considered limited stability or limited positioned case units, and resultant robot 14 kinematic compensation may be determined (e.g., in a manner similar to that described herein) in real time, so that subsequent, superior or superposed case units CU may be placed freely anywhere on the pallet load PAL, according to the predetermined place sequence and independent of immediate prior case unit CU placement. The dynamic compensation desired is signaled to the robot 14 and user as appropriate (e.g., the robot 14 is signaled so that the robot kinematic deceleration trajectory is slowed down in respective motion cycle, and the user is signaled to monitor robot 14 place on corresponding robot 14 place motion cycle).

Figure 9:
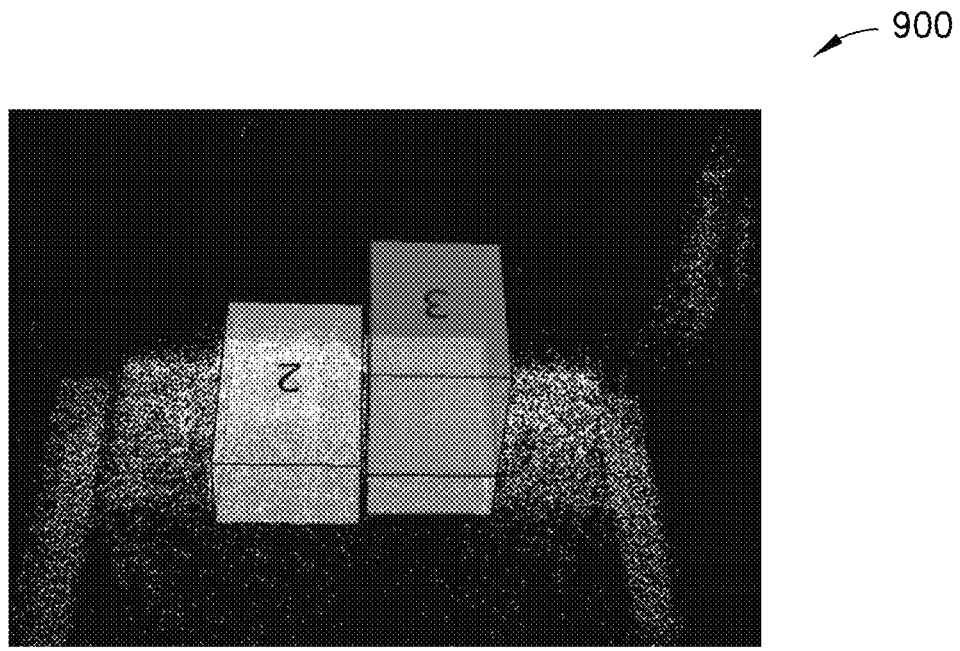
FIGS. 9 and 9A-9E illustrate a sequence of real time three-dimensional imaging data (e.g., point cloud data) from a vision system of a palletizer cell corresponding to a pallet build where a fallen case unit (e.g. the case unit has fallen from above the pallet onto the pallet or pallet building base) is detected by the vision system upon placement of the case unit(s) in accordance with aspects of the present disclosure.
Figure 9A:
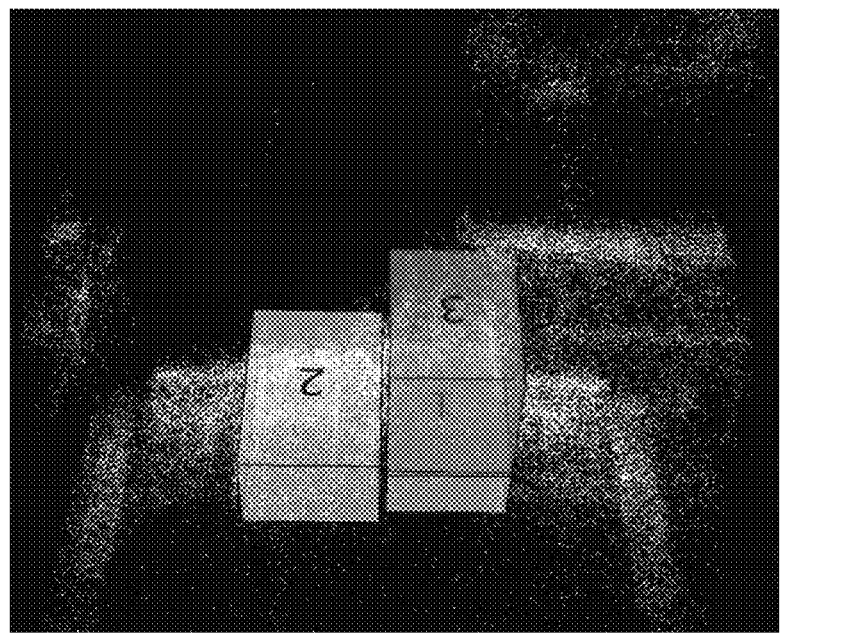
Figure 9B:
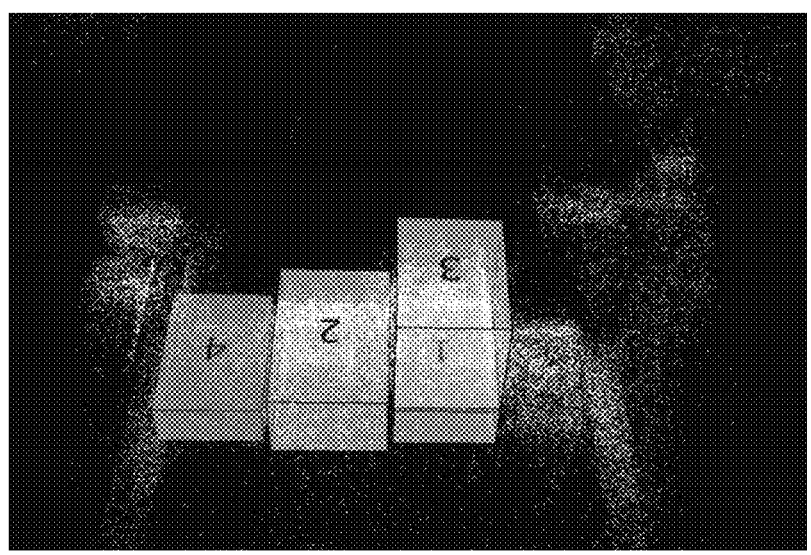
Figure 9C:
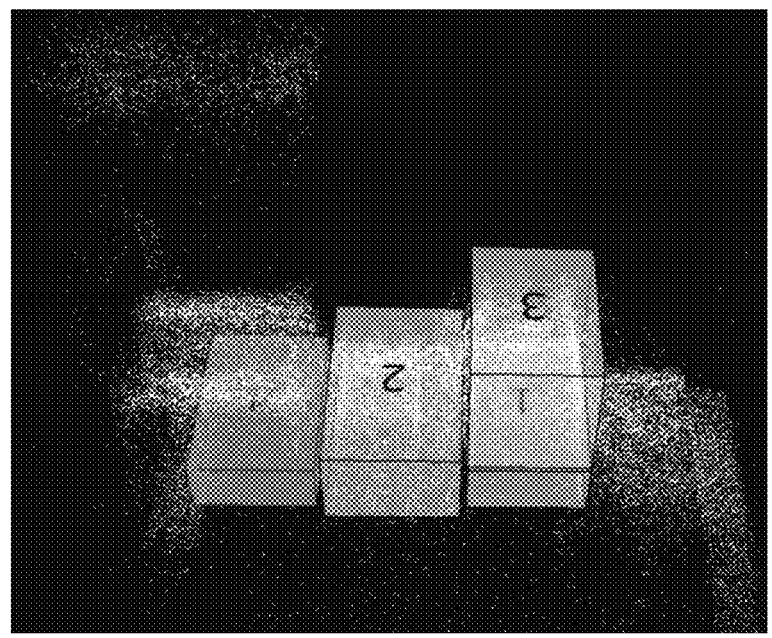
Figure 9D:
Figure 9E:
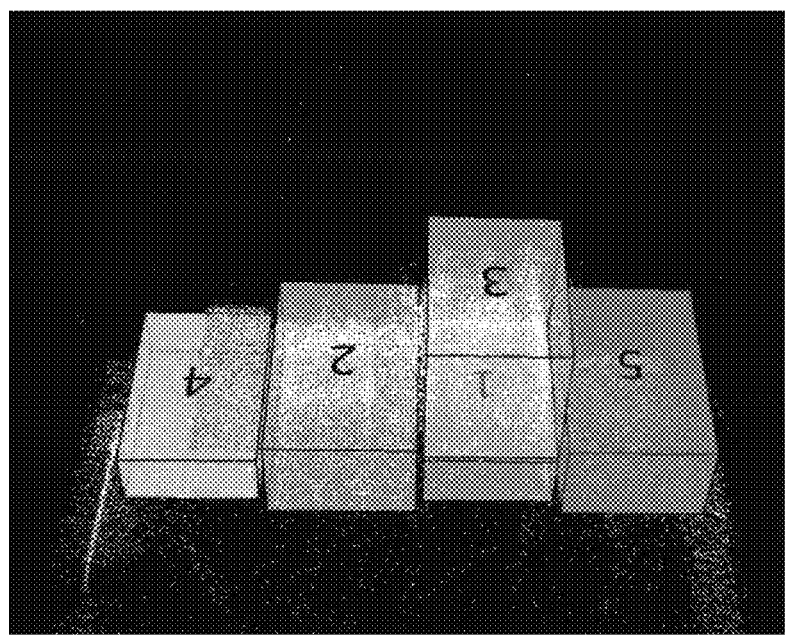
Figure 10:
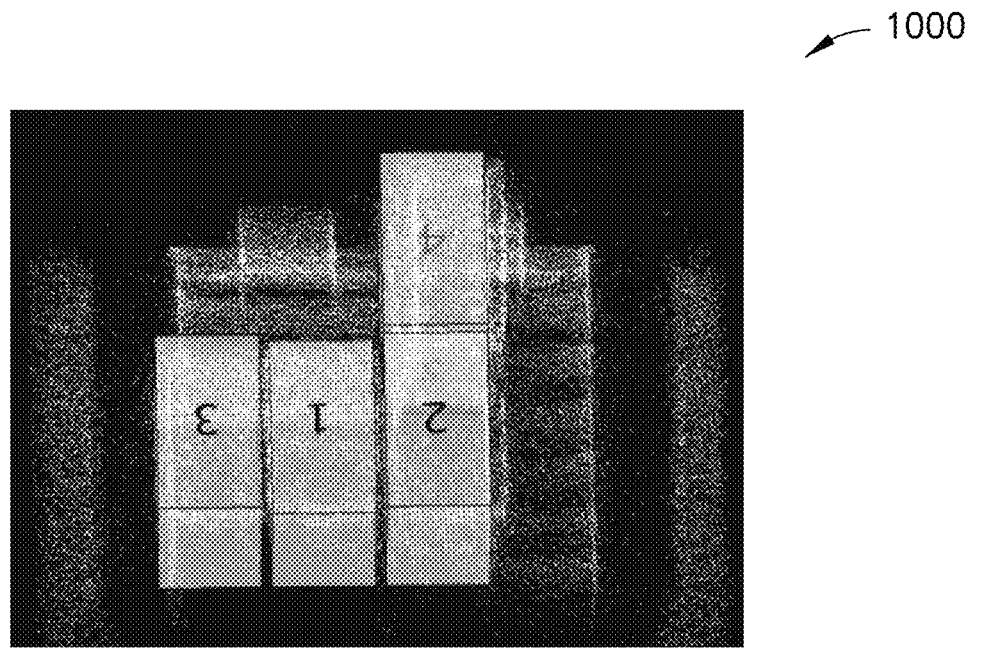
FIGS. 10 and 10A-10D illustrate a sequence of real time three-dimensional imaging data (e.g., point cloud data) from a vision system of a palletizer cell corresponding to a pallet build where a fallen case unit (e.g. the case unit has fallen from above the pallet onto the pallet or pallet building base) is detected by the vision system upon placement of the case unit(s) in accordance with aspects of the present disclosure.
Figure 10A:
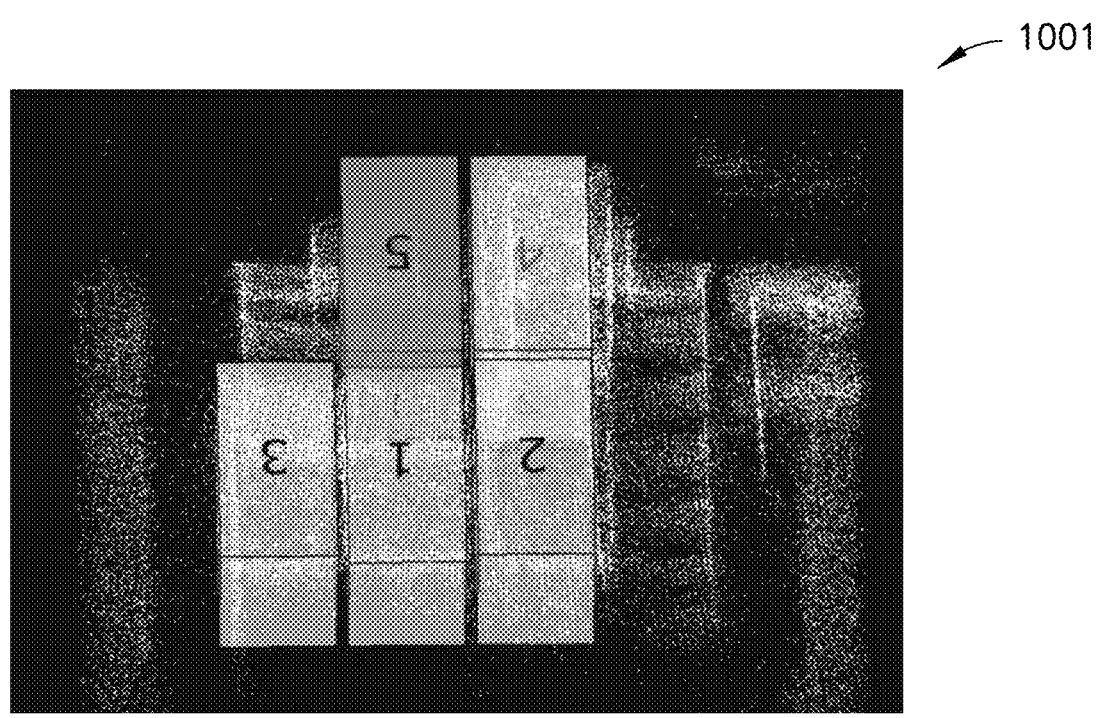
Figure 10B:
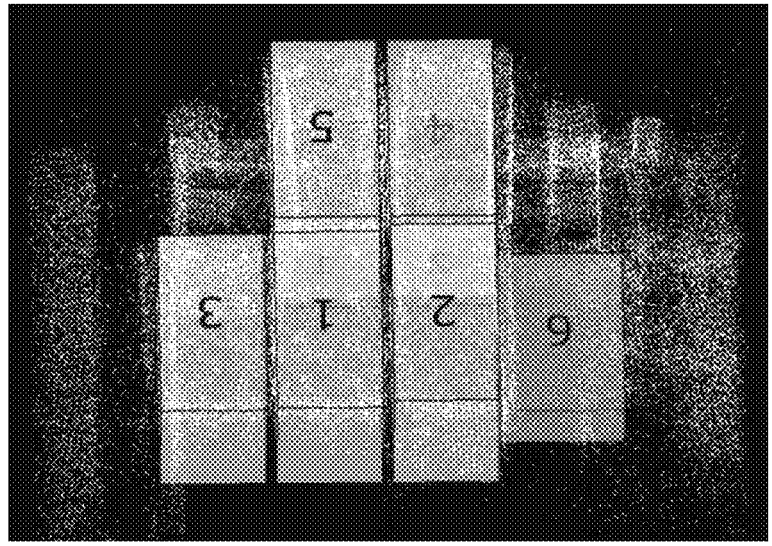
Figure 10C:
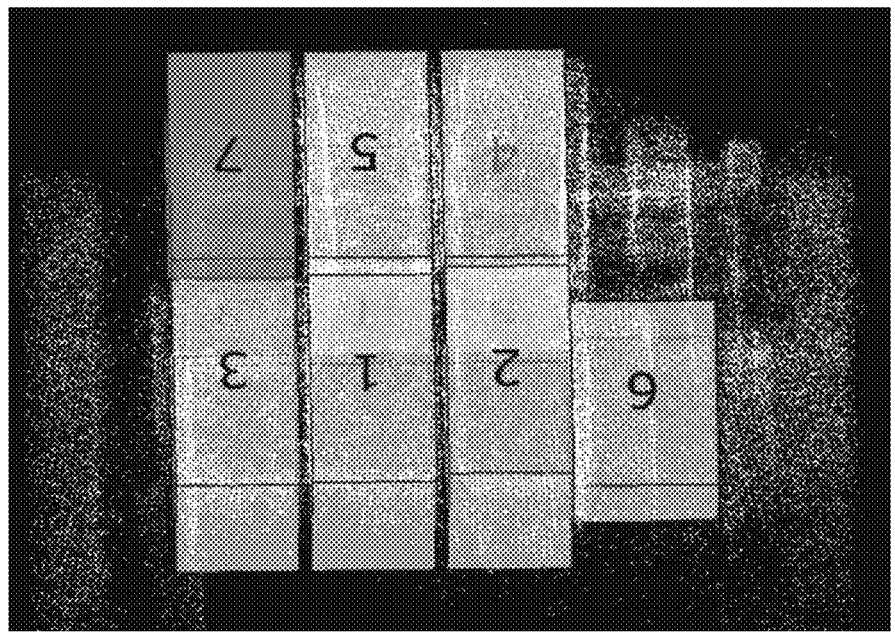
Figure 10D:
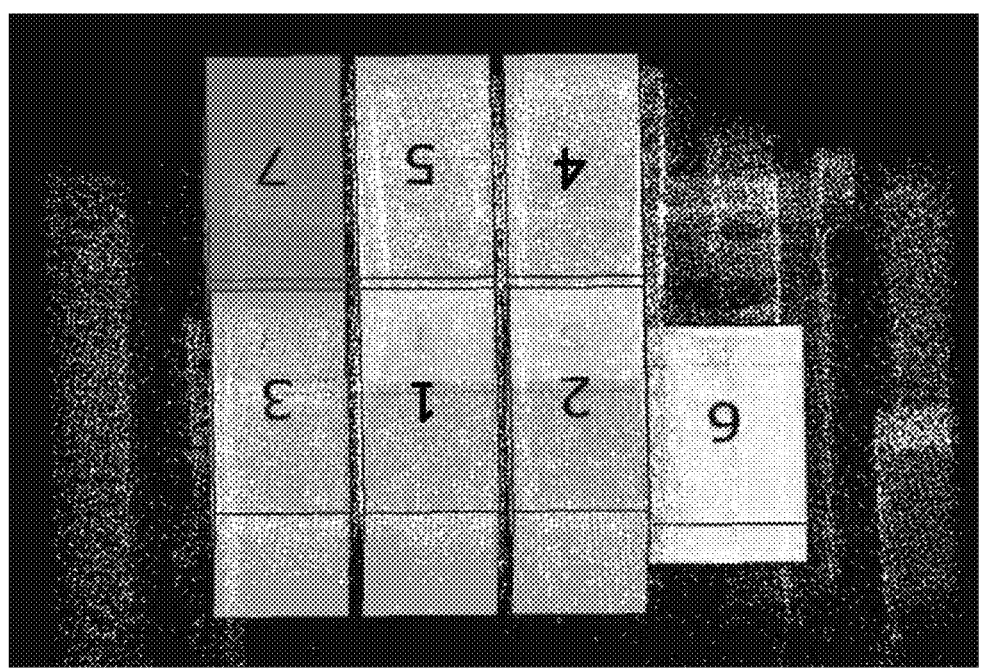

Determination in real time (enabled and facilitated by three-dimensionally imaging the pallet build load structure RPAL, with the vision system 310, upon placement of each given case unit CU place building the pallet build load structure RPAL) of case pose variance and missing case(s) are examples of the broader capabilities of the pallet building apparatus described herein to determine in real time mispresence of cases CU and/or other extraneous or extraordinary (e.g., with respect to pallet build load structure RPAL) articles and objects, causing deviant conditions of the pallet build (e.g. such as case units CU falling onto the pallet as illustrated in the sequence of images provided in FIGS. 9-9E, where case unit 4 falls onto the pallet and FIGS. 10-10D, where case unit 6 is dropped by the robot 14 onto the pallet in an incorrect position) and providing in real time motion commands signals to the robot 14 (e.g., including stopping the robot 14 on a current path and kinematic trajectory, changing the robot 14 kinematic trajectory, slowing the robot 14 on the current path, changing a path of the robot 14 for example to a safe path (towards a zone in which robot path to stop will not encounter potential obstruction, and slowing/stopping robot 14 motion in a safe position)). As noted, the controller 10C registers/catalogues each case unit(s) and its placement in a case unit register 10CR (and updates such register 10CR) with each given case unit CU placement in the pallet load build structure RPAL. In one aspect, the controller 10C is configured so as to determine, in real time, from the corresponding real time three-dimensional imaging data, a build pallet load variance BPV with respect to the predetermined reference (described above), the build pallet load variance BPV being determinative of at least one of an extraneous presence, of an extraneous object in the pallet load build BPAL, and of a mispresence of at least one article unit CU from the pallet load build BPAL.

Three-dimensional imaging of the whole (or predetermined part) of the pallet load build structure RPAL, images the extraneous presence of an extraneous object (e.g., a case unit CU, including a fallen case (such as described above), from somewhere in the pallet load build BPAL, that may or may not be a missing case, or from a region nearby the pallet load shelf (e.g. the pallet building base 301), a misplaced slip sheet, or any other object, workpiece, hand tool, extraneous robot 14 part, etc.) in static position anywhere in the pallet load build structure RPAL upon imaging. The controller 10C determines the presence of the extraneous object (as noted above) anywhere (e.g., each location of structure) from the three-dimensional imaging data in real time (in a manner similar to that described herein), and that the presence is extraneous (e.g., the object is extraneous) by comparing the object shape resolved from the three-dimensional imaging data, to plan shapes (e.g., is the object shape regular such as conforming to shapes/dimensions of a case unit CU or other pallet load article unit CU identified by the pallet load plan) for conformance.

The controller 10C is configured so as to generate in real time a robot motion signal 390 and a user cooperation signal 391, both dependent on at least one of the real time determined build pallet load variance BPV, the robot motion signal 390 being generated real time so as to be performed real time by the robot(s) 14 substantially continuously building the pallet load build BPAL substantially coincident with imaging of the pallet load build BPAL, between placement, by the robot(s) 14, of serially consecutive pallet load article units CU, placed immediately prior and immediately after imaging of the pallet load build BPAL showing the determined build pallet load variance BPV. For example, if the shape is a non-conformal shape, the controller 10C identifies if the position of the non-conformal shape is interfering with (e.g., a deviant condition) the next (or next series) of place actions of the substantially continuous place motion cycle, and if so commands the robot 14 real time with corresponding robot motion signal 390 (as described above). The controller 10C may also signal the deviant condition to the user, noting the extraneous presence, location, and robot 14 safe timing/condition so that the user may remove or reposition the non-conformal object corresponding to the non-conformal shape in the image. The controller 10C is configured, in the event the shape resolved is generally regular (e.g., straight or other geometrically defined features/shapes) to resolve attitude or orientation with respect to the relevant frame of reference to determine if the object is a tilted case (as illustrated in FIGS. 5-5G) (this presents a further variant of the pose determination) and in response identify as such to the user and motion command the robot 14. If the shape is regular, the controller 10C may compare the place registry and missing case unit(s) and determine if the object is a fallen case and address tilted cases similarly.

Figure 11:
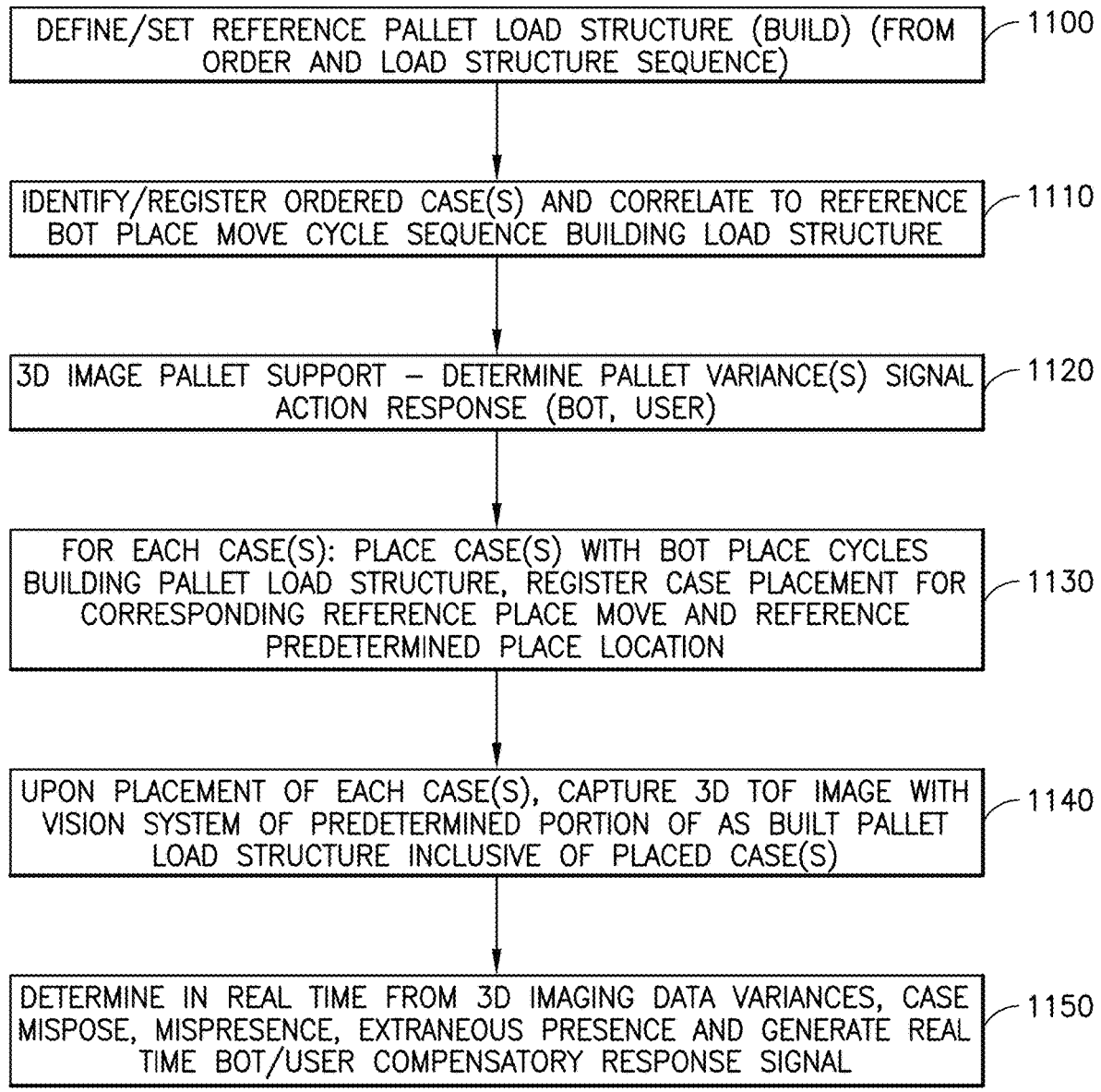
FIG. 11 is a flow diagram in accordance with aspects of the present disclosure.

Referring now to FIGS. 1, 2, 3 and 11, an exemplary operation of the adaptive palletizer system 300 will be described. In one aspect, any suitable controller of the warehouse system 100WS (such as controller 10C of the adaptive palletizer system 300) defines and sets a reference pallet load build structure REFPAL (FIG. 2) (FIG. 11, Block 1100). The reference pallet load structure REFPAL may be defined and set from an order and/or load structure sequence output from the automated storage and retrieval system 100. The ordered case units CU are identified and registered in any suitable manner and correlated to reference robot 14 place move cycle sequences building the pallet load build structure RPAL (FIG. 11, Block 1110). For example, ordered case units may be identified by any suitable controller, such as controller 199C for picking from the storage and retrieval system 100 storage structure 130. These identified case units CU may be communicated from controller 199C to controller 10C of the adaptive palletizer system 300 so that the controller 10C correlates the identified case units CU to robot(s) 14 move sequences for building a stable pallet load build structure RPAL. It is noted, as described above, that each palletizer cell 10 may include a corresponding case unit inspection cell 142 (FIG. 1) for verifying and registering the received ordered case units CU in the register 10CR.

The vision system 310 three-dimensionally images the pallet support SPAL and determined pallet variances (as described above) and generates any necessary user cooperation signals 391 and/or robot motion signals 390 in response to the determined pallet variances (FIG. 11, Block 1120). The controller 10C is configured to command the robot(s) 14 for placing the case unit(s) CU on the pallet support SPAL for building the pallet load build structure RPAL. For example, for each case(s), the case(s) is placed with a bot place cycle to build the pallet load build structure RPAL. The controller 10C is configured to register each case placement (e.g. in register 10CR) for a corresponding reference place move and a reference predetermined location (as determined from the reference pallet load build structure REFPAL) (FIG. 11, Block 1130). Upon placement of each case unit CU in the pallet load build structure RPAL, the vision system 300 captures (as described above) a three-dimensional, time of flight, image of the whole, or predetermined portion, of the as build pallet load structure (e.g. the pallet load build BPAL on the pallet support SPAL), where the image is inclusive of previously placed case unit(s) CU (FIG. 11, Block 1140). The controller 10C is configured, as described above, to determine in real time from the three-dimensional image data variances (which include, as described above, mispresence, extraneous presence, mispose); and generate real time compensatory bot motion signals 390 and compensatory user cooperation signals 391, as described above (FIG. 11, Block 1150).

Figure 12:
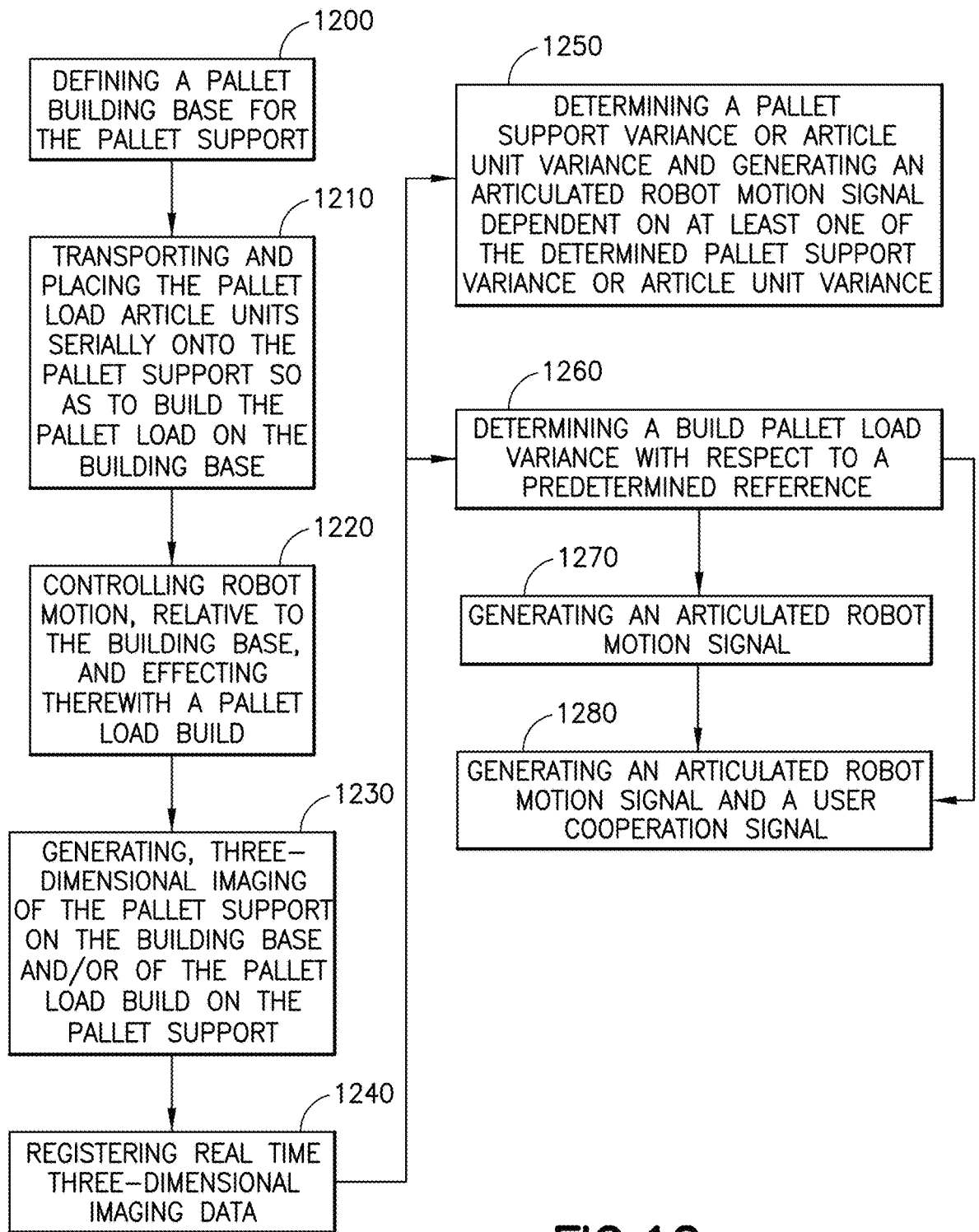
FIG. 12 is a flow diagram in accordance with aspects of the present disclosure.

Referring now to FIGS. 1, 2, 3 and 12, an exemplary operation of the adaptive palletizer system 300 will be described. In one aspect, a pallet load is automatically built from pallet load article units CU onto a pallet support SPAL by defining, with a frame 300F, a pallet building base 301 for the pallet support SPAL (FIG. 12, Block 1200). At least one articulated robot 14 connected to the frame 300F transports and places (as described above) the pallet load article units CU serially onto the pallet support SPAL so as to build the pallet load PAL on the pallet building base 301. (FIG. 12, Block 1210). The articulated robot 14 motion is controlled, relative to the pallet building base 301, with the controller 10C, which is operably connected to the at least one articulated robot 14, to effect therewith a pallet load build BPAL of the pallet load PAL (FIG. 12, Block 1220). Three-dimensional imaging of the pallet support SPAL on the pallet building base 301 and of the pallet load build BPAL on the pallet support SPAL is generated (as described above) with at least one three-dimensional, time of flight, camera 310C, where the at least one three-dimensional camera 310C is communicably coupled to the controller 10C (FIG. 12, Block 1230). The controller 10C registers, from the at least one three-dimensional camera 310C, real time three-dimensional imaging data embodying different corresponding three-dimensional images of the pallet support SPAL and of each different one of the pallet load article units CU, and of the pallet load build BPAL (FIG. 12, Block 1240).

In one aspect, the controller 10C determines, in real time, from the corresponding real time three-dimensional imaging data, a pallet support variance PSV (FIG. 3) or article unit variance AUV (FIG. 3) of at least one of the pallet load article units CU in the pallet load build BPAL with respect to the predetermined reference (as described above). The controller 10C also generates in real time an articulated robot motion signal 390 dependent on at least one of the real time determined pallet support variance PSV or article unit variance AUV, the articulated robot motion signal 390 being generated real time so as to be performed real time by the at least one articulated robot 14 between placement, by the at least one articulated robot 14, of at least one pallet load article unit CU and a serially consecutive pallet load article unit CU enabling substantially continuous building of the pallet load build BPAL (FIG. 12, Block 1250).

In one aspect, the controller 10C determines in real time, from the corresponding real time three-dimensional imaging data, a build pallet load variance BPV with respect to the predetermined reference (as described above) (FIG. 12, Block 1260). The build pallet variance BPV includes load identification of at least one of a presence of an extraneous object 233 in the pallet load build BPAL and a mispresence of at least one pallet load article unit CU from the pallet load build BPAL. The controller 10C generates, in real time an articulated robot motion signal 390 (FIG. 12, Block 1270), or an articulated robot motion signal 390 and a user cooperation signal 391 (FIG. 12, Block 1280), dependent on at least one of the real time determined build pallet load variance BPV, where the articulated robot motion signal 390 is generated real time so as to be performed real time by the articulated robot 14 substantially continuously building the pallet load build BPAL substantially coincident with imaging of the pallet load build BPAL, between placement, by the articulated robot 14, of serially consecutive pallet load article units CU, placed immediately prior and immediately after imaging of the pallet load build BPAL showing the determined build pallet load variance BPV.

In accordance with one or more aspects of the disclosed embodiment a pallet building apparatus for automatically building a pallet load of pallet load article units onto a pallet support is provided. The pallet building apparatus comprises:
- a frame defining a pallet building base for the pallet support;
- at least one articulated robot connected to the frame and configured so as to transport and place the pallet load article units serially onto the pallet support so as to build the pallet load on the pallet building base;
- a controller operably connected to the at least one articulated robot and configured to control articulated robot motion, relative to the pallet building base, and effect therewith a pallet load build of the pallet load;
- at least one three-dimensional, time of flight, camera disposed so as to generate three-dimensional imaging of the pallet support on the pallet building base and of the pallet load build on the pallet support;
- wherein the at least one three-dimensional camera is communicably coupled to the controller so the controller registers, from the at least one three-dimensional camera, real time three-dimensional imaging data embodying different corresponding three-dimensional images of the pallet support and of each different one of the pallet load article units, and of the (building) pallet load build, and
- the controller is configured so as to determine, in real time, from the corresponding real time three-dimensional imaging data, a pallet support variance or article unit variance of at least one of the pallet load article units in the pallet load build with respect to a predetermined reference, and generate in real time an articulated robot motion signal dependent on at least one of the real time determined pallet support variance or article unit variance, the articulated robot motion signal being generated real time so as to be performed real time by the at least one articulated robot between placement, by the at least one articulated robot, of at least one pallet load article unit and a serially consecutive pallet load article unit enabling substantially continuous building of the pallet load build.

In accordance with one or more aspects of the disclosed embodiment the at least one three-dimensional camera is configured so as to effect three-dimensional imaging of the pallet support on the pallet building base and of the pallet load build on the pallet support with the at least one articulated robot effecting substantially continuous pick/place cycles from an input station and placing each of the pallet load article units building the pallet load on the pallet building base.

In accordance with one or more aspects of the disclosed embodiment the at least one three-dimensional camera is configured so as to effect three-dimensional imaging of each respective pallet load article unit substantially coincident with placement of the respective pallet load article unit by the at least one articulated robot effecting substantially continuous pick/place cycles from an input station and placing the pallet load article unit building the pallet load build substantially continuously.

In accordance with one or more aspects of the disclosed embodiment the at least one articulated robot motion signal generated by the controller is a stop motion signal along a pick/place path of the at least one articulated robot, a slow motion signal along the pick/place path of the at least one articulated robot, or a move to a safe position along safe stop path of the at least one articulated robot, different from the pick/place path.

In accordance with one or more aspects of the disclosed embodiment the articulated robot motion signal generated by the controller is a place position signal setting a place position of at least another pallet load article unit based on the pallet support the article unit variance.

In accordance with one or more aspects of the disclosed embodiment the predetermined reference includes a predetermined pallet support inspection reference defining a predetermined pallet support structure reference characteristic.

In accordance with one or more aspects of the disclosed embodiment the determined pallet support variance is a difference determined by the controller between the predetermined pallet support structure reference characteristic and a characteristic of the pallet support, imaged by the at least one three-dimensional camera, corresponding thereto resolved in real time by the controller from the three-dimensional imaging data.

In accordance with one or more aspects of the disclosed embodiment the controller is configured to compare the determined pallet support variance with a predetermined threshold for at least one predetermined pallet support structure reference characteristic, generate an articulated robot motion signal (commanding articulated robot stop and/or changing a articulated robot motion path and/or trajectory) if the determined pallet support variance is greater than the predetermined threshold, and if the determined pallet support variance is less than the predetermined threshold, generate an article unit place position signal identifying placement of at least another pallet load article unit building the pallet load build to the at least one articulated robot.

In accordance with one or more aspects of the disclosed embodiment the controller is configured to set a pallet support base datum of the pallet support, imaged by the at least one three-dimensional camera, from the pallet support variance, which pallet support base datum resolves local base surface variance at each different article unit place location on the pallet support and defines a real time local article unit position base reference for articulated robot placement of the at least one article unit of a base article unit layer of pallet load build.

In accordance with one or more aspects of the disclosed embodiment the pallet support base datum defines base planarity of the pallet support, and the controller is configured to send signal to a user, with information describing base planarity characteristic, to enable selection of the at least one pallet load article unit of the base layer, from a number of different size pallet load article units of the pallet load, and of a corresponding placement location on the pallet support so as to form the base layer based on base planarity.

In accordance with one or more aspects of the disclosed embodiment the base planarity characteristic information describes planarity variance for a corresponding area of the base datum in real time, and the controller is configured to identify, from the different size pallet load article units of the pallet load, one or more pallet load article units sized so as to seat stably on the corresponding area so as to form the base layer.

In accordance with one or more aspects of the disclosed embodiment the pallet support base datum defines base planarity of the pallet support, and the controller is configured to select the at least one pallet load article unit of the base layer, from a number of different size pallet load article units of the pallet load, and a corresponding placement location on the pallet support so as to form the base layer based on base planarity.

In accordance with one or more aspects of the disclosed embodiment the controller is configured so as to determine in real time, from the real time three-dimensional imaging data and substantially coincident with setting of the pallet support base datum, lateral bounds of the pallet support base datum, wherein at least one of the lateral bounds forms a lateral reference defining position datum lateral and orientation of the pallet load build on the pallet load base datum, and forming a reference frame for placement position of the at least one pallet load article unit with the at least one articulated robot building the pallet load build.

In accordance with one or more aspects of the disclosed embodiment the predetermined reference includes a predetermined reference position of the at least one pallet load article unit in a predetermined reference pallet load build corresponding to the building pallet load build on the pallet support.

In accordance with one or more aspects of the disclosed embodiment the determined article unit variance is a difference determined by the controller between a position, resolved in real time by the controller from the three-dimensional imaging data, of the at least one pallet load article unit in the pallet load build and the predetermined reference position of the at least one pallet load article unit.

In accordance with one or more aspects of the disclosed embodiment a pallet building apparatus for automatically building a pallet load of pallet load article units onto a pallet support is provided. The pallet building apparatus comprises:
 a frame defining a pallet building base for the pallet support;
 at least one articulated robot connected to the frame and configured so as to transport and place the pallet load article units serially onto the pallet support so as to build the pallet load on the pallet building base;
 a controller operably connected to the at least one articulated robot and configured to control articulated robot motion, relative to the pallet building base, and effect therewith the building of a pallet load build corresponding to the pallet load;
 at least one three-dimensional, time of flight, camera disposed so as to generate three-dimensional imaging of the pallet load build on the pallet support on the pallet building base;
 wherein the at least one three-dimensional camera is communicably coupled to the controller so the controller registers, from the three-dimensional camera, real time three-dimensional imaging data embodying different corresponding three-dimensional images of each different one of the pallet load article units, of the (building) pallet load build, and
 the controller is configured so as to determine, in real time, from the corresponding real time three-dimensional imaging data, a build pallet load variance with respect to a predetermined reference, the build pallet load variance including identifying at least one of a presence of an extraneous object in the pallet load build and of a mispresence (i.e., mispresence is an erroneous orientation or missing presence of the article unit) of at least one pallet load article unit from the pallet load build; and
 the controller is configured so as to generate in real time an articulated robot motion signal dependent on the real time determined build pallet load variance, and the articulated robot motion signal being generated real time so as to be performed real time by the articulated robot substantially continuously building the pallet load build substantially coincident with imaging of the pallet load build, between placement, by the articulated robot, of serially consecutive pallet load article units, placed immediately prior and immediately after imaging of the pallet load build showing the determined build pallet load variance.

In accordance with one or more aspects of the disclosed embodiment the at least one three-dimensional camera is configured so as to effect three-dimensional imaging of the pallet support on the pallet building base and of the pallet load build on the pallet support with the at least one articulated robot effecting substantially continuous pick/place cycles from an input station and placing each of the pallet load article units building the pallet load on the pallet building base.

In accordance with one or more aspects of the disclosed embodiment the at least one three-dimensional camera is configured so as to effect three-dimensional imaging of each respective pallet load article unit substantially coincident with placement of the respective pallet load article unit by the at least one articulated robot effecting substantially continuous pick/place cycles from an input station and placing the pallet load article unit building the pallet load build substantially continuously.

In accordance with one or more aspects of the disclosed embodiment the at least one articulated robot motion signal generated by the controller is a stop motion signal along a pick/place path of the at least one articulated robot, a slow motion signal along the pick/place path of the at least one articulated robot, or a move to a safe position along safe stop path of the at least one articulated robot, different from the pick/place path.

In accordance with one or more aspects of the disclosed embodiment the at least one articulated robot motion signal generated by the controller is a place position signal setting a place position of at least another pallet load article unit.

In accordance with one or more aspects of the disclosed embodiment the predetermined reference includes a predetermined pallet support inspection reference defining a predetermined pallet support structure reference characteristic.

In accordance with one or more aspects of the disclosed embodiment the determined build pallet load variance includes a pallet support variance that is a difference determined by the controller between the predetermined pallet support structure reference characteristic and a characteristic of the pallet support, imaged by the at least one three-dimensional camera, corresponding thereto resolved in real time by the controller from the three-dimensional imaging data.

In accordance with one or more aspects of the disclosed embodiment the controller is configured to compare the determined build pallet load variance with a predetermined threshold for at least one predetermined pallet support structure reference characteristic, generate an articulated robot motion signal (commanding articulated robot stop and/or changing a articulated robot motion path and/or trajectory) if the determined build pallet load variance is greater than the predetermined threshold, and if the determined build pallet load variance is less than the predetermined threshold, generate an article unit place position signal identifying placement of at least another pallet load article unit building the pallet load build to the at least one articulated robot.

In accordance with one or more aspects of the disclosed embodiment the controller is configured to set a pallet support base datum of the pallet support, imaged by the at least one three-dimensional camera, from the pallet support variance, which pallet support base datum resolves local base surface variance at each different article unit place location on the pallet support and defines a real time local article unit position base reference for articulated robot placement of the at least one article unit of a base article unit layer of pallet load build.

In accordance with more aspects of the disclosed embodiment the pallet support base datum defines base planarity of the pallet support, and the controller is configured to send a signal to a user, with information describing base planarity characteristic, to enable selection of the at least one pallet load article unit of the base layer, from a number of different size pallet load article units of the pallet load, and of a corresponding placement location on the pallet support so as to form the base layer based on base planarity.

In accordance with one or more aspects of the disclosed embodiment the base planarity characteristic information describes planarity variance for a corresponding area of the base datum in real time, and the controller is configured to identify, from the different size pallet load article units of the pallet load, one or more pallet load article units sized so as to seat stably on the corresponding area so as to form the base layer.

In accordance with one or more aspects of the disclosed embodiment the pallet support base datum defines base planarity of the pallet support, and the controller is configured to select the at least one pallet load article unit of the base layer, from a number of different size pallet load article units of the pallet load, and a corresponding placement location on the pallet support so as to form the base layer based on base planarity.

In accordance with one or more aspects of the disclosed embodiment the controller is configured so as to determine in real time, from the real time three-dimensional imaging data and substantially coincident with setting of the pallet support base datum, lateral bounds of the pallet support base datum, wherein at least one of the lateral bounds forms a lateral reference lateral datum defining position and orientation of the pallet load build on the pallet load base datum, and forming a reference frame for placement position of at least one pallet load article unit with the at least one articulated robot building the pallet load build.

In accordance with more aspects of the disclosed embodiment the predetermined reference includes a predetermined reference position of the at least one pallet load article unit in a predetermined reference pallet load build corresponding to the building pallet load build on the pallet support.

In accordance with one or more aspects of the disclosed embodiment the build pallet load variance includes an article unit variance that is a difference determined by the controller between a position, resolved in real time by the controller from the three-dimensional imaging data, of the at least one pallet load article unit in the pallet load build and the predetermined reference position of the at least one pallet load article unit.

In accordance with one or more aspects of the disclosed embodiment a pallet building apparatus for user-automatic cooperative building of a pallet load of pallet load article units onto a pallet support. The pallet building apparatus comprises:

a frame defining a pallet building base for the pallet support;

at least one robot connected to the frame and configured so as to transport and place the pallet load article units serially onto the pallet support so as to build the pallet load on the pallet building base;

a controller operably connected to the at least one robot and configured to control robot motion, relative to the pallet building base, and effect therewith the building of the pallet load, and coupled to a user interface so as to signal a user for cooperation with the at least one robot effecting building of the pallet load;

at least one three-dimensional, time of flight, camera disposed so as to generate three-dimensional imaging of the pallet load build on the pallet support on the pallet building base;

wherein the at least one three-dimensional camera is communicably coupled to the controller so the controller registers, from the at least one three-dimensional camera, real time three-dimensional imaging data embodying different corresponding three-dimensional images of each different one of the pallet load article units, of the (building) pallet load build, and the controller is configured so as to determine, in real time, from the corresponding real time three-dimensional imaging data, a build pallet load variance with respect to a predetermined reference, the build pallet load variance being determinative of at least one of an extraneous presence, of an extraneous object in the pallet load build, and of a mispresence of at least one article unit from the pallet load build; and the controller is configured so as to generate in real time a robot motion signal and a user cooperation signal, both dependent on at least one of the real time determined build pallet load variance, the robot motion signal being generated real time so as to be performed real time by the robot substantially continuously building the pallet load build substantially coincident with imaging of the pallet load build, between placement, by the robot, of serially consecutive pallet load article units, placed immediately prior and immediately after imaging of the pallet load build showing the determined build pallet load variance, wherein the user cooperation signal defines to the user a deviant condition of the pallet load build and a cooperative action of the user so as to resolve the deviant condition depending on the determined at least one extraneous presence and mispresence.

In accordance with one or more aspects of the disclosed embodiment the robot motion signal generated by the controller is a stop motion signal along a pick/place path of the robot, a slow motion signal along the pick/place path of the robot, or a move to a safe position along safe stop path of the robot, different from the pick/place path.

In accordance with one or more aspects of the disclosed embodiment the user cooperation signal informs the user of different types of user cooperative action resolving the deviant condition depending on the determined at least one extraneous presence and mispresence.

In accordance with one or more aspects of the disclosed embodiment a method for automatically building a pallet load of pallet load article units onto a pallet support is provided. The method comprises:

defining, with a frame, a pallet building base for the pallet support;

transporting and placing, with at least one articulated robot connected to the frame, the pallet load article units serially onto the pallet support so as to build the pallet load on the pallet building base;

controlling articulated robot motion, relative to the pallet building base, with a controller operably connected to the at least one articulated robot and effecting therewith a pallet load build of the pallet load;

generating, with at least one three-dimensional, time of flight, camera, three-dimensional imaging of the pallet support on the pallet building base and of the pallet load build on the pallet support, where the at least one three-dimensional camera is communicably coupled to the controller;

registering with the controller, from the at least one three-dimensional camera, real time three-dimensional imaging data embodying different corresponding three-dimensional images of the pallet support and of each different one of the pallet load article units, and of the (building) pallet load build, and determining with the controller, in real time, from the corresponding real time three-dimensional imaging data, a pallet support variance or article unit variance of at least one of the pallet load article units in the pallet load build with respect to a predetermined reference, and generating in real time an articulated robot motion signal dependent on at least one of the real time determined pallet support variance or article unit variance, the articulated robot motion signal being generated real time so as to be performed real time by the at least one articulated robot between placement, by the at least one articulated robot, of at least one pallet load article unit and a serially consecutive pallet load article unit enabling substantially continuous building of the pallet load build.

In accordance with one or more aspects of the disclosed embodiment the method further comprises three-dimensional imaging, with the at least one three-dimensional camera, of the pallet support on the pallet building base and of the pallet load build on the pallet support with the at least one articulated robot effecting substantially continuous pick/place cycles from an input station and placing each of the pallet load article units building the pallet load on the pallet building base.

In accordance with one or more aspects of the disclosed embodiment the method further comprises three-dimensional imaging, with the at least one three-dimensional camera, of each respective pallet load article unit substantially coincident with placement of the respective pallet load article unit by the at least one articulated robot effecting substantially continuous pick/place cycles from an input station and placing the pallet load article unit building the pallet load build substantially continuously.

In accordance with one or more aspects of the disclosed embodiment the at least one articulated robot motion signal generated by the controller is a stop motion signal along a pick/place path of the at least one articulated robot, a slow motion signal along the pick/place path of the at least one articulated robot, or a move to a safe position along safe stop path of the at least one articulated robot, different from the pick/place path.

In accordance with one or more aspects of the disclosed embodiment the articulated robot motion signal generated by the controller is a place position signal setting a place position of at least another pallet load article unit based on the pallet support variance or the article unit variance.

In accordance with one or more aspects of the disclosed embodiment the predetermined reference includes a predetermined pallet support inspection reference defining a predetermined pallet support structure reference characteristic.

In accordance with one or more aspects of the disclosed embodiment the determined pallet support variance is a difference determined by the controller between the predetermined pallet support structure reference characteristic and a characteristic of the pallet support, imaged by the at least one three-dimensional camera, corresponding thereto resolved in real time by the controller from the three-dimensional imaging data.

In accordance with one or more aspects of the disclosed embodiment the method further comprises comparing, with the controller, the determined pallet support variance with a predetermined threshold for at least one predetermined pallet support structure reference characteristic, generating an articulated robot motion signal (commanding articulated robot stop and/or changing a articulated robot motion path and/or trajectory) if the determined pallet support variance is greater than the predetermined threshold, and if the determined pallet support variance is less than the predetermined threshold, generating an article unit place position signal identifying placement of at least another pallet load article unit building the pallet load build to the at least one articulated robot.

In accordance with one or more aspects of the disclosed embodiment the method further comprises setting, with the controller, t support base datum of the pallet support, imaged by the at least one three-dimensional camera, from the pallet support variance, which pallet support base datum resolves local base surface variance at each different article unit place location on the pallet support and defines a real time local article unit position base reference for articulated robot placement of the at least one article unit of a base article unit layer of pallet load build.

In accordance with one or more aspects of the disclosed embodiment the pallet support base datum defines base planarity of the pallet support, and the method further comprises sending, with the controller, a signal to a user, with information describing base planarity characteristic, to enable selection of the at least one pallet load article unit of the base layer, from a number of different size pallet load article units of the pallet load, and of a corresponding placement location on the pallet support so as to form the base layer based on base planarity.

In accordance with one or more aspects of the disclosed embodiment the base planarity characteristic information describes planarity variance for a corresponding area of the base datum in real time, and the method further comprises identifying with the controller, from the different size pallet load article units of the pallet load, one or more pallet load article units sized so as to seat stably on the corresponding area so as to form the base layer.

In accordance with one or more aspects of the disclosed embodiment the pallet support base datum defines base planarity of the pallet support, and the method further comprises selecting, with the controller, the at least one pallet load article unit of the base layer, from a number of different size pallet load article units of the pallet load, and a corresponding placement location on the pallet support so as to form the base layer based on base planarity.

In accordance with one or more aspects of the disclosed embodiment the method further comprises determining, with the controller in real time, from the real time three-dimensional imaging data and substantially coincident with setting of the pallet support base datum, lateral bounds of the pallet support base datum, wherein at least one of the lateral bounds forms a lateral reference datum defining lateral position and orientation of the pallet load build on the pallet load base datum, and forming a reference frame for placement position of the at least one pallet load article unit with the at least one articulated robot building the pallet load build.

In accordance with one or more aspects of the disclosed embodiment the predetermined reference includes a predetermined reference position of the at least one pallet load article unit in a predetermined reference pallet load build corresponding to the building pallet load build on the pallet support.

In accordance with one or more aspects of the disclosed embodiment the determined article unit variance is a difference determined by the controller between a position, resolved in real time by the controller from the three-dimensional imaging data, of the at least one pallet load article unit in the pallet load build and the predetermined reference position of the at least one pallet load article unit.

In accordance with one or more aspects of the disclosed embodiment a method for automatically building a pallet load of pallet load article units onto a pallet support. The method comprises:
 defining, with a frame, a pallet building base for the pallet support;
 transporting and placing the pallet load article units, with at least one articulated robot connected to the frame, serially onto the pallet support so as to build the pallet load on the pallet building base;
 controlling, with a controller operably connected to the at least one articulated robot, articulated robot motion, relative to the pallet building base, and effecting therewith the building of a pallet load build corresponding to the pallet load;
 generating, with at least one three-dimensional, time of flight, camera, three-dimensional imaging of the pallet load build on the pallet support on the pallet building base where the at least one three-dimensional camera is communicably coupled to the controller;
 registering with the controller, from the three-dimensional camera, real time three-dimensional imaging data embodying different corresponding three-dimensional images of each different one of the pallet load article units, of the (building) pallet load build, and
 determining, with the controller in real time, from the corresponding real time three-dimensional imaging data, a build pallet load variance with respect to a predetermined reference, the build pallet load variance including identifying at least one of a presence of an extraneous object in the pallet load build and of a mispresence (i.e., mispresence is an erroneous position, orientation or missing presence of the article unit) of at least one pallet load article unit from the pallet load build; and
 generating, with the controller, in real time an articulated robot motion signal dependent on at least one of the real time determined build pallet load variance, and the articulated robot motion signal being generated real time so as to be performed real time by the articulated robot substantially continuously building the pallet load build substantially coincident with imaging of the pallet load build, between placement, by the articulated robot, of serially consecutive pallet load article units, placed immediately prior and immediately after imaging of the pallet load build showing the determined build pallet load variance.

In accordance with one or more aspects of the disclosed embodiment the method further comprises three-dimensional imaging, with the at least one three-dimensional camera, of the pallet support on the pallet building base and of the pallet load build on the pallet support with the at least one articulated robot effecting substantially continuous pick/place cycles from an input station and placing each of the pallet load article units building the pallet load on the pallet building base.

In accordance with one or more aspects of the disclosed embodiment the method further comprises three-dimensional imaging, with the at least one three-dimensional camera, of each respective pallet load article unit substantially coincident with placement of the respective pallet load article unit by the at least one articulated robot effecting substantially continuous pick/place cycles from an input station and placing the pallet load article unit building the pallet load build substantially continuously.

In accordance with one or more aspects of the disclosed embodiment the at least one articulated robot motion signal generated by the controller is a stop motion signal along a pick/place path of the at least one articulated robot, a slow motion signal along the pick/place path of the at least one articulated robot, or a move to a safe position along safe stop path of the at least one articulated robot, different from the pick/place path.

In accordance with one or more aspects of the disclosed embodiment the at least one articulated robot motion signal generated by the controller is a place position signal setting a place position of at least another pallet load article unit.

In accordance with more aspects of the disclosed embodiment the predetermined reference includes a predetermined pallet support inspection reference defining a predetermined pallet support structure reference characteristic.

In accordance with one or more aspects of the disclosed embodiment the determined build pallet load variance includes a pallet support variance that is a difference determined by the controller between the predetermined pallet support structure reference characteristic and a characteristic of the pallet support, imaged by the at least one three-dimensional camera, corresponding thereto resolved in real time by the controller from the three-dimensional imaging data.

In accordance with one or more aspects of the disclosed embodiment the method further comprises comparing, with the controller, the determined build pallet load variance with a predetermined threshold for at least one predetermined pallet support structure reference characteristic, generating an articulated robot motion signal (commanding articulated robot stop and/or changing a articulated robot motion path and/or trajectory) if the determined build pallet load variance is greater than the predetermined threshold, and if the determined build pallet load variance is less than the predetermined threshold, generating an article unit place position signal identifying placement of at least another pallet load article unit building the pallet load build to the at least one articulated robot.

In accordance with one or more aspects of the disclosed embodiment the method further comprises setting, with the controller, a pallet support base datum of the pallet support, imaged by the at least one three-dimensional camera, from the pallet support variance, which pallet support base datum resolves local base surface variance at each different article unit place location on the pallet support and defines a real time local article unit position base reference for articulated robot placement of the at least one article unit of a base article unit layer of pallet load build.

In accordance with one or more aspects of the disclosed embodiment the pallet support base datum defines base planarity of the pallet support, and the method further comprises sending, with the controller, a signal to a user, with information describing base planarity characteristic, to enable selection of the at least one pallet load article unit of the base layer, from a number of different size pallet load article units of the pallet load, and of a corresponding placement location on the pallet support so as to form the base layer based on base planarity.

In accordance with one or more aspects of the disclosed embodiment the base planarity characteristic information describes planarity variance for a corresponding area of the base datum in real time, and the method further comprises identifying with the controller, from the different size pallet load article units of the pallet load, one or more pallet load article units sized so as to seat stably on the corresponding area so as to form the base layer.

In accordance with one or more aspects of the disclosed embodiment the pallet support base datum defines base planarity of the pallet support, and the method further comprises selecting, with the controller, the at least one pallet load article unit of the base layer, from a number of different size pallet load article units of the pallet load, and a corresponding placement location on the pallet support so as to form the base layer based on base planarity.

In accordance with more aspects of the disclosed embodiment the method further comprises determining, with the controller in real time, from the real time three-dimensional imaging data and substantially coincident with setting of the pallet support base datum, lateral bounds of the pallet support base datum, wherein at least one of the lateral bounds forms a lateral reference datum defining lateral position and orientation of the pallet load build on the pallet load base datum, and forming a reference frame for placement position of at least one pallet load article unit with the at least one articulated robot building the pallet load build.

In accordance with one or more aspects of the disclosed embodiment the predetermined reference includes a predetermined reference position of the at least one pallet load article unit in a predetermined reference pallet load build corresponding to the building pallet load build on the pallet support.

In accordance with one or more aspects of the disclosed embodiment the build pallet load variance includes an article unit variance that is a difference determined by the controller between a position, resolved in real time by the controller from the three-dimensional imaging data, of the at least one pallet load article unit in the pallet load build and the predetermined reference position of the at least one pallet load article unit.

In accordance with one or more aspects of the disclosed embodiment a method for user-automatic cooperative building of a pallet load of pallet load article units onto a pallet support is provided. The method comprises:
  defining, with a frame, a pallet building base for the pallet support;
  transporting and placing, with at least one robot connected to the frame, the pallet load article units serially onto the pallet support so as to build the pallet load on the pallet building base;
  controlling, with a controller operably connected to the at least one robot, robot motion, relative to the pallet building base, and effecting therewith the building of the pallet load, and signaling, with a user interface coupled to the controller, a user for cooperation with the at least one robot effecting building of the pallet load;
  generating, with at least one three-dimensional, time of flight, camera, three-dimensional imaging of the pallet load build on the pallet support on the pallet building base, where the at least one three-dimensional camera is communicably coupled to the controller;
  registering with the controller, from the at least one three-dimensional camera, real time three-dimensional imaging data embodying different corresponding three-dimensional images of each different one of the pallet load article units, of the (building) pallet load build, and
  determining with the controller, in real time, from the corresponding real time three-dimensional imaging data, a build pallet load variance with respect to a predetermined reference, the build pallet load variance being determinative of at least one of an extraneous presence, of an extraneous object in the pallet load build, and of a mispresence of at least one article unit from the pallet load build; and
  generating, with the controller, in real time a robot motion signal and a user cooperation signal, both dependent on at least one of the real time determined build pallet load variance, the robot motion signal being generated real time so as to be performed real time by the robot substantially continuously building the pallet load build substantially coincident with imaging of the pallet load build, between placement, by the robot, of serially consecutive pallet load article units, placed immediately prior and immediately after imaging of the pallet load build showing the determined build pallet load variance, wherein
  the user cooperation signal defines to the user a deviant condition of the pallet load build and a cooperative action of the user so as to resolve the deviant condition depending on the determined at least one extraneous presence and mispresence.

In accordance with one or more aspects of the disclosed embodiment the robot motion signal generated by the controller is a stop motion signal along a pick/place path of the robot, a slow motion signal along the pick/place path of the robot, or a move to a safe position along safe stop path of the robot, different from the pick/place path.

In accordance with one or more aspects of the disclosed embodiment the user cooperation signal informs the user of different types of user cooperative action resolving the deviant condition depending on the determined at least one extraneous presence and mispresence.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. A method for automatically building a pallet load of pallet load article units onto a pallet support, the method comprising:

defining, with a frame, a pallet building base for the pallet support;

transporting and placing the pallet load article units, with at least one articulated robot connected to the frame, serially onto the pallet support so as to build the pallet load on the pallet building base;

controlling, with a controller operably connected to the at least one articulated robot, articulated robot motion, relative to the pallet building base, and effecting therewith the building of a pallet load build corresponding to the pallet load;

generating, with at least one three-dimensional, time of flight camera, three-dimensional imaging of the pallet load build on the pallet support on the pallet building base, wherein the at least one three-dimensional camera is communicably coupled to the controller;

registering with the controller, from the three-dimensional camera, real time three-dimensional imaging data embodying different corresponding three-dimensional images of each different one of the pallet load article units, of the pallet load build, and determining, with the controller in real time, from the corresponding real time three-dimensional imaging data, a build pallet load variance with respect to a predetermined reference, the build pallet load variance including identifying at least one of a presence of an extraneous object in the pallet load build and of a mispresence of at least one pallet load article unit from the pallet load build; and generating, with the controller, in real time an articulated robot motion signal dependent on at least one of the real time determined build pallet load variance, the articulated robot motion signal being generated in real time so as to be performed in real time by the articulated robot building the pallet load build substantially coincident with the imaging of the pallet load build by the articulated robot, wherein the pallet load build is substantially continuously built by substantially continuous placement of serially consecutive pallet load article units, wherein the consecutive pallet load article units are placed at least one of immediately prior and immediately after the imaging of the pallet load build showing the determined build pallet load variance.

2. The method of claim 1, further comprising three-dimensional imaging, with the at least one three-dimensional camera, of the pallet support on the pallet building base and of the pallet load build on the pallet support with the at least one articulated robot effecting substantially continuous pick/place cycles from an input station and placing each of the pallet load article units building the pallet load on the pallet building base.

3. The method of claim 1, further comprising three-dimensional imaging, with the at least one three-dimensional camera, of each respective pallet load article unit substantially coincident with placement of the respective pallet load article unit by the at least one articulated robot effecting substantially continuous pick/place cycles from an input station and placing the pallet load article unit building the pallet load build substantially continuously.

4. The method of claim 1, wherein the at least one articulated robot motion signal generated by the controller is a stop motion signal along a pick/place path of the at least one articulated robot, a slow motion signal along the pick/place path of the at least one articulated robot, or a move to a safe position along safe stop path of the at least one articulated robot, different from the pick/place path.

5. The method of claim 1, wherein the at least one articulated robot motion signal generated by the controller is a place position signal setting a place position of at least another pallet load article unit.

6. The method of claim 5, wherein the predetermined reference includes a predetermined pallet support inspection reference defining a predetermined t support structure reference characteristic.

7. The method of claim 6, wherein the determined build pallet load variance includes a pallet support variance that is a difference determined by the controller between the predetermined pallet support structure reference characteristic and a characteristic of the pallet support, imaged by the at least one three-dimensional camera, corresponding thereto resolved in real time by the controller from the three-dimensional imaging data.

8. The method of claim 1, further comprising one or more of:

comparing, with the controller, the determined build pallet load variance with a predetermined threshold for at least one predetermined pallet support structure reference characteristic, generating an articulated robot motion signal commanding articulated robot stop, and changing one or more of an articulated robot motion path and an articulated robot trajectory if the determined build pallet load variance is greater than the predetermined threshold, and if the determined build pallet load variance is less than the predetermined threshold, generating an article unit place position signal identifying placement of at least another pallet load article unit building the pallet load build to the at least one articulated robot.

9. The method of claim 1, further comprising setting, with the controller, a pallet support base datum of the pallet support, imaged by the at least one three-dimensional camera, from the pallet support variance, which pallet support base datum resolves local base surface variance at each different article unit place location on the pallet support, and defines a real time local article unit position base reference for articulated robot placement of the at least one article unit of a base article unit layer of the pallet load build.

10. The method of claim 9, wherein the pallet support base datum defines base planarity of the pallet support, and the method further comprises sending, with the controller, a signal information to a user, with describing base planarity characteristic, to enable selection of the at least one pallet load article unit of the base layer, from a number of different size pallet load article units of the pallet load, and of a corresponding placement location on the pallet support so as to form the base layer based on base planarity.

11. The method of claim 10, wherein the base planarity characteristic information describes planarity variance for a corresponding area of the base datum in real time, and the method further comprises identifying with the controller, from the different size pallet load article units of the pallet load, one or more pallet load article units sized so as to seat stably on the corresponding area so as to form the base layer.

12. The method of claim 9, wherein the pallet support base datum defines base planarity of the pallet support, and the method further comprises selecting, with the controller, the at least one pallet load article unit of the base layer, from a number of different size pallet load article units of the pallet load, and a corresponding placement location on the pallet support so as to form the base layer based on base planarity.

13. The method of claim 9, further comprising determining, with the controller in real from time, the real time three-dimensional data imaging and substantially coincident with setting of the pallet support base datum, lateral bounds of the pallet support base datum, wherein at least one of the lateral bounds forms a lateral reference datum defining lateral position and orientation of the pallet load build on the pallet load base datum, and forming a reference frame for placement position of at least one pallet load article unit with the at least one articulated robot building the pallet load build.

14. The method of claim 1, wherein the predetermined reference includes a predetermined reference position of the at least one pallet load article unit in a predetermined reference pallet load build corresponding to the building pallet load build on the pallet support.

15. The method of claim 1, wherein the build pallet load variance includes an article unit variance that is a difference determined by the controller between a position, resolved in real time by the controller from the three-dimensional imaging data, of the at least one pallet load article unit in the pallet load build and the predetermined reference position of the at least one pallet load article unit.

16. A method for user-automatic cooperative building of a pallet load of pallet load article units onto a pallet support, the method comprising:

defining, with a frame, a pallet building base for the pallet support;

transporting and placing, with at least one robot connected to the frame, the pallet load article units serially onto the pallet support so as to build the pallet load on the pallet building base;

controlling, with a controller operably connected to the at least one robot, robot motion, relative to the pallet building base, and effecting therewith the building of the pallet load, and signaling, with a user interface coupled to the controller, a user for cooperation with the at least one robot effecting building of the pallet load;

generating, with at least one three-dimensional, time of flight camera, three-dimensional imaging of the pallet load build on the pallet support on the pallet building base, wherein the at least one three-dimensional camera is communicably coupled to the controller;

registering with the controller, from the at least one three-dimensional camera, real time three-dimensional imaging data embodying different corresponding three-dimensional images of each different one of the pallet load article units, of the pallet load build, and determining with the controller, in real time, from the corresponding real time three-dimensional imaging data, a build pallet load variance with respect to a predetermined reference, the build pallet load variance being determinative of at least one of an extraneous presence, of an extraneous object in the pallet load build, and of a mispresence of at least one article unit from the pallet load build; and generating, with the controller, in real time a robot motion signal and a user cooperation signal, both dependent on at least one of the real time determined build pallet load variance, the robot motion signal being generated in real time so as to be performed in real time by the robot building the pallet load build substantially coincident with the imaging of the pallet load build by the robot, wherein the pallet load build is built by substantially continuous placement of serially consecutive pallet load article units, wherein the consecutive pallet load article units are placed immediately prior or immediately after the imaging of the pallet load build showing the determined build pallet load variance, wherein the user cooperation signal defines to the user a deviant condition of the pallet load build and a cooperative action of the user so as to resolve the deviant condition depending on the determined at least one extraneous presence and mispresence.

17. The method of claim 16, wherein the robot motion signal generated by the controller is a stop motion signal along a pick/place path of the robot, a slow motion signal along the pick/place path of the robot, or a move to a safe position along safe stop path of the robot, different from the pick/place path.

18. The method of claim 16, wherein the user cooperation signal informs the user of different types of user cooperative action resolving the deviant condition depending on the determined at least one extraneous presence and mispresence.

19. The method of claim 16, further comprising one or more of:

comparing, with the controller, the determined build pallet load variance with a predetermined threshold for at least one predetermined pallet support structure reference characteristic, generating an articulated robot motion signal commanding articulated robot stop, and changing one or more of an articulated robot motion path and an articulated robot trajectory if the determined build pallet load variance is greater than the predetermined threshold, and if the determined build pallet load variance is less than the predetermined threshold, generating an article unit place position signal identifying placement of at least another pallet load article unit building the pallet load build to the at least one articulated robot.

20. The method of claim 16, further comprising setting, with the controller, a pallet support base datum of the pallet support, imaged by the at least one three-dimensional camera, from the pallet support variance, which pallet support base datum resolves local base surface variance at each different article unit place location on the pallet support, and defines a real time local article unit position base reference for articulated robot placement of the at least one article unit of a base article unit layer of the pallet load build.

21. A pallet load builder for automatically building pallet load article units onto a pallet support, the pallet load builder comprising:

a frame defining a pallet building base for the pallet support;

at least one articulated robot connected to the frame and configured for transporting and placing the pallet load article units serially onto the pallet support so as to build the pallet load on the pallet building base;

a controller configured to effect the serially loading of the pallet load article units onto the pallet support so as to build the pallet load, wherein the controller effects generation, with at least one three-dimensional, time of flight camera, of three-dimensional imaging of the pallet load build on the pallet support on the pallet building base and registration of real time three-dimensional imaging data embodying different corresponding three-dimensional images of each different one of the pallet load article units, of the pallet load build, so as to determine, in real time, from the corresponding real time three-dimensional imaging data, a build pallet load variance with respect to a predetermined reference, the build pallet load variance including identifying at least one of a presence of an extraneous object in the pallet load build and of a mispresence of at least one pallet load article unit from the pallet load build, and wherein the controller generates, in real time, an articulated robot motion signal dependent on at least one of the real time determined build pallet load variance, the articulated robot motion signal being generated in real time so as to be performed in real time by the articulated robot building the pallet load build substantially coincident with the imaging of the pallet load build by the articulated robot, wherein the pallet load build is substantially continuously built by substantially continuous placement of serially consecutive pallet load article units, wherein the consecutive pallet load article units are placed at least one of immediately prior and immediately after the imaging of the pallet load build showing the determined build pallet load variance.

22. The pallet load builder of claim 21, wherein the at least one three-dimensional camera is configured to three-dimensional image the pallet support on the pallet building base and of the pallet load build on the pallet support with the at least one articulated robot effecting substantially continuous pick/place cycles from an input station and placing each of the pallet load article units building the pallet load on the pallet building base.

23. The pallet load builder of claim 21, wherein the at least one three-dimensional camera is configured to three-dimensional image each respective pallet load article unit substantially coincident with placement of the respective pallet load article unit by the at least one articulated robot effecting substantially continuous pick/place cycles from an input station and placing the pallet load article unit building the pallet load build substantially continuously.

24. The pallet load builder of claim 21, wherein the at least one articulated robot motion signal generated by the controller is a stop motion signal along a pick/place path of the at least one articulated robot, a slow motion signal along the pick/place path of the at least one articulated robot, or a move to a safe position along safe stop path of the at least one articulated robot, different from the pick/place path.

25. The pallet load builder of claim 21, wherein the at least one articulated robot motion signal generated by the controller is a place position signal setting a place position of at least another pallet load article unit.

26. The pallet load builder of claim 25, wherein the predetermined reference includes a predetermined pallet support inspection reference defining a predetermined pallet support structure reference characteristic.

27. The pallet load builder of claim 26, wherein the determined build pallet load variance includes a pallet support variance that is a difference determined by the controller between the predetermined pallet support structure reference characteristic and a characteristic of the pallet support, imaged by the at least one three-dimensional camera, corresponding thereto resolved in real time by the controller from the three-dimensional imaging data.

28. The pallet load builder of claim 21, wherein the controller is further configured to one or more of:
compare the determined build pallet load variance with a predetermined threshold for at predetermined pallet support structure reference characteristic,
generate an articulated robot motion signal commanding articulated robot stop, and
change one or more of an articulated robot motion path and an articulated robot trajectory if the determined build pallet load variance is greater than the predetermined threshold, and if the determined build pallet load variance is less than the predetermined threshold, generating an article unit place position signal identifying placement of at least another pallet load article unit building the pallet load build to the at least one articulated robot.

29. The pallet load builder of claim 21, wherein the controller is configured to set a pallet support base datum of the pallet support, imaged by the at least one three-dimensional camera, from the pallet support variance, which pallet support base datum resolves local base surface variance at each different article unit place location on the pallet support, and defines a real time local article unit position base reference for articulated robot placement of the at least one article unit of a base article unit layer of the pallet load build.

30. The pallet load builder of claim 29, wherein the pallet support base datum defines base planarity of the pallet support, and the controller is configured to send a signal to a user, with information describing base planarity characteristic, to enable selection of the at least one pallet load article unit of the base layer, from a number of different size pallet load article units of the pallet load, and of a corresponding placement location on the pallet support so as to form the base layer based on base planarity.

31. The pallet load builder of claim 30, wherein the base planarity characteristic information describes planarity variance for a corresponding area of the base datum in real time, and the controller is configured to identify, from the different size pallet load article units of the pallet load, one or more pallet load article units sized so as to seat stably on the corresponding area so as to form the base layer.

32. The pallet load builder of claim 29, wherein the pallet support base datum defines base planarity of the pallet support, and the controller is configured to select the at least one pallet load article unit of the base layer, from a number of different size pallet load article units of the pallet load, and a corresponding placement location on the pallet support so as to form the base layer based on base planarity.

33. The pallet load builder of claim 29, wherein the controller is configured to determine, in real time, from the real time three-dimensional imaging data and substantially coincident with setting of the pallet support base datum, lateral bounds of the pallet support base datum, wherein at least one of the lateral bounds forms a lateral reference datum defining lateral position and orientation of the pallet load build on the pallet load base datum, and forming a reference frame for placement position of at least one pallet load article unit with the at least one articulated robot building the pallet load build.

34. The pallet load builder of claim 21, wherein the predetermined reference includes a predetermined reference position of the at least one pallet load article unit in a predetermined reference pallet load build corresponding to the building pallet load build on the pallet support.

35. The pallet load builder of claim 21, wherein the build pallet load variance includes an article unit variance that is a difference determined by the controller between a position, resolved in real time by the controller from the three-dimensional imaging data, of the at least one pallet load article unit in the pallet load build and the predetermined reference position of the at least one pallet load article unit.

36. A pallet load builder for user-automatic cooperative building of pallet load article units onto a pallet support, the pallet load builder comprising:
a frame defining a pallet building base for the pallet support;

at least one robot connected to the frame and configured to transport and place the pallet load article units serially onto the pallet support so as to build the pallet load on the pallet building base; and a controller configured to control the at least one robot and robot motion and effect therewith the serially loading of the pallet load, and signal, with a user interface coupled to the controller, a user for cooperation with the at least one robot effecting building of the pallet load, wherein the controller is further configured to generate, with at least one three-dimensional, time of flight camera, three-dimensional imaging of the pallet load build on the pallet support on the pallet building base, wherein the at least one three-dimensional camera is communicably coupled to the controller, register, from the at least one three-dimensional camera, real time three-dimensional imaging data embodying different corresponding three-dimensional images of each different one of the pallet load article units, of the pallet load build, and determine, in real time, from the corresponding real time three-dimensional imaging data, a build pallet load variance with respect to a predetermined reference, the build pallet load variance being determinative of at least one of an extraneous presence, of an extraneous object in the pallet load build, and of a mispresence of at least one article unit from the pallet load build, and wherein the controller generates, in real time a robot motion signal and a user cooperation signal, both dependent on at least one of the real time determined build pallet load variance, the robot motion signal being generated in real time so as to be performed in real time by the robot building the pallet load build substantially coincident with the imaging of the pallet load build by the robot, wherein the pallet load build is built by substantially continuous placement of serially consecutive pallet load article units, wherein the consecutive pallet load article units are placed immediately prior or immediately after the imaging of the pallet load build showing the determined build pallet load variance, wherein the user cooperation signal defines to the user a deviant condition of the pallet load build and a cooperative action of the user so as to resolve the deviant condition depending on the determined at least one extraneous presence and mispresence.

37. The pallet load builder of claim 36, wherein the robot motion signal generated by the controller is a stop motion signal along a pick/place path of the robot, a slow motion signal along the pick/place path of the robot, or a move to a safe position along safe stop path of the robot, different from the pick/place path.

38. The pallet load builder of claim 36, wherein the user cooperation signal informs the user of different types of user cooperative action resolving the deviant condition depending on the determined at least one extraneous presence and mispresence.

39. The pallet load builder of claim 36, wherein the controller is configured to one or more of:
compare the determined build pallet load variance with a predetermined threshold for at least one predetermined pallet support structure reference characteristic,
generate an articulated robot motion signal commanding articulated robot stop, and
change one or more of an articulated robot motion path and an articulated robot trajectory if the determined build pallet load variance is greater than the predetermined threshold, and if the determined build pallet load variance is less than the predetermined threshold, generating an article unit place position signal identifying placement of at least another pallet load article unit building the pallet load build to the at least one articulated robot.

40. The pallet load builder of claim 36, wherein the controller is configured to set a pallet support base datum of the pallet support, imaged by the at least one three-dimensional camera, from the pallet support variance, which pallet support base datum resolves local base surface variance at each different article unit place location on the pallet support, and defines a real time local article unit position base reference for articulated robot placement of the at least one article unit of a base article unit layer of the pallet load build.

* * * * *